(12) United States Patent
Nishihara et al.

(10) Patent No.: US 7,715,093 B2
(45) Date of Patent: May 11, 2010

(54) INDIVIDUAL BAND GAIN EQUALIZER FOR OPTICAL AMPLIFIERS

(75) Inventors: Masato Nishihara, Kawasaki (JP); Miki Onaka, Kawasaki (JP); Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/016,176

(22) Filed: Jan. 17, 2008

(65) Prior Publication Data
US 2008/0239470 A1    Oct. 2, 2008

Related U.S. Application Data

(62) Division of application No. 11/362,727, filed on Feb. 28, 2006, now Pat. No. 7,359,112.

(30) Foreign Application Priority Data

Mar. 14, 2005 (JP) ............... 2005-071044
Sep. 30, 2005 (JP) ............... 2005-286608

(51) Int. Cl.
*H01S 3/00* (2006.01)
(52) U.S. Cl. .................... 359/337.1; 359/349
(58) Field of Classification Search .......... 359/337.1, 359/349
See application file for complete search history.

(56) References Cited

U.S. PATENT DOCUMENTS 5,680,247 A   10/1997   Okuno
5,907,429 A   5/1999   Sugata
5,912,760 A   6/1999   Sugiya
5,933,270 A   8/1999   Toyohara (Continued)

FOREIGN PATENT DOCUMENTS

EP    1 298 764 A2    4/2003

(Continued)

OTHER PUBLICATIONS

Nishihara, et al., "Characterization and New Numerical Model of Spectral Hole Burning in Broadband Erbium-Doped Fiber Amplifier", 2003 Optical Society of America, Jul. 6, 2003.

(Continued)

*Primary Examiner*—Mark Hellner
(74) *Attorney, Agent, or Firm*—Staas & Halsey LLP

(57) ABSTRACT

A control apparatus comprises a light monitoring unit for dividing a signal wavelength band into at least a band in which output light power of an optical amplifier tends to decrease at an decrease in the number of signal wavelengths and a band including a gain deviation band, and for monitoring inputted light power for the individual divided bands, a calculation unit for obtaining the number of signal wavelengths in the individual divided bands based on a monitor result, and a target gain correction unit for correcting a target gain based on a result of the calculation. This suppresses a transient variation of signal light level due to SHB or SRS at a high speed with a simple configuration without deteriorating noise characteristic, thus enabling optical amplifiers to be further disposed in a multi-stage fashion, which can lengthen the transmission distance of a transmission system including an optical add/drop unit.

12 Claims, 46 Drawing Sheets

U.S. PATENT DOCUMENTS

| | | | |
|---|---|---|---|
| 6,008,935 | A | 12/1999 | Fujita et al. |
| 6,256,140 | B1 | 7/2001 | Kobayashi |
| 6,760,150 | B2 | 7/2004 | Goto et al. |
| 6,943,940 | B2 * | 9/2005 | Kinoshita et al. ............ 359/349 |
| 7,006,282 | B2 | 2/2006 | Tian et al. |
| 7,119,950 | B2 * | 10/2006 | Ohshima et al. ............ 359/349 |
| 2002/0027704 | A1 | 2/2002 | Kobayashi et al. |
| 2003/0174390 | A1 | 9/2003 | Kakui |
| 2003/0185563 | A1 | 10/2003 | Stephens et al. |
| 2005/0146782 | A1 | 7/2005 | Takeyama et al. |

FOREIGN PATENT DOCUMENTS

| | | |
|---|---|---|
| EP | 1 298 764 A3 | 4/2005 |
| JP | 10-173597 | 6/1998 |
| JP | 11-337750 | 12/1999 |
| JP | 2001-168841 | 6/2001 |
| JP | 2003-258348 | 9/2003 |

OTHER PUBLICATIONS

Nishihara, et al, "Impact of Spectral Hole Burning in Multi-Channel Amplification of EDFA", 2004 Optical Society of America, Feb. 22, 2004.

M. Bolshtyansky, "Spectral Hole Burning in Erbium-Doped Fiber Amplifiers", Journal of Lightwave Technology, vol. 21, No. 4, Apr. 2003.

Reference AH (Japanese Patent Laid-Open No. 2003-258348) corresponds to Reference AA (U.S. Patent Publication No. 200/0174390).

Reference AI (Japanese Patent Laid-Open No. 10-173597) corresponds to Reference AB (U.S. Patent No. 5,933,270).

Office Action mailed May 28, 2008; U.S. Appl. No. 11/187,895.

Notice of Allowance mailed Oct. 21, 2008; U.S. Appl. No. 11/187,895.

European Search Report mailed Aug. 18, 2009 and issued in corresponding 06004111.8.

U.S Office Action mailed Jan. 10, 2007 in parent case, U.S. Appl. No. 11/362,727.

U.S Office Action mailed Jun. 19, 2007 in parent case, U.S. Appl. No. 11/362,727.

U.S. Notice of Allowance mailed Oct. 17, 2007 in parent case, U.S. Appl. No. 11/362,727.

Office Action mailed Feb. 13, 2008 in parent case, U.S. Appl. No. 11/362,727.

* cited by examiner

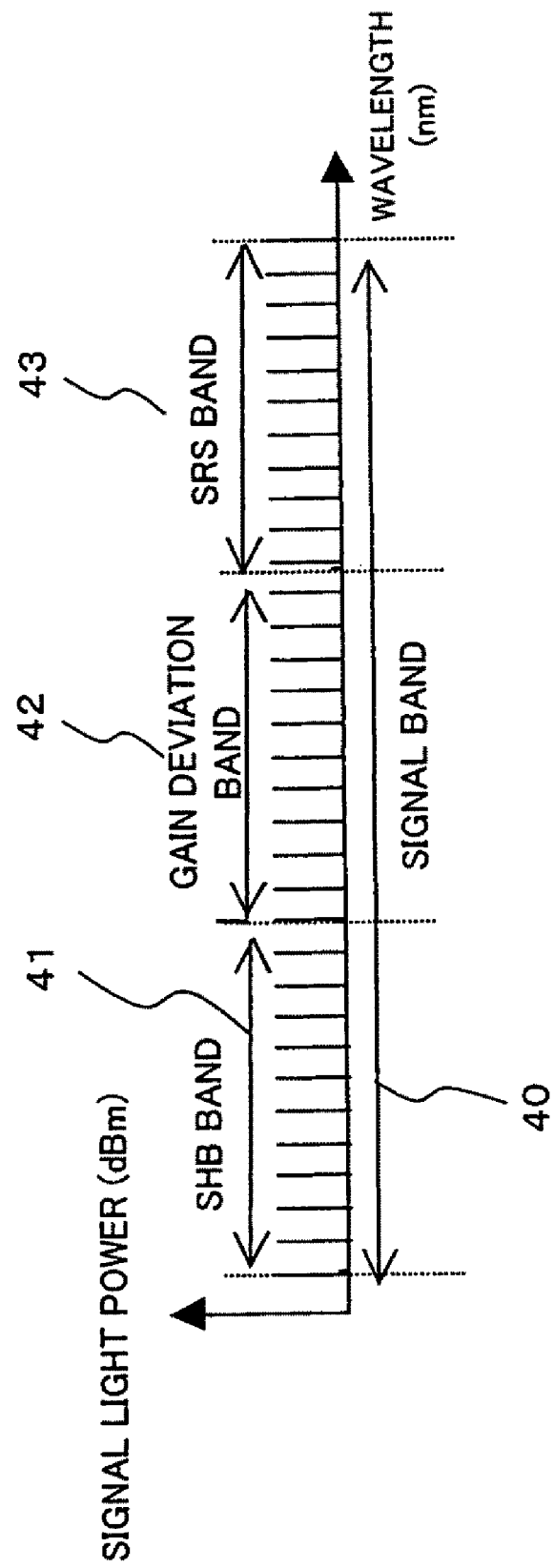

FIG. 12

| SHB BAND | | GAIN DEVIATION BAND | | SRS BAND | | EDFA GAIN ADJUSTMENT |
|---|---|---|---|---|---|---|
| BEFORE | AFTER | BEFORE | AFTER | BEFORE | AFTER | |
| ● | ● | ● | ● | ● | ○ | — |
| ● | ● | ● | ○ | ● | ● | — |
| ● | ● | ● | ○ | ● | ○ | DECREASE |
| ● | ● | ● | ○ | ○ | ○ | DECREASE |
| ● | ● | ○ | ○ | ● | ○ | DECREASE |
| ● | ○ | ● | ● | ● | ● | — |
| ● | ○ | ● | ● | ○ | ○ | INCREASE |
| ● | ○ | ○ | ○ | ● | ● | INCREASE |
| ● | ○ | ● | ● | ● | ○ | INCREASE |
| ● | ○ | ● | ○ | ● | ● | INCREASE |
| ● | ○ | ● | ○ | ● | ○ | INCREASE |
| ● | ○ | ● | ○ | ○ | ○ | INCREASE |
| ● | ○ | ○ | ○ | ● | ○ | INCREASE |
| ● | ○ | ○ | ○ | ○ | ○ | INCREASE |
| ○ | ○ | ● | ● | ● | ○ | — |
| ○ | ○ | ● | ○ | ● | ● | — |
| ○ | ○ | ● | ○ | ● | ○ | — |
| ○ | ○ | ● | ○ | ○ | ○ | — |
| ○ | ○ | ○ | ○ | ● | ○ | — |

A → (row 3)
B → (row 7)
231

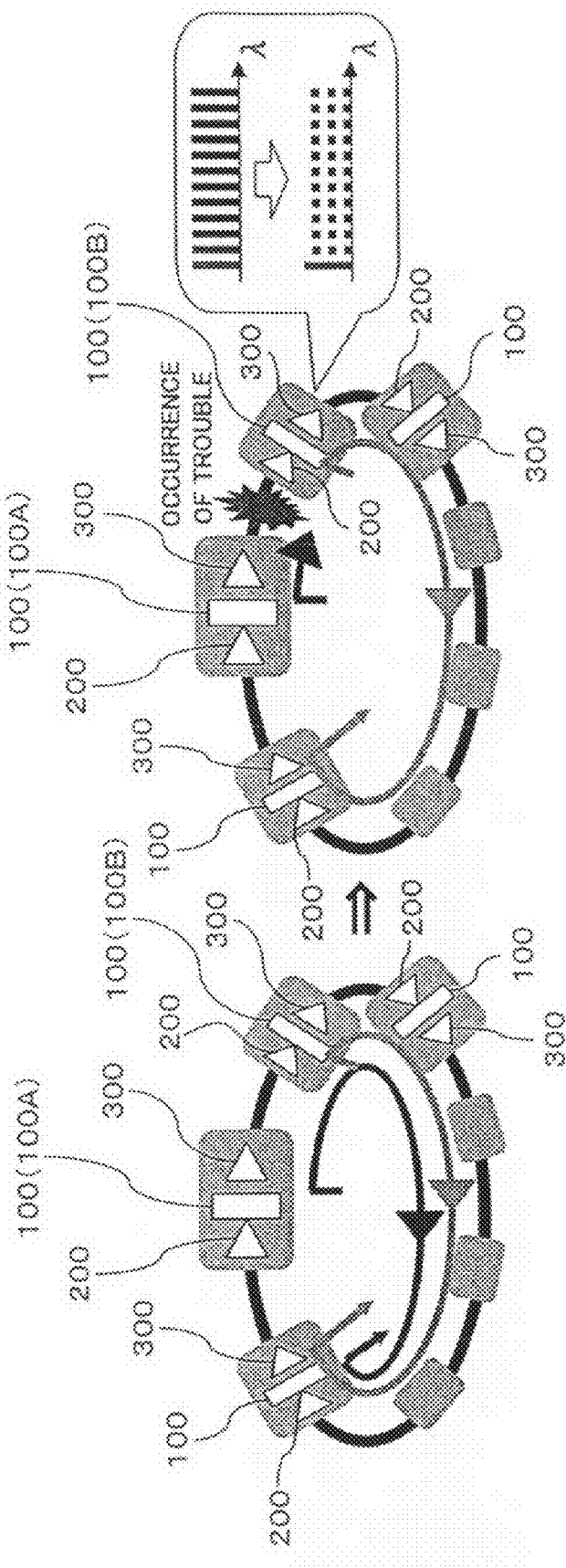

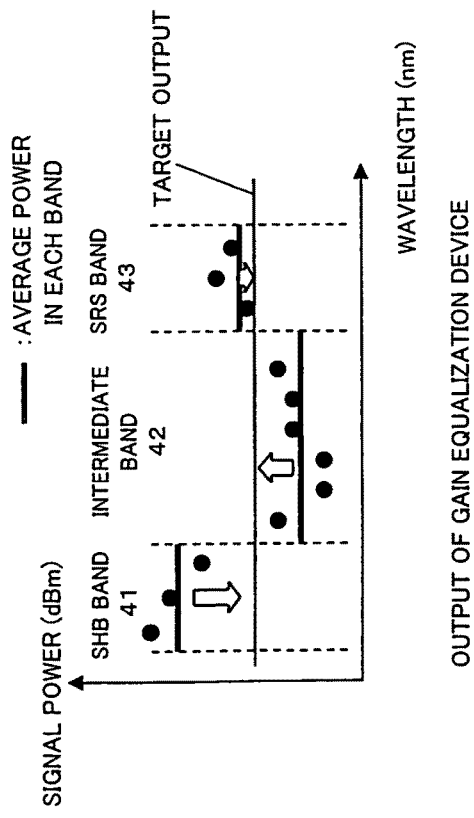
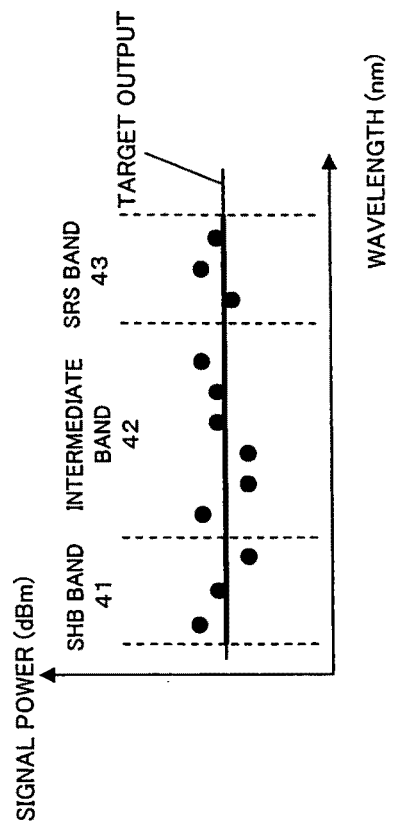

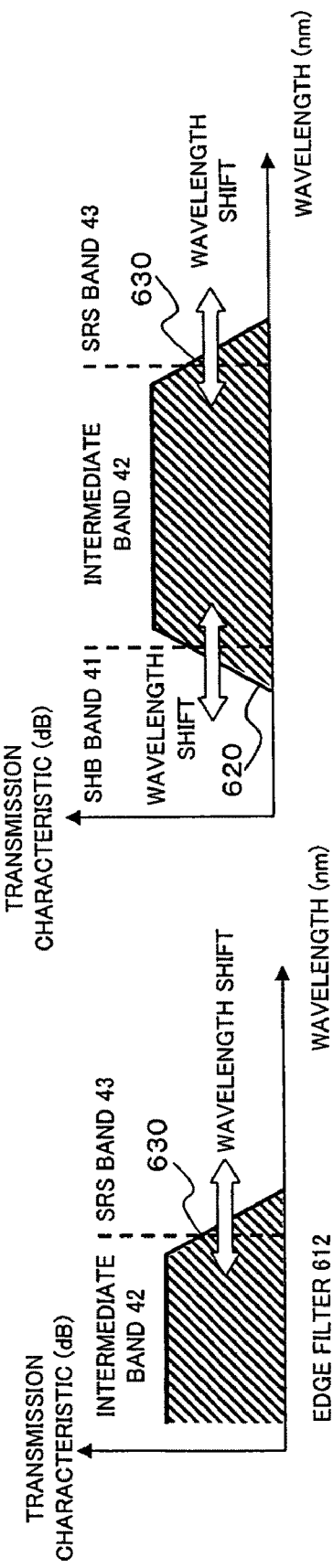

INDIVIDUAL BAND GAIN EQUALIZER FOR OPTICAL AMPLIFIERS

CROSS REFERENCE TO RELATED APPLICATIONS

This application is a divisional of U.S. application Ser. No. 11/362,727 filed Feb. 28, 2006 now U.S. Pat. No. 7,359,112 which is based on and hereby claims priority to Japanese Applications No. 2005-286608 filed on Sep. 30, 2005 and No. 2005-71044 filed on Mar. 14, 2005 in Japan, each of the contents of which are hereby incorporated by reference.

BACKGROUND OF THE INVENTION (1) Field of the Invention

The present invention relates to a control apparatus and method for an optical amplifier, an optical amplifier, an optical transmission apparatus, an individual band gain equalizer, a wavelength multiplexing transmission apparatus an optical amplifier and a wavelength multiplexing transmission system using the same equalizer, and more particularly to a technique suitable for use in a WDM (Wavelength Division Multiplex) optical transmission system which lengthens the transmission distance by disposing optical fiber amplifiers, represented by an Erbium-doped fiber amplifier (EDFA), in multi-stage system.

(2) Description of the Related Art

In recent years, as one example of a WDM optical transmission system, there has been noted a metro core system capable of adding/dropping an optical signal with an arbitrary wavelength at arbitrary nodes making a connection between local base cities. FIG. 16 is a block diagram showing an example of a configuration of a metro core system. In a system shown in FIG. 16, a plurality of OADM (Optical Add-Drop Multiplexer) nodes 100 are connected through transmission lines (optical fibers) 400 into a ring configuration so that, at each of the OADM nodes 100, a signal with an arbitrary wavelength (channel) is added to the transmission line 400 and, of WDM signals transmitted through the transmission line 400, light with an arbitrary wavelength is dropped therefrom. Moreover, optical amplifiers (preamplifier 200 and post amplifier 300) are properly placed at the former and latter stages of each of the OADM nodes 100, thereby compensating for the loss in light level between the OADM nodes (each of which will hereinafter be equally referred to simply as a "node") 100 for lengthening the transmission distance.

In addition, in the system which adds/drops a signal at an arbitrary node 100 as mentioned above, since the number of signal wavelengths (hereinafter referred to equally as the "number of transmission wavelengths") to be transmitted in the system (transmission lines 400) varies dynamically, for maintaining the output signal power for each wavelength (channel) to a constant value with respect to this variation of number of wavelengths (keeping the flatness of gain with respect to wavelength), an AGC amplifier having an automatic gain control (AGC) function is commonly used for the above-mentioned amplifiers 200 and 300.

In this case, for example, as shown in FIG. 17, the AGC amplifier is arranged such that portions of input/output signals of an optical amplifier (EDFA) 200 (300) are branched through the use of optical branch means 501 and 502 such as optical couplers so as to monitor the powers thereof (i.e., input/output signal powers of the optical amplifier 200 (300)) by PDs 601 and 602, and an automatic gain control unit 700 controls the pump power of the EDFA 200 (300) so that the power ratio therebetween becomes constant.

Meanwhile, in such a system, it is considered that, for example, as shown in FIG. 18(A), many (for example, 39 wavelengths) optical signals are added from one node 100 (100A) and a different one-wavelength optical signal is added from the next node 100 (100B). In this situation, for example, as shown in FIG. 18(B), in a case in which a trouble such as dynamic reconstruction of an optical transmission path, man-made mistake, fiber disconnection and connector removal occurs between the nodes 100A and 100B, only the signal added at the node 100B remains (that is, the number of transmission wavelengths varies suddenly. At this time, for example, as shown in FIG. 19(A), there arises a phenomenon that the power level of the residual light at the light reception end varies.

For example, as shown in FIG. 25, the above-mentioned "signal reception end" signifies an optical receiver 101 having an optical-electrical conversion function (O/E) to receive dropped optical signal for converting it into an electric signal, and this also applies to the following description. Moreover, the "signal transmission end" signifies an optical transmitter 102 having an electrical-optical conversion function (E/O) to transmit a transmission signal (electric signal) with added optical signal with a given wavelength.

For example, as shown in FIG. 19(B), the above-mentioned optical power variation can depend mainly upon three factors: (1) spectral hole burning (SHB), (2) gain (wavelength) deviation and (3) stimulated Raman scattering (SRS) effects, which will be described hereinbelow.

(1) SHB

The SHB producing the first factor is a phenomenon arising in the optical amplifier 200 (300) and shows a characteristic that the shorter-wavelength side light power lowers. That is, for example as shown in FIG. 20, when the optical amplifier 200 (300) amplifies light with one wavelength (for example 1538 nm) in the C band (1530 to 1565 nm), as a phenomenon, the EDFA gain lowers in the vicinity of that signal wavelength (which is referred to as main hole) and the EDFA gain also lowers in the vicinity of 1530 nm (which is referred to as second hole).

Moreover, in the C band, the main hole becomes deeper toward the shorter-wavelength side (gain decreasing quantity becomes larger) and both the main hole and second hole become deeper as the optical signal input power increases. Since this SHB is averaged in a state where multi-wavelength signal is inputted, it does not show a great effect. On the other hand, the effect thereof increases with a decrease in number of input wavelengths. For this reason, in a case in which only a signal with one wavelength remains due to the occurrence of a trouble between the nodes 100A and 100B as mentioned above, as shown in the column (1) of FIG. 19(B) and in FIG. 21, the gain of the optical amplifier 200 (300) decreases as the residual signal shifts toward the shorter-wavelength side, which causes a phenomenon that the output signal power also lowers ($-\Delta P$). That is, the fluctuation of the gain due to the SHB varies in accordance with the number of signal wavelengths and the allocation thereof. The detail of the SHB is written in the non-patent documents 1 to 3 mentioned later.

(2) Gain Deviation

The gain (wavelength) deviation producing the second factor is also a phenomenon occurring in the optical amplifier 200 (300). That is, as mentioned above, the optical amplifier 200 (300) is made to maintain the average gain of the signal to a constant value (AGC) and, when a wavelength showing a deviation remains, it operates to adjust the gain of that signal to a target gain, which makes a variation (in this case, +ΔP) in output signal power of the residual optical signal, for example, as shown in the column (2) of FIG. 19(B). In other words, the operating point of the optical amplifier 200 (300) varies in accordance with the number of signal wavelengths and the arrangement thereof, which causes a variation in gain spectrum.

(3) SRS Effect

The SRS effect producing the third factor is a phenomenon occurring in the transmission line 400. An optical amplifier utilizing this SRS effect is a Raman amplifier. For example, as shown in FIG. 22, as a characteristic, the SRS of a common single-mode fiber has a gain peak on the lower frequency side by approximately 13 THz from the pump wavelength (when the pump wavelength is in the vicinity of 1400 nm, longer-wavelength side by approximately 100 nm) and, hence, the selection of the pump wavelength enables the optical signal amplification in an arbitrary wavelength band. However, as shown in FIG. 22, the amplification at one-point wavelength is not feasible, and since the amplification (gain) characteristic has a range in some degree with respect to wavelength, the amplification phenomenon arises even in the vicinity of the pump wavelength.

That is, when a WDM optical signal is transmitted through the transmission line 400, the shorter-wavelength side light power becomes pump power, thus amplifying the longer-wavelength side signal. In consequence, as shown in FIG. 23, there arises a phenomenon that the signal power increases toward the longer-wavelength side. Therefore, in a case in which only a signal with one wavelength remains due to the occurrence of a trouble between the nodes 100A and 100B as mentioned above, as shown in the column (3) of FIG. 19 and in FIG. 21(B), as the residual signal shifts toward the longer-wavelength side, it is more difficult to take the power from the shorter-wavelength side, which causes the power (gain) reduction (−ΔP). That is, the SRS effect varies in accordance with the number of signal wavelengths and the allocation thereof.

Thus, when the number of wavelengths of WDM signal transmitted through the transmission line 400 varies largely, mainly depending upon the three factors of SHB, gain deviation and SRS, the output power of the residual signal (residual channel) varies. Even if the variation quantity per optical amplifier or transmission line is not very large, in the case of a system in which the optical amplifiers 200 and 300 made to carry out the AGC are provided in a multi-stage configuration, there arises the accumulation of the output signal power variations (ΔP) of the respective channels occurring the respective optical amplifiers 200, 300 and transmission lines 400.

In the case of a conventional optical transmission system in which the transmission distance is short and the number of optical amplifiers to be disposed in a multi-stage configuration is small, this variation is little and no problem arises. However, when the number of stages of optical amplifiers increases due to the lengthening of the transmission distance of the system in the future, for example, as shown in the left side of FIG. 24, the optical signal power at the signal reception end becomes out of a reception allowable range, which can produce transmission errors.

It is considered that the accumulation of the power variations is preventable by carrying out the automatic level control (ALC) at high speed at the occurrence of variation of the number of wavelengths, for example, as shown in the right side of FIG. 24. In this case, the ALC is usually made to monitor the output light power of the optical amplifier 200 (300) through the use of PD or the like for controlling (feedback-controlling) the pump power to the optical amplifier 200 (300) so that the monitored value reaches a target output signal power Pout which is a target output signal power Ptarget [dBm/ch] per channel×the number of inputted signal wavelengths.

Thus, for realizing the ALC of the optical amplifier 200 (300), the information on the number of inputted signal wavelengths to be inputted to the optical amplifier 200 (300) becomes necessary. However, in the case of receiving the information on the number of wavelengths from an optical service channel (OSC) or a network management system (NMS), it takes much time and cannot cope with the transient variation, for example, immediately after the occurrence of a trouble [for example, as indicated by meshing in FIG. 19(A), a variation in a period until the OADM node 100 shows the level compensation function after the occurrence of variation in the number of wavelengths].

For this reason, there have been proposed some techniques (methods) of calculating the number of wavelengths in the interior of a node.

(a) One technique is a method of, on the condition that the optical powers of the respective wavelengths to be inputted to an optical amplifier are even (inputted optical power per wavelength is known in advance), monitoring the total power of the inputted light to the optical amplifier to calculate the number of transmission wavelengths by dividing the monitored value by a specified inputted optical power per channel.

(b) As proposed in the following patent documents 1 and 2, another technique is a method of inputting light, branched in a manner such that a portion of signal inputted to an optical amplifier is used as monitor light, to a wavelength demultiplexer (DEMUX) to demultiplex it according to wavelength for counting the number of transmission wavelengths. Concretely, in the technique disclosed in the patent document 1, the inputted signal to the optical amplifier is monitored according to wavelength and the attenuation quantity of a variable optical attenuator provided at an output of the optical amplifier is adjusted in accordance with the monitored value and a variation in the number of wavelengths for controlling the output light power collectively. On the other hand, according to the technique disclosed in the patent document 2, in an optical amplifier in which optical amplification fibers such as EDF are connected in a multi-stage configuration, the pump power to each optical amplification fiber and the attenuation quantity of a variable optical attenuator provided between the stages of the respective optical amplification fibers are adjusted on the basis of the signal power and the number of wavelengths, detected from the inputted light to the former-stage optical amplification fiber, and the light power detected from the output light of the latter-stage optical amplification fiber, thereby controlling the gain of the entire optical amplifier and the gain spectrum.

It is desirable that the above-mentioned transient variation of the output power of an optical amplifier is compensated for (undergoes the flattening processing) as quickly as possible (for example, on the order of microsecond). As candidates for a technique of compensating for such an output power variation, there are, for example, (c) a configuration in which WDM output signal is demultiplexed according to wavelength and the optical power of each wavelength is adjusted through the use of a variable optical attenuator (VOA) for each wavelength and then multiplexed, (d) a dynamic gain equalizer (DGEQ), and other techniques. The DGEQ is a device designed to perform the loss adjustment for each wavelength of the WDM signal and capable of compensating for the gain deviation.

In addition, as a technique about the gain equalization, there are techniques disclosed in the following patent documents 3 and 4. The technique disclosed in the patent document uses an optical circulator, an optical reflector, a variable optical attenuator and a WDM coupler for carrying out the gain equalization according to a plurality of signals (wavelengths) demultiplexed by the WDM coupler. Moreover, the technique disclosed in the patent document 4 is related to variable gain flattening unit including a plurality of long-period gratings arrangement and an adjustment unit (piezo converter and piezo control circuit) for adjusting the attenuation factor for each grating.

[Patent Document 1] Japanese Patent Laid-Open No. 2001-168841

[Patent Document 2] Japanese Patent Laid-Open No. 2003-258348

[Patent Document 3] Japanese Patent Laid-Open No. HEI 10-173597

[Patent Document 4] Japanese Patent Laid-Open No. HEI 11-337750

[Non-Patent Document 1] Masato NISHIHAPA, et. al., "Characterization and new numerical model of spectral hole burning in broadband erbium-doped fiber amplifier", 2003 Optical Society of America.

[Non-Patent Document 2] Masato NISHIHARA, et. al., "Impact of spectral hole burning in multi-channel amplification of EDFA", 2004 Optical Society of America.

[Non-Patent Document 3] Maxim Bolshtyansky, "Spectral Hole Burning in Erbium-Doped Fiber Amplifiers", JOURNAL OF LIGHTWAVE TECHNOLOGY, VOL. 21, NO. 4, April 2003.

However, with respect to the technique (method) of calculating the number of wavelengths in a node, there is a problem which arises with the method described above in (a) in that, when the power of each channel to be inputted to an optical amplifier varies, there is a possibility of calculating the number of wavelengths in error. Moreover, the method described above in (b) creates a problem of high cost and size increase. In the case of the technique disclosed in the patent document 1, since the loss is large in the wavelength demultiplexer (DEMUX), there is a need to increase the input branch ratio, which causes the deterioration of the noise characteristic (NF) of an optical amplifier, and in the case of the technique disclosed in the patent document 2, there is a problem in that the high-speed response becomes difficult.

Moreover, with respect to the equalization technology, in the case of the technique described above in (c) and the technique disclosed in the aforesaid patent document, since the received WDM signal is demultiplexed according to wavelength and the adjustment of the optical power is made according to wavelength through the use of the variable optical attenuator for each wavelength, the apparatus scale becomes larger to increase the cost. In particular, if a high-speed operating VOA is used for obtaining a high-speed response characteristic, this VOA is expensive and, when the VOAs corresponding in number to wavelengths are prepared, a further increase in cost occurs.

Still moreover, the dynamic gain equalizer described above in (d) creates problems in that the response speed is as relatively low as approximately 30 ms and the cost thereof stands at several millions yen and the adding loss is large (approximately 5 dB). Accordingly, the introduction into the system is impractical. Yet moreover, in the case of the technique disclosed in the aforesaid patent document 4, although, in a manner such that the piezo control circuit controls the piezo converter to change the pressure to be applied to the gratings, the characteristics of a plurality of grating can individually be changed so as to vary the attenuation factor of light passing through the gratings, the response speed is low because the change of pressure to the gratings falls under physical control.

SUMMARY OF THE INVENTION

The present invention has been developed in consideration of the above-mentioned problems, and it is therefore an object of the invention to suppress the transient variation of a signal power level due to the above-mentioned SHB or SRS with a simple configuration without deteriorating the noise characteristic for allowing optical amplifiers to be further disposed in a multi-stage system, thereby enabling lengthening the transmission distance of a transmission system including an optical add/drop unit.

Another object is to compensate easily for the deviation in wavelength characteristic in a signal wavelength band at a high speed and at a low cost.

For these purposes, the present invention is characterized by employing a control apparatus and method for the following optical amplifier, an individual band gain equalizer, a wavelength multiplexing transmission apparatus, an optical amplifier at a wavelength multiplexing transmission system using the same equalizer.

(1) A control apparatus for an optical amplifier according to the present invention comprises an automatic gain control unit for controlling a gain of the optical amplifier to a constant value based on power of incoming light and outgoing of the optical amplifier and a target gain, an individual band incoming light monitoring unit for dividing a signal wavelength band of the incoming light into at least a first band and second band: said first band has tendency of decreasing power of the outgoing light at an decrease in the number of signal wavelengths and said second band, is a signal wavelength band other than said first band and, including a gain deviation band in which power of the outgoing light varies mainly due to a wavelength deviation of the gain control by said automatic gain control unit, and for monitoring power of the incoming light to said optical amplifier in each of the first and second bands, an individual band signal wavelength number calculation unit for obtaining the number of signal wavelengths in each of the first and second bands based on a result of the monitoring by the individual band incoming light monitoring unit, and a target gain correction unit for correcting the target gain to be used by the automatic gain control unit based on a result of the calculation by the individual band signal wavelength number calculation unit at a variation of the number of signal wavelengths.

(2) In this case, preferably, the aforesaid individual band incoming light monitoring unit divides the signal wavelength band into three bands of an SHB band, said gain deviation band and SRS band, said SHB band being under dominance of a spectral hole burning (SHB) effect as the band, the gain deviation band and an SRS band under a stimulated Raman scattering (SRS) effect as said first band, and said SRS band being under dominance of a stimulated Raman scattering (SRS) effect occurring in an output transmission line of said optical amplifier as another band of said first band, and monitors power of the incoming light in each of said three bands.

(3) More concretely, the signal wavelength band is a C band, and the SHB band is from 1530 nm to 1540 nm, the SRS band is from 1555 nm to 1565 nm, and the gain deviation band is a band interposed between the SHB band and the SRS band.

(4) In addition, preferably, individual band signal wavelength number calculation unit divides values of power monitored for the individual divided bands by said individual band incoming light monitoring unit by a design value of power of signal light per signal wavelength, and determines a value closest to the nth power of 2 from the resultant value obtained by the division as the number of signal wavelengths in each of the divided bands.

(5) Preferably, a threshold to be used for the determination of the aforesaid number of signal wavelengths is set on the basis of a characteristic of output light power variation in each of the aforesaid divided bands.

(6) In this case, threshold for said first band is set to be smaller than a threshold for said second band including said gain deviation band.

(7) Moreover, preferably, when recognizing, based on a result of the calculation by said individual band signal wavelength number calculation unit, that the number of signal wavelengths in said first band becomes smaller than a predetermined value.

(8) Still moreover, preferably, when recognizing, based on a result of the calculation by said individual band signal wavelength number calculation unit, that the number of signal wavelengths in said gain deviation band becomes smaller than a predetermined value, in a state where the remaining number of signal wavelengths in said first band exceeds a predetermined value.

(9) Yet moreover, preferably, target gain correction unit updates said target gain based on a result of the calculation by said individual band signal wavelength number calculation unit until a predetermined period of time elapses from the occurrence of a variation of the number of signal wavelengths and, after the elapse of said predeterminded period of time, brings said target gain gradually closer to a specified gain value.

(10) Furthermore, in accordance with the present invention a control method for an optical amplifier having an automatic gain control function to control a gain of the optical amplifier to a constant value based on power of incoming light and outgoing light of the optical amplifier and a target gain, comprises the steps of dividing a signal wavelength band of the incoming light into at least a first band and second band: said first band has tendency of decreasing power of the outgoing light at a decrease in the number of signal wavelengths and said second band, is a signal wavelength band other than said band, including a gain deviation band in which power of the outgoing light varies mainly due to a wavelength deviation of the gain control, and monitoring power of the incoming light in each of the divided bands, obtaining the number of signal wavelengths in each of the divided bands based on a result of the monitoring, and correcting said target gain to be used for the automatic gain control based on the number of signal wavelengths in each of the divided bands at a variation of the number of signal wavelengths.

(11) Still furthermore, An optical transmission apparatus comprising:

an automatic gain control unit for controlling a gain of an optical amplifier to a constant value based on power of incoming light and outgoing light of said optical amplifier and a target gain, an individual band incoming light monitoring unit for dividing a signal wavelength band of the incoming light into at least a first band and second band: said first band has tendency of decreasing power of the outgoing light per channel at a decrease in the number of signal wavelengths or increasing power of the outgoing light per channel at an increase in the number of signal wavelengths and said second band, is a signal wavelength band other than said band, including a gain deviation band in which power of the outgoing light per channel varies mainly due to a wavelength deviation of the gain control by said automatic gain control unit, and for monitoring power of the incoming light in each of the divided bands, an individual band signal wavelength number calculation unit for obtaining the number of signal wavelengths in each of the divided bands based on a result of the monitoring by said individual band incoming light monitoring unit, and a target gain correction unit for correcting said target gain to be used by said automatic gain control unit based on a result of the calculation by said individual band signal wavelength number calculation unit at a variation of the number of signal wavelengths.

(12) In this case, preferably, the aforesaid individual band input light monitoring unit divides said signal wavelength band into three bands: an SHB band, said gain deviation band and an SRS band, said SHB band being under dominance of a spectral hole burning (SHB) effect as said first band and said SRS band being under dominance of a stimulated Raman scattering (SRS) effect occurring in an output transmission line of said optical amplifier as another band of said first band, and monitors power of the incoming light in each of said three bands.

(13) Preferably, the SHB band is from 1530 nm to 1540 nm, said SRS band is from 1555 nm to 1565 nm, and said gain deviation band is a band interposed between said SHB band and said SRS band.

(14) Moreover, preferably, the individual band signal wavelength number calculation unit divides values of power monitored for the individual divided bands by said individual band incoming light monitoring unit by a design value of power of signal light per signal wavelength, and determines a value closest to the nth power of 2 from the resultant value obtained by the division as the number of signal wavelengths in each of the divided bands.

(15) Still moreover, preferably, a threshold to be used for the determination of the aforesaid number of signal wavelengths is set on the basis of a characteristic of output light power variation per channel in each of the aforesaid divided bands.

(16) Yet moreover, preferably, the threshold for the first band is set to be smaller than a threshold for the second band including the aforesaid gain deviation band.

(17) In addition, it is also appropriate that, when recognizing, based on a result of the calculation by said individual band signal wavelength number calculation unit, that the number of signal wavelengths in said first band becomes smaller than a predetermined value.

(18) Still additionally, it is also appropriate that, when recognizing, based on a result of the calculation by said individual band signal wavelength number calculation unit, that the number of signal wavelengths in said gain deviation band becomes smaller than a predetermined value, in a state where the remaining number of signal wavelengths in said first band exceeds a predetermined value.

(19) Yet additionally, it is also appropriate that the target gain correction unit updates the target gain on the basis of the result of the calculation by the band-by-band signal wavelength number calculation unit until a given period of time elapses from the occurrence of a variation of the number of signal wavelengths and, after the elapse of the given period of time, brings the target gain gradually closer to a specified gain value.

(20) Furthermore, An optical amplifier having an automatic gain control function to control a gain to a constant value based on power of incoming light and outgoing light and a target gain, wherein a signal wavelength band of an incoming light into at least a first band and second band: said first band has tendency of decreasing power of the outgoing light per channel at a decrease in the number of signal wavelengths or increasing power of the outgoing light per channel at an increase in the number of signal wavelengths and said second band, is a signal wavelength band other than said band, including a gain deviation band in which power of the outgoing light varies mainly due to a wavelength deviation of the gain control for monitoring power of the incoming light in each of the divided bands, obtaining the number of signal wavelengths in each of the divided bands based on a result of the monitoring, and correcting said target gain to be used for the automatic gain control based on the number of signal wavelengths in each of the divided bands at a variation of the number of signal wavelengths.

(21) Still furthermore, a band unit gain equalizer according to the present invention comprises a band division means for dividing a signal wavelength band of an incoming wavelength multiplexed light into at least a first band and second band: said first band has tendency of decreasing power of outgoing light of an optical amplifier per channel at a decrease in the number of signal wavelengths or increasing power of the outgoing light of said optical amplifier per channel at an increase in the number of signal wavelengths and said second band, is a signal wavelength band other than said first band, including a gain deviation band in which power of the outgoing light per channel varies mainly due to a wavelength deviation of automatic gain control in the optical amplifier, and an adjustment means for adjusting the power of the outgoing light for the individual divided bands divided by the band division means.

(22) In this case, it is also appropriate that the band division means divides said signal wavelength band into three bands: an SHB band, said gain deviation band and an SRS band, said SHB band being under dominance of a spectral hole burning (SHB) effect as said first band, and said SRS band being under dominance of a stimulated Raman scattering (SRS) effect occurring in an output transmission line of said optical amplifier as another band of said first band.

(23) In addition, it is also appropriate that the adjustment means includes a variable optical attenuator for the SHB band, a variable optical attenuator for the gain deviation band and a variable optical attenuator for the SRS band, and the band division means includes a gain deviation band reflection device for reflecting light in the gain deviation band, a first optical circulator for leading the incoming wavelength multiplexed light to the gain deviation band reflection device and leading reflected light from the gain deviation band reflection device to the variable optical attenuator for the gain deviation band, a band separation device for dividing light passing through the gain deviation band reflection device into lights in the SHB band and the SRS band to lead the lights to the variable optical attenuators for the SHB band and the SRS band, a band coupling device for coupling output lights of the SHB band and SRS band variable optical attenuators, and a second optical circulator provided on an output side of the gain deviation band variable optical attenuator for leading output light from the band coupling device to the gain deviation band variable optical attenuator side and for leading light inputted from the gain deviation band variable optical attenuator side to an output port, with an SHB band reflection device, provided between said gain deviation band variable optical attenuator and said second optical circulator, for reflecting, of light led to said gain deviation band variable optical attenuator side, light in said SHB band and an SRS band reflection device, provided between said gain deviation band variable optical attenuator and said second optical circulator, for reflecting, of light led to said gain deviation band variable optical attenuator side, light in said SRS band.

(24) Preferably, each of the variable optical attenuators is a high-speed variable optical attenuator having a response speed on the order of microsecond.

(25) In addition, A wavelength multiplexing transmission apparatus using an individual band gain equalizer according to the present invention comprises the individual band gain equalizer described above in the item (21) and control means for monitoring power of input light or output light of the individual band gain equalizer for each of the divided bands to control the output light power adjustment for the individual divided bands in the adjustment means on the basis of a result of the monitoring so that the output light power of each of the divided bands becomes a predetermined target value.

(26) In this case, it is also appropriate that the control means includes an individual band monitoring unit for monitoring power of input light or output light of said individual band gain equalizer for each of the divided bands, a storage unit for storing the aforesaid target value in advance, a difference detection unit for detecting a difference between a result of the monitoring by the individual band monitoring unit and the target value in the storage unit for each of the divided bands, and again equalization control unit for controlling the adjustment means so that the difference detected by the difference detection unit for each of the divided bands reaches a minimum.

(27) Moreover, it is also appropriate that the wavelength multiplexing transmission apparatus is arranged as a wavelength add/drop apparatus having an add/drop unit made to add/drop light with a wavelength forming at least a portion of the inputted wavelength multiplexed light, and the band individual gain equalizer is provided at the former stage or latter stage of the add/drop unit.

(28) Furthermore, a wavelength multiplexing transmission system using a individual band gain equalizer according to the present invention comprises a wavelength multiplexing transmission apparatus described above in the item (25).

(29) Still furthermore, An optical amplifier using an individual band gain equalizer according to the present invention comprises an amplification medium for an amplification medium for amplifying incoming wavelength multiplexed light, an automatic gain control unit for carrying out automatic gain control based on power of incoming light and outgoing light of said amplification medium and a target gain, an individual band gain equalizer for dividing a signal wavelength band of an outgoing light of said amplification medium into at least a first band and second band: said first band has tendency of decreasing power of the outgoing light per channel at a decrease in the number of signal wavelengths or increasing power of the outgoing light per channel at an increase in the number of signal wavelengths and said second band, is a signal wavelength band other than said first band, including a gain deviation band in which power of the outgoing light varies mainly due to a wavelength deviation of the automatic gain control so as to adjust the power of the outgoing light for the individual divided bands, and control means for monitoring the power of the outgoing light of said amplification medium for each of the divided bands to control said output light power adjustment of said band unit gain equalizer for each of the divided bands based on a result of the monitoring so that the power of the outgoing light of each of the divided bands becomes a predetermined target value.

(30) Yet furthermore, a wavelength multiplexing transmission system according to the present invention comprises the optical amplifier described above in the item (29).

According to the present invention, the target gain is corrected on the basis of the number of signal wavelengths obtained by monitoring input light power for each of the divided bands and, hence, even if the number of signal wavelengths varies suddenly due to a trouble or the like so that the input light power to the optical amplifier varies suddenly, it is possible to suppress the variation (transient variation) of the output signal power (residual signal power) to a minimum, thus suppressing the accumulation of the transient output power variation. Therefore, the light power at the signal reception end lies in the reception power allowable range of a receiver, and the considerable optical S/N ratio deterioration at the signal reception end due to the accumulation of the light power reduction is improvable. In addition, since there is no need to perform the demultiplexing in units of wavelength for obtaining the number of signal wavelengths unlike the conventional technique, the degradation of the noise characteristic (NF) of the optical amplifier is suppressible.

In particular, when the signal wavelength band is divided into three bands of the SHB, the gain deviation band and the SRS band and the input light power of each of the bands is monitored for obtaining the number of signal wavelengths in each band, the gain correction can be made in accordance with the tendency of output light power variation in each band, thereby providing greater transient variation suppression effects on the output signal power.

Moreover, according to the present invention, since the output light power can be adjusted independently for each of the divided bands, the compensation for the gain deviation (output light power deviation) arising in the signal wavelength band can be made in unit of the divided band instead of unit of wavelength. This can easily realize a gain equalizer at a low cost.

When the output power adjustment in units of the divided bands is carried out through the use of a high-speed variable attenuator having a response speed on the order of microsecond, since the compensation for the output power variation occurring in the aforesaid signal wavelength band becomes feasible, even in a case in which the signal light state (number of wavelengths and allocation of wavelengths) varies (increases or decreases) suddenly so that difficulty is experienced in achieve the compensation in a state where an existing node such as optical add/drop apparatus follows the variation, the accumulation of the output power variation does not occur and, even if the transmission is made in a multi-stage configuration, the occurrence of transmission error is preventable at the reception end.

BRIEF DESCRIPTION OF THE DRAWINGS

FIG. 3 is an illustration of an example of division of a signal wavelength band according to this embodiment;

FIG. 12 is an illustration of one example of a target gain setting table to be used in a modification of the gain control method according to this embodiment;

FIGS. 18(A) and 18(B) are illustrations for explaining an operation at the occurrence of a trouble in the system shown in FIG. 16;

FIGS. 30(A) and 30(B) are illustrations of images of variation of output power in an SHB band, a gain deviation band and an SRS band by gain equalization control in the OADM node shown in FIG. 28 or 29;

FIG. 42 is an illustration of a transmission characteristic of a second edge filter in the gain equalization device shown in FIG. 40;

FIG. 43 is an illustration of a transmission characteristic of the gain equalization device shown in FIG. 40;

DESCRIPTION OF THE PREFERRED EMBODIMENTS

[A] Description of First Embodiment

Figure 1:
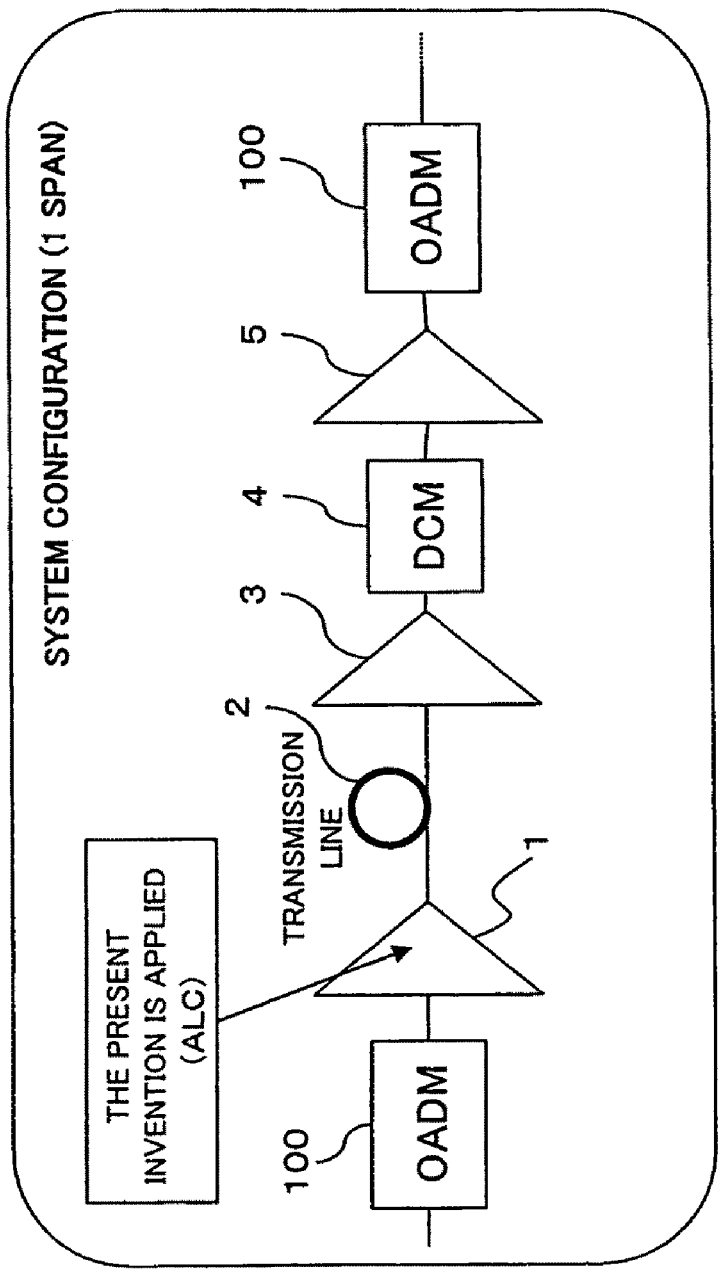
FIG. 1 is a block diagram showing a configuration of a portion of a WDM optical transmission system according to a first embodiment of the present invention.
Figure 16:
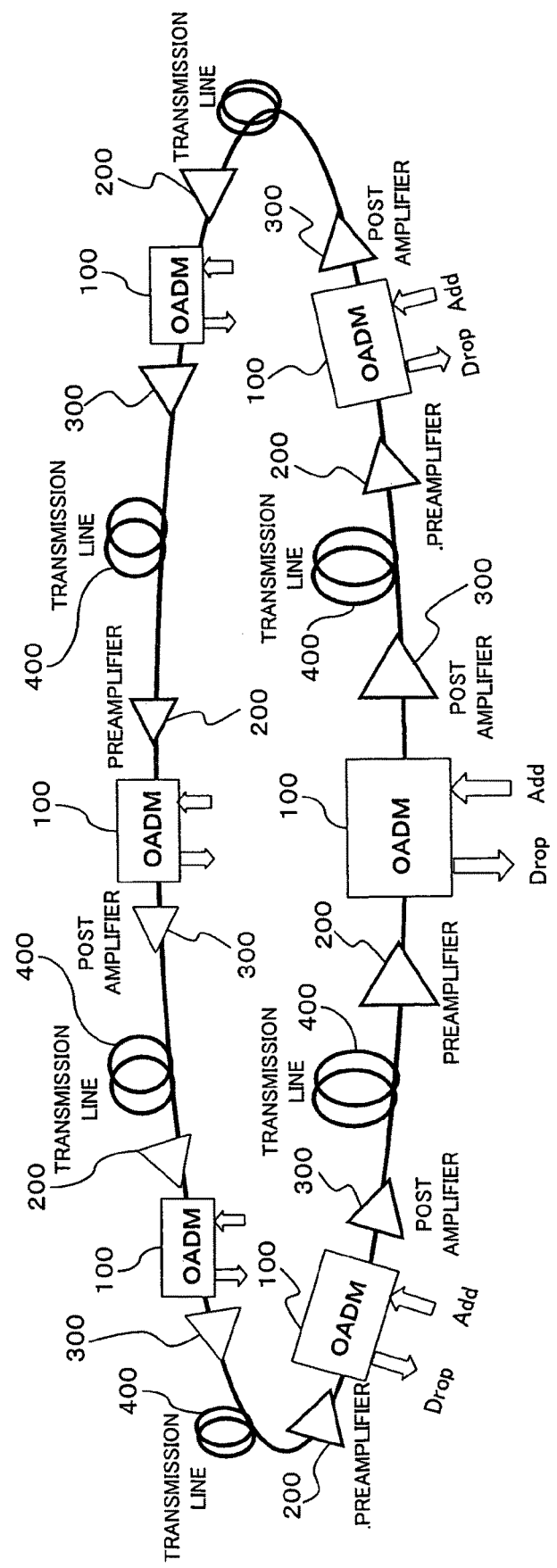
FIG. 16 is a block diagram showing an example of a configuration of a metro core system.
Figure 17:
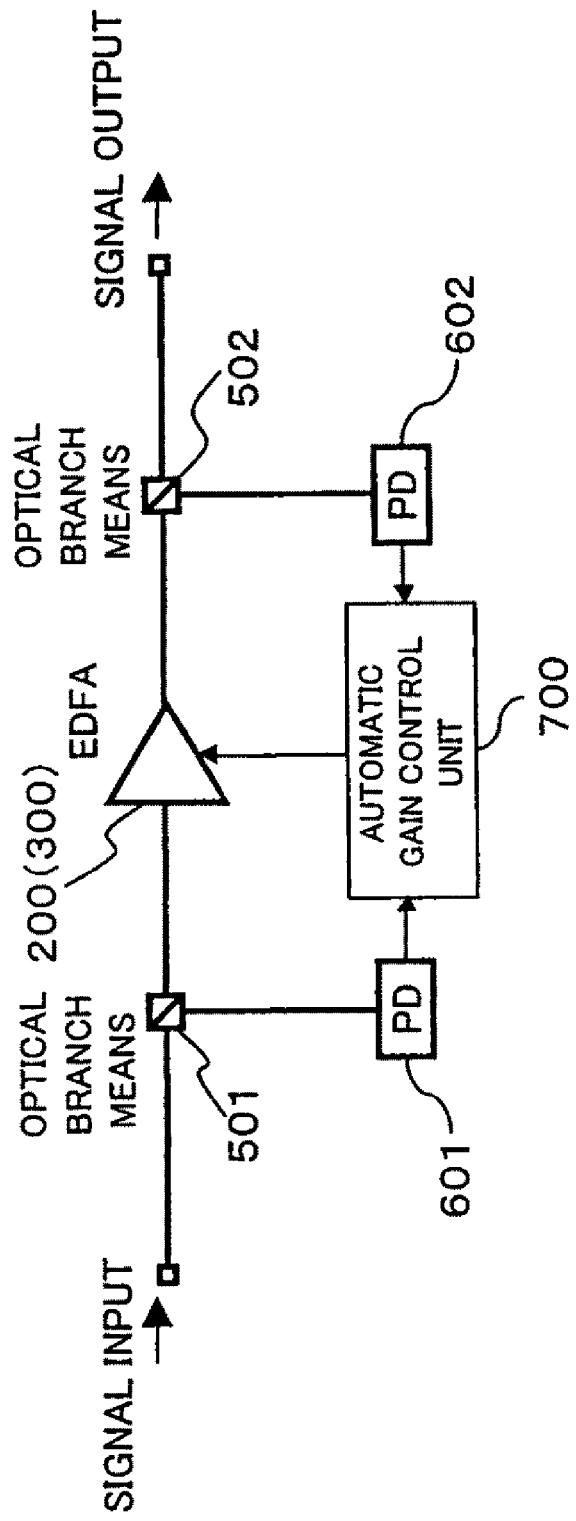
FIG. 17 is a block diagram showing an example of a configuration of a conventional AGC amplifier.
Figure 19A:
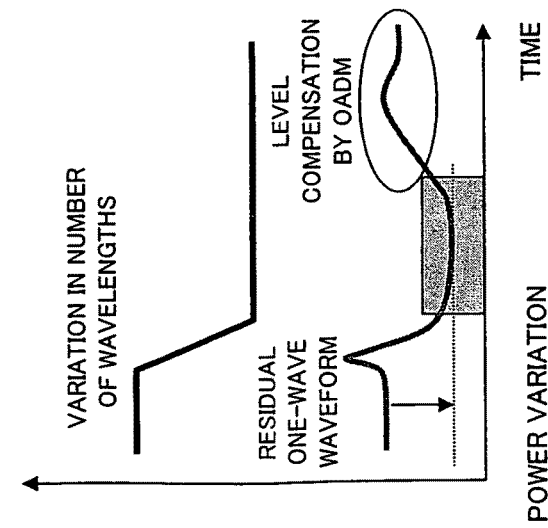
FIGS. 19(A) and 19(B) are illustrations for explaining an output light power variation at a variation of the number of wavelengths due to the occurrence of a trouble in the system shown in FIG. 16.
Figure 19B:
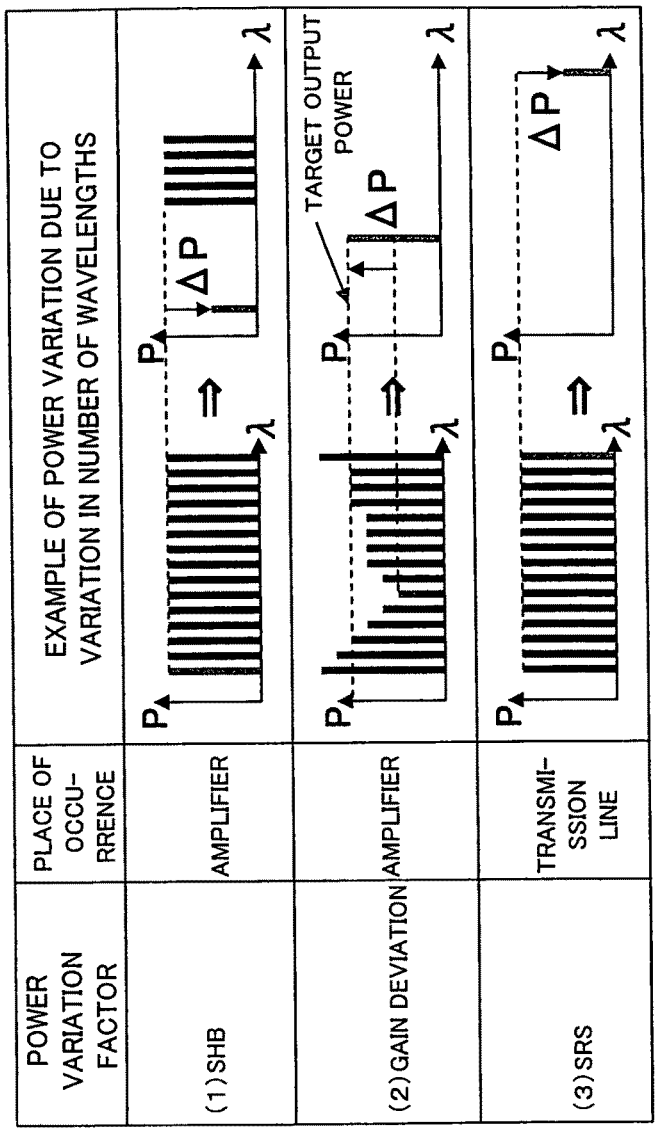
Figure 20:
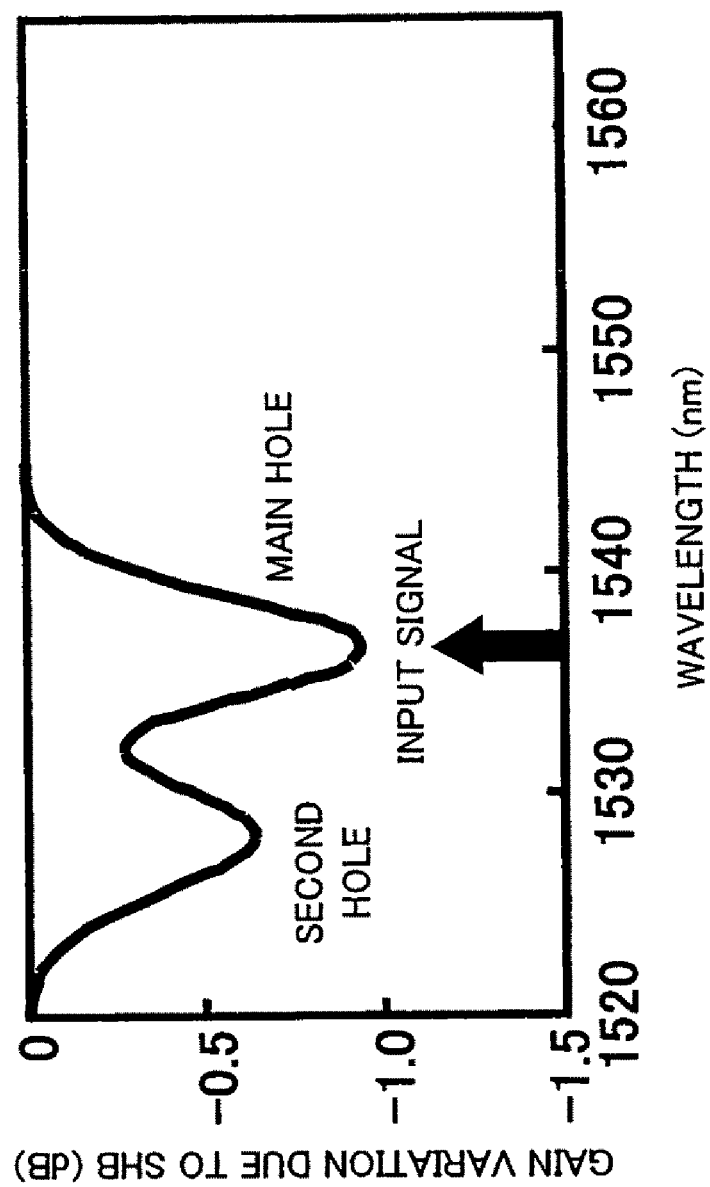
FIG. 20 is an illustration of one example of a wavelength dependency gain variation quantity due to SHB.
Figure 21B:
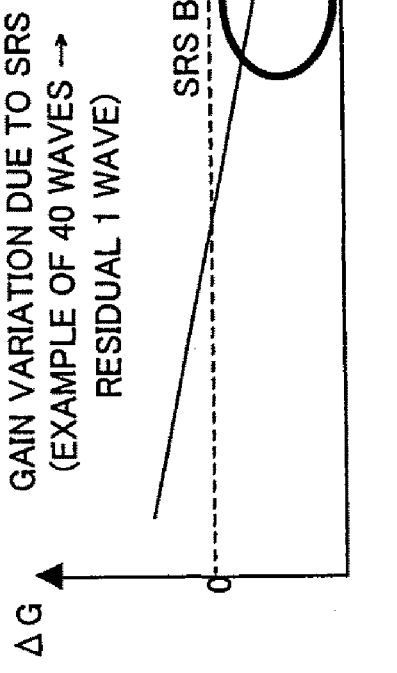
FIG. 21(B) is an illustration of one example of a gain variation quantity due to SRS with respect to wavelengths.
Figure 21A:
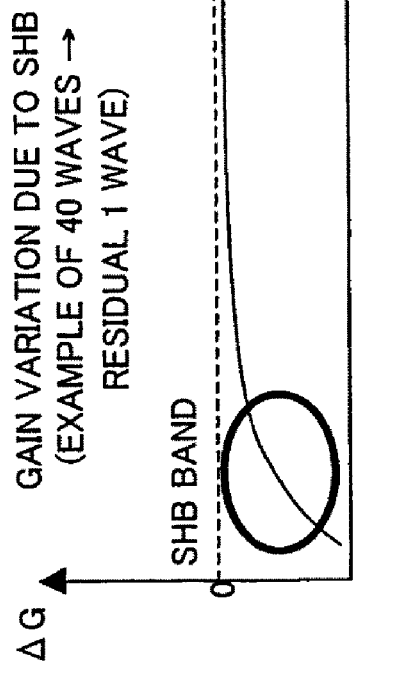
FIG. 21(A) is an illustration of one example of a gain variation quantity due to SHB with respect to wavelengths.
Figure 22:
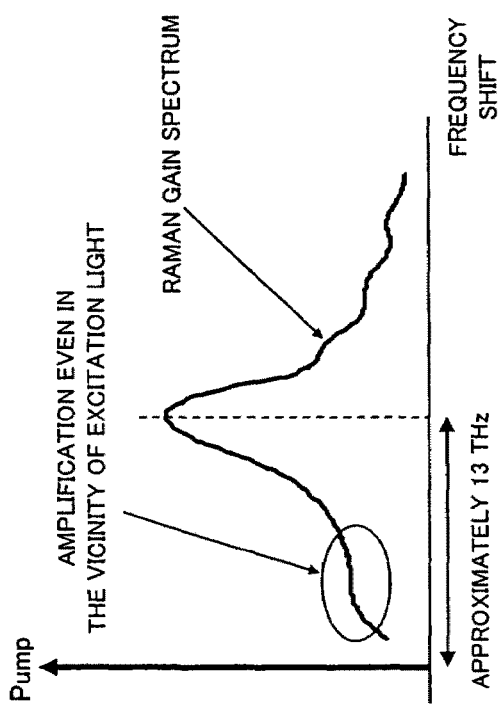
FIG. 22 is an illustration of a gain spectrum of Raman amplification band.
Figure 23:
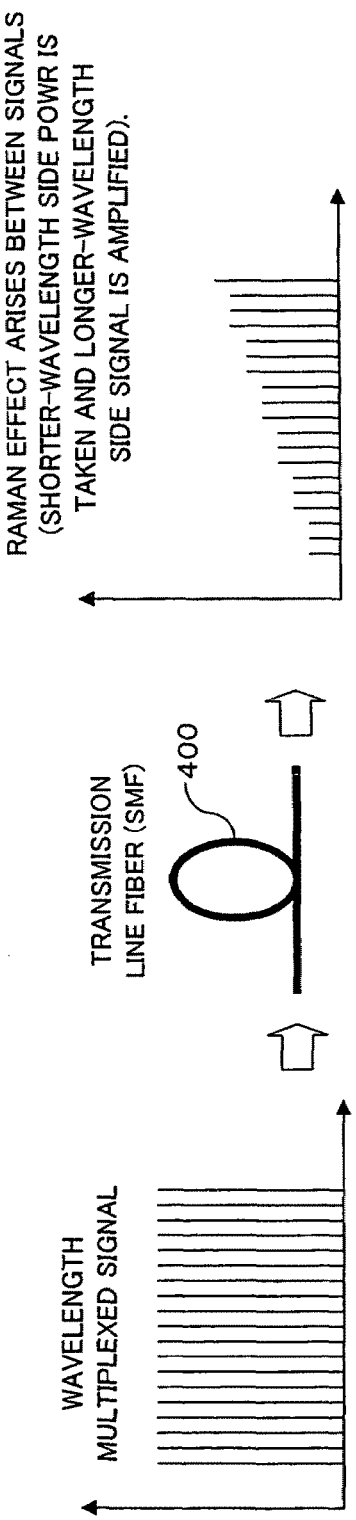
FIG. 23 is an illustration for explaining a Raman effect between signals.
Figure 24:
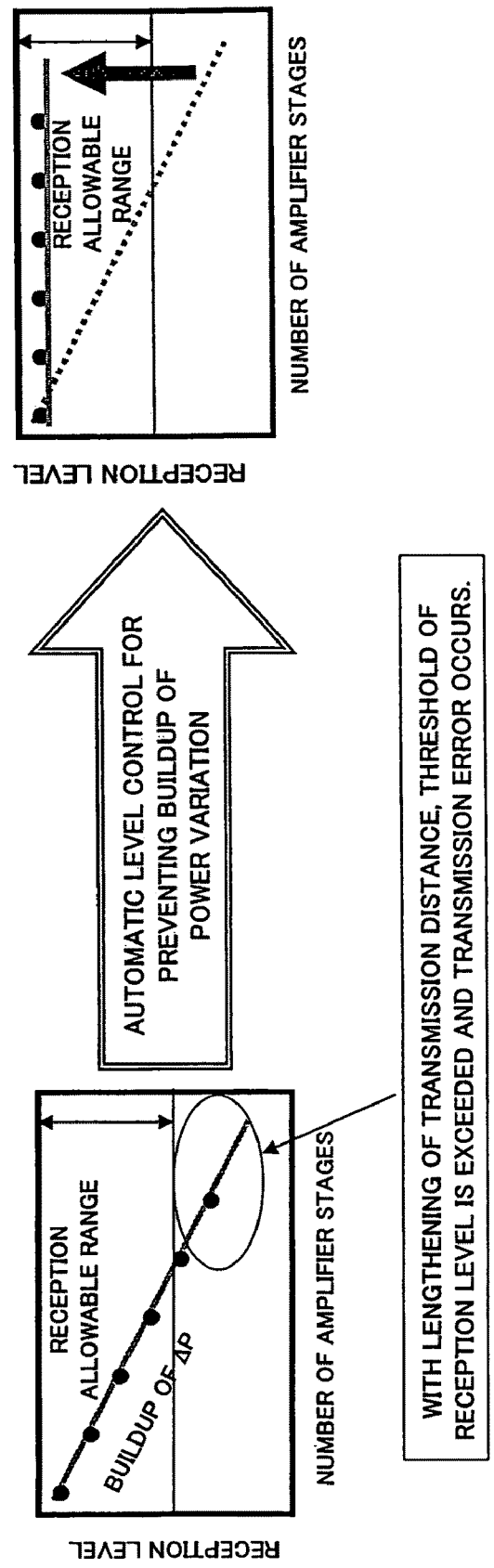
FIG. 24 is an illustration for explaining problems of a conventional technique.

FIG. 1 is a block diagram showing a configuration of a portion of a WDM optical transmission system according to a first embodiment of the present invention. The configuration shown in FIG. 1 corresponds to one span (from one OADM node 100 to an OADM node 100 adjacent thereto) of the system described above with reference to FIG. 16, and between the OADM nodes 100, there are provided an optical amplifier (post amplifier) 1, a transmission line 2, an optical amplifier (first preamplifier) 3, a dispersion compensation module (DCM) 4 and an optical amplifier (second preamplifier) 5.

In this configuration, the post amplifier 1 is for amplifying WDM signal from the former-stage OADM node 100 up to a predetermined signal power level, and an ALC according to the present invention is applied there to when a considerable variation in number of wavelengths occurs. Moreover, the preamplifier 3 is for amplifying WDM signal, transmitted in a state where a loss exists in the transmission line 2, to a predetermined signal power level. The DCM 4 is for compensating for the chromatic dispersion the WDM signal receives from the transmission line 2, and the preamplifier 5 is for amplifying inputted WDM signal up to a predetermined signal power level for compensating for the loss in the DCM 4.

With this configuration, the WDM signal transmitted from one OADM node 100 is transmitted to the next-stage OADM node 100 while being amplified by each of the aforesaid amplifiers 2, 3 and 5 and in a state where the compensation for the chromatic dispersion is made in the DCM 4. However, in this embodiment, the post amplifier 1 is made to easily and quickly measure the actual number of wavelengths included in the inputted WDM signal according to a special method for carrying out the automatic level control (ALC) (output power constant control), thereby reducing an output signal power variation (which will herein after be equally referred to simply as "power variation"), which occurs mainly due to three factors (SHB, gain deviation, SRS effect) when the number of wavelengths in the WDM signal varies suddenly, to a minimum.

That is, as shown in FIG. 3, with respect to a signal wavelength band (which will herein after be referred to equally as a "signal band") 40 of the inputted WDM signal, the post amplifier 1 according to the present invention monitors inputted light power for each of three bands of a wavelength band (hereinafter referred to as an "SHB band") 41 in which the power variation due to SHB dominantly occurs (the SHB effect dominantly appears), a wavelength band (hereinafter referred to as a "gain deviation band") 42 in which the power variation due to the gain deviation dominantly occurs (the gain deviation effect greatly appears) and a wavelength band (hereinafter referred to as an "SRS band") 43 in which the power variation due to the SRS effect greatly occurs (the SRS effect greatly appears) for estimating (approximate) the number of wavelengths included in each of the bands 41, 42 and 43 on the basis of each of the monitored values so as to obtain the number of wavelengths included in the signal wavelength band 40. Thus, at a variation in number of wavelengths, unlike the conventional technique, without receiving information on the number of wavelengths from the OSC or NMS and without carrying out the power monitoring for each wavelength included in the signal band 40, the number of signal wavelengths at the variation in number of wavelengths is easily and quickly obtained to adjust (correct) the AGC target gain, thereby carrying out the ALC.

Figure 5:
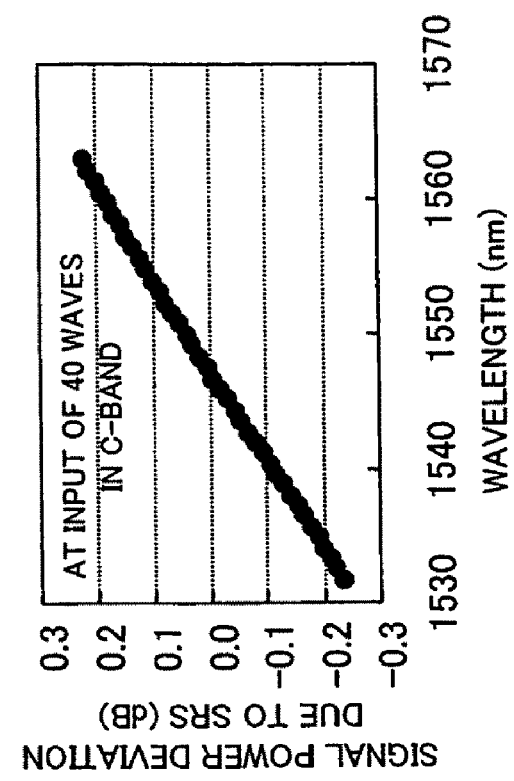
FIG. 5 is an illustration useful for explaining a band showing a strong SRS effect.
Figure 4:
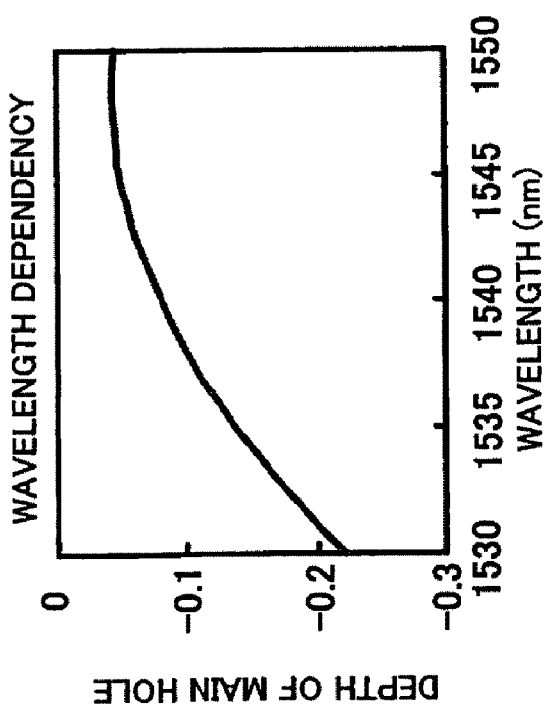
FIG. 4 is an illustration useful for explaining a band showing a strong SHB effect.

Each of the aforesaid SHB band 41 and the SRS band 43 correspond to a band in which the output signal power of the amplifier (optical amplifier) 1 per channel tends to decrease or in which the output signal power of the amplifier 1 per channel tends to increase at an increase in the number of signal wavelengths. Moreover, as shown in FIG. 4, the SHB effect (depth of a main hole) greatly appears when the wavelength is below 1540 nm and is generally constant when the wavelength is above 1545 nm and, hence, the SHB band 41 can be set to be, for example, 1530 to 1540 nm. Still moreover, as shown in FIG. 5, the SRS effect has an inclination having a generally linear deviation (dB) with respect to wavelengths at input of 40 waves in the C-band and, hence, the SRS band 43 can be set to be, for example, 1555 to 1565 nm.

Figure 2:
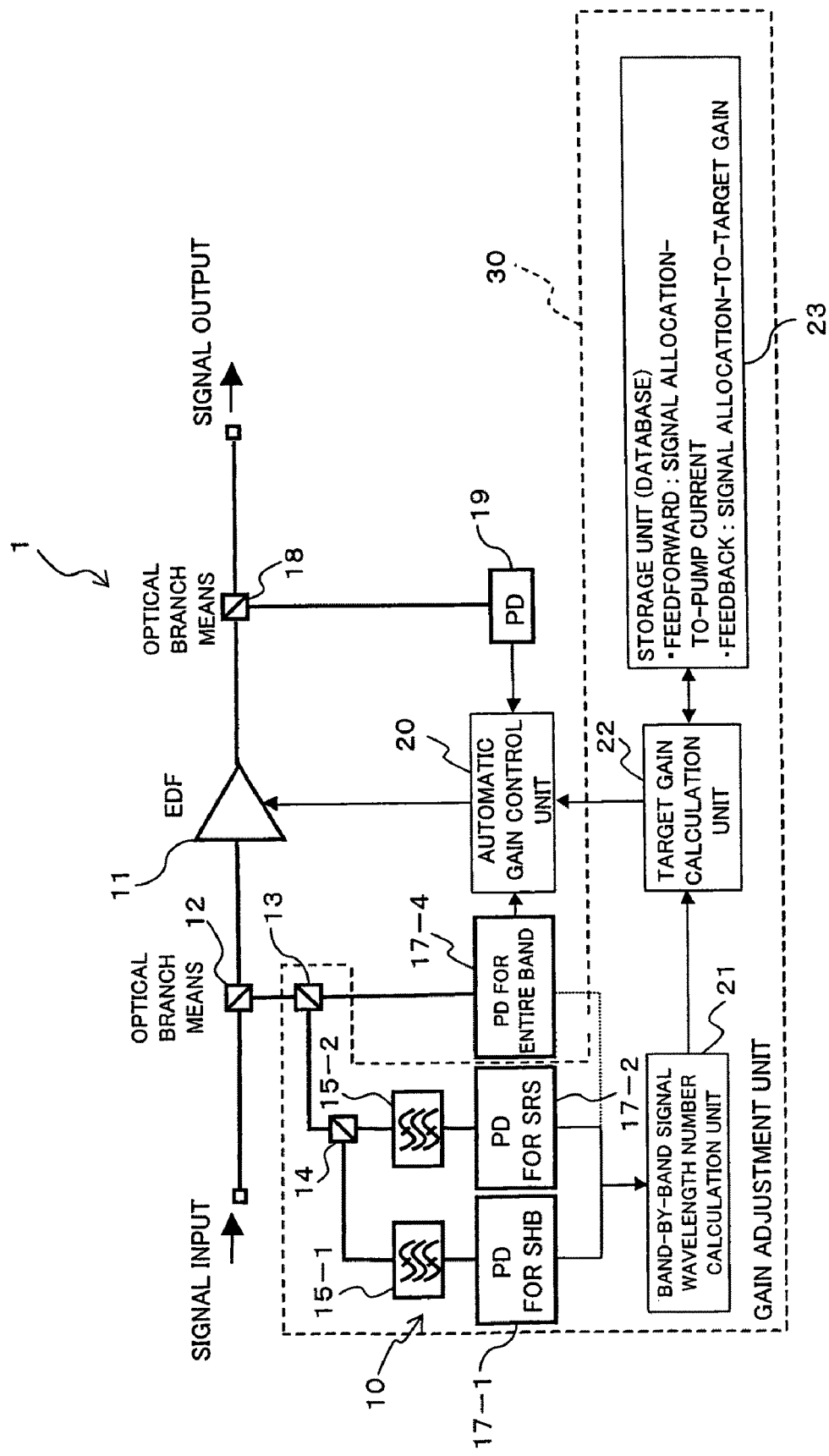
FIG. 2 is a block diagram showing a configuration of an optical amplifier (post amplifier) according to this embodiment.

For realizing the above-mentioned ALC, for example, as shown in FIG. 2, the amplifier 1 according to this embodiment includes an EDF 11 and, as elements constituting a control unit for the amplifier 1, on the input side of the EDF 11, optical couplers 12, 13 and 14 serving as input side optical branch means, band-pass filters 15-1, 15-2 and photodiodes (PD) 17-1, 17-2, 17-4 serving as light-receiving elements and, on the output side of the EDF 11, an optical coupler 18 serving as output side optical branch means and a PD 19 serving as a light-receiving element and, further, includes an automatic gain control unit (gain constant control) 20, a band-by-band (individual band) signal wavelength number calculation unit 21, a target gain calculation unit 22 and a storage unit (database) 23.

In this configuration, the optical coupler 12 is for power-separating a portion of the inputted signal light (WDM signal) as inputted monitor light to output it to the optical coupler 13, and the optical coupler 13 is for branching the inputted monitor light into two to input them to the optical coupler 14 and the PD 17-4 for the signal band 40. Moreover, the optical coupler (WDM coupler: 3 dB coupler) 14 divides the band of the inputted monitor light from the optical coupler 13 into two in the vicinity of a central wavelength of the signal band 40 to input them to the band-pass filters 15-1 and 15-2, and the band-pass filter 15-1 permits, of the inputted monitor light from the optical coupler 13, only a signal light component in the SHB band 41 to pass and, likewise, the band-pass filter 15-2 permits only a signal light component in the SRS band 43 to pass, and they have, for example, a band passage width of approximately 7 nm to 10 nm.

The PD 17-1 receives the signal light of the SHB band 41 passing through the band-pass filter 15-1 to output an electric signal with a level corresponding to the light reception quantity as a monitored value of the signal light power of the SHB band 41 to the band-by-band signal wavelength number calculation unit 21. Likewise, the PD 17-2 receives the signal light of the SRS band 43 passing through the band-pass filter 15-2 to output an electric signal with a level corresponding to the light reception quantity as a monitored value of the signal light power of the SRS band 43 to the band-by-band signal wavelength number calculation unit 21. Moreover, the PD 17-4 receives the signal light of the signal band 40 from the optical coupler 12 to output an electric signal with a level corresponding to the light reception quantity as a monitored value of the signal light power (total inputted light power) of the signal band 40 to the automatic gain control unit 20.

That is, the optical amplifier 1 according to the present invention monitors the inputted signal light powers of the SHB band 41 and the SRS band 43 through the use of the PD 17-1 and the PD 17-2, and monitors the signal light power (total inputted light power) of the signal band 40 through the use of the PD 17-4. In other words, the above-mentioned optical couplers 13, 14, the band-pass filters 15-1, 15-2 and the PDs 17-1, 17-2 function as a band-by-band (individual band) input light monitoring unit 10 to separately monitor the inputted signal light power of each of the SHB band 41 and the SRS band 43. It is possible to obtain the signal light power of a band other than the SHB band 41 and the SRS band 43, i.e., the gain deviation band 42, by subtracting the respective monitored values on the SHB band 41 and the SRS band 43 from the monitored value of the PD 17-4. Naturally, it is also acceptable to provide a PD for each of the bands 41, 42 and 43 for monitoring the inputted light power thereof, as will be described later with reference to FIGS. 14 and 15.

The optical coupler 18 is for separating a portion of the output light of the EDF 11 as a monitor light to input it to a PD 19, and the PD 19 receives the outputted monitor light from the optical coupler 18 to output an electric signal with a level corresponding to the light reception quantity to the automatic gain control unit 20.

The band-by-band signal wavelength number calculation unit 21 estimates (approximates) the number of signal light wavelengths included in each of the SHB band 41, the gain deviation band 42 and the SRS band 43 on the basis of the monitored value of the signal light power of each of the bands 41, 42 and 43. For example, the monitor values of the SHB band 41 and the SRS band 43 and the signal light power obtained through the calculation on the gain deviation band 42 interposed between these bands 41 and 43 are divided by a signal light power designed for one wavelength (channel), and of these values, a value closest to the nth power of 2 (1, 2, 4, 8, 16, . . . ) can be selected and determined as the number of signal light wavelengths.

Figure 6A:
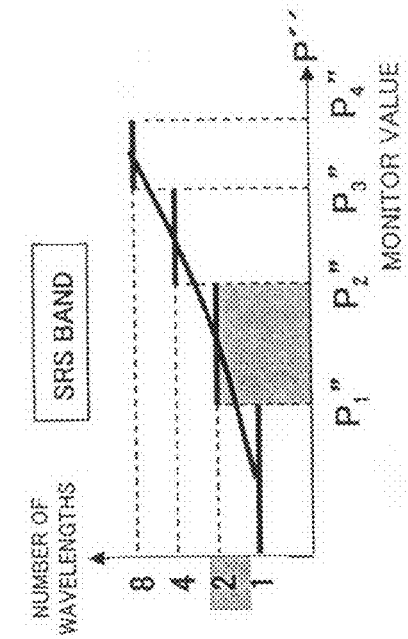
FIGS. 6(A) to 6(C) are illustrations of the relationship between the numbers of signal wavelengths to be obtained from inputted light monitored values in divided bands for explaining an operation of an individual band signal wavelength number calculation unit shown in FIG. 2.

In more detail, for example, as shown in FIG. 6(A), thresholds $P_1$, $P_2$, $P_3$, $P_4$, . . . are set with respect to the monitored value P on the SHB band 41, and the number of signal wavelengths of the SHB band 41 can be obtained (approximated) such that, if $P \leqq P_1$, the number of signal wavelengths=$2^0$=1, if $P_1 < P \leqq P_2$, the number of signal wavelengths=$2^1$=2, if $P_2 < P \leqq P_3$, the number of signal wavelengths=$2^2$=4, and if $P_3 < P \leqq P_4$, the number of signal wavelengths=$2^2$=8.

Figure 6B:
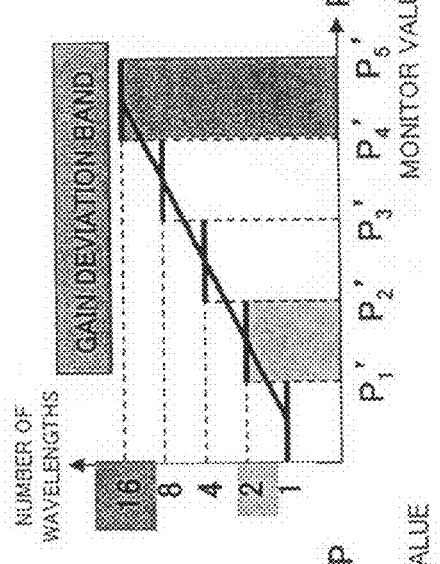
Figure 6C:
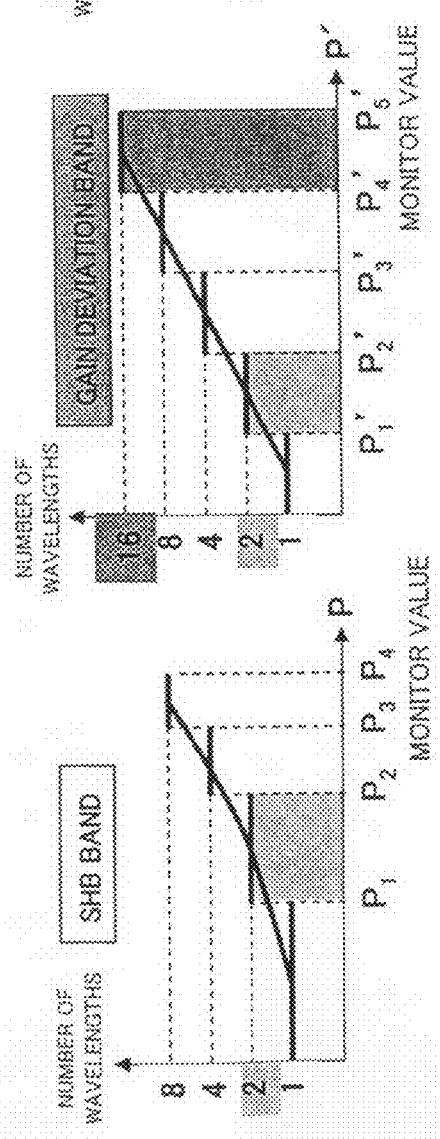

In like manner, as shown in FIG. 6(B), thresholds $P_1'$, $P_2'$, $P_3'$, $P_4'$, $P_5'$, . . . are set with respect to the monitored value P' on the gain deviation band 42, and the number of signal wavelengths of the gain deviation band 42 can be obtained such that, if $P' \leqq P_1'$, the number of signal wavelengths=$2^0$=1, if $P_1' < P' \leqq P_2'$, the number of signal wavelengths=$2^1$=2, if $P_2' < P' \leqq P_3'$, the number of signal wavelengths=$2^2$=4, if $P_3' < P' \leqq P_4'$, the number of signal wavelengths=$2^3$=8, and if $P_4' < P' \leqq P_5'$, the number of signal wavelengths=$2^4$=16. Moreover, as shown in FIG. 6(C), thresholds $P_1''$, $P_2''$, $P_3''$, $P_4''$, . . . are set with respect to the monitored value P'' on the SRS band 43, and the number of signal wavelengths of the SRS band 43 can be obtained such that, if $P'' \leqq P_1''$, the number of signal wavelengths=$2^0$=1, if $P_1'' < P_1'' \leqq P_2''$, the number of signal wavelengths=$2^1$=2, if $P_2'' < P'' \leqq P_3''$, the number of signal wavelengths=$2^2$=4, and if $P_3'' < P'' \leqq P_4''$, the number of signal wavelengths=$2^3$=8.

However, for the calculation of the number of signal wavelengths as described above, there is a case in which it is required to consider the ASE power applied from the upstream side. In this case, it is acceptable that the ASE power of the upstream side optical amplifier is received through the use of a monitor signal or the like and the ASE power is divided according to the band widths of the bands 41, 42 and 43 and subtracted from the monitored values of the bands 41, 42 and 43 so that the number of signal wavelengths can be calculated on the basis of these values.

In addition, it is preferable that the aforesaid thresholds are set on the basis of the features of the power variations of the respective bands 41, 42 and 43. Accordingly, it is preferable that they are different among the respective bands 41, 42 and 43. For example, in the case of the SHB band 41, since the signal light power tends to decrease due to the influence of SHB, it is preferable that the threshold therefor is set to be smaller than the threshold for the gain deviation band 42. Moreover, in the case of the SRS band 43, since the influence of SRS disappears and the signal light power tends to decrease, likewise, it is preferable that the threshold therefor is set to be smaller than the threshold for the gain deviation band 42.

The storage unit 23 is made to store the aforesaid thresholds for the bands, the aforesaid ASE power information, the design value of inputted signal power per wavelength, the signal (wavelength) allocation-to-pump current information needed for the feedforward control, and the signal (wavelength) allocation-to-target gain information needed for the feedback control.

Figure 7:
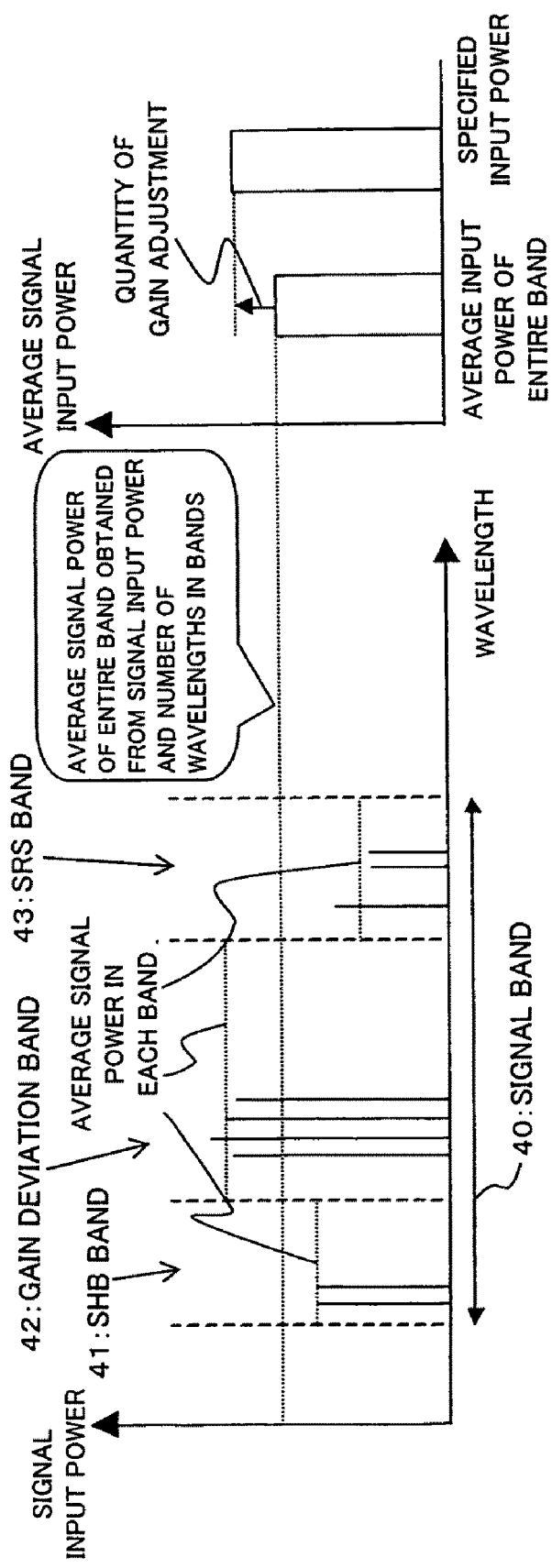
FIG. 7 is an illustration of examples of input signal light power in a signal wavelength band, average input signal light power in the signal wavelength band and a specified input signal light power for explaining an operation of a target gain calculation unit shown in FIG. 2.

For example, as shown in FIG. 7, the target gain calculation unit (target gain correction unit) 22 calculates average inputted signal power per wavelength for each of the bands 41, 42 and 43 from the information on the number of wavelengths obtained by the aforesaid band-by-band signal wavelength number calculation unit 21 and obtains the average input light signal power of the entire signal band 40 on the basis of a result of the calculation to obtain a correction quantity (gain correction quantity) on the target gain needed for the cancellation of a difference from a specified inputted signal power, and the automatic gain control unit 20 adjusts (corrects) the gain of the EDF 11 in accordance with this gain correction quantity, thus suppressing the variation in output signal power level. As will be mentioned later, this target gain calculation unit 22 can also obtain a difference from the specified target output signal power per wavelength as the aforesaid gain correction quantity after the calculation of the average inputted signal power per wavelength. Moreover, it is also appropriate that, instead of the gain correction quantity, a new target gain reflecting this gain correction quantity is set with respect to the automatic gain control unit 20.

A detailed description will be given hereinbelow of a gain control method for the optical amplifier 1 according to this embodiment thus configured.

Figure 8:
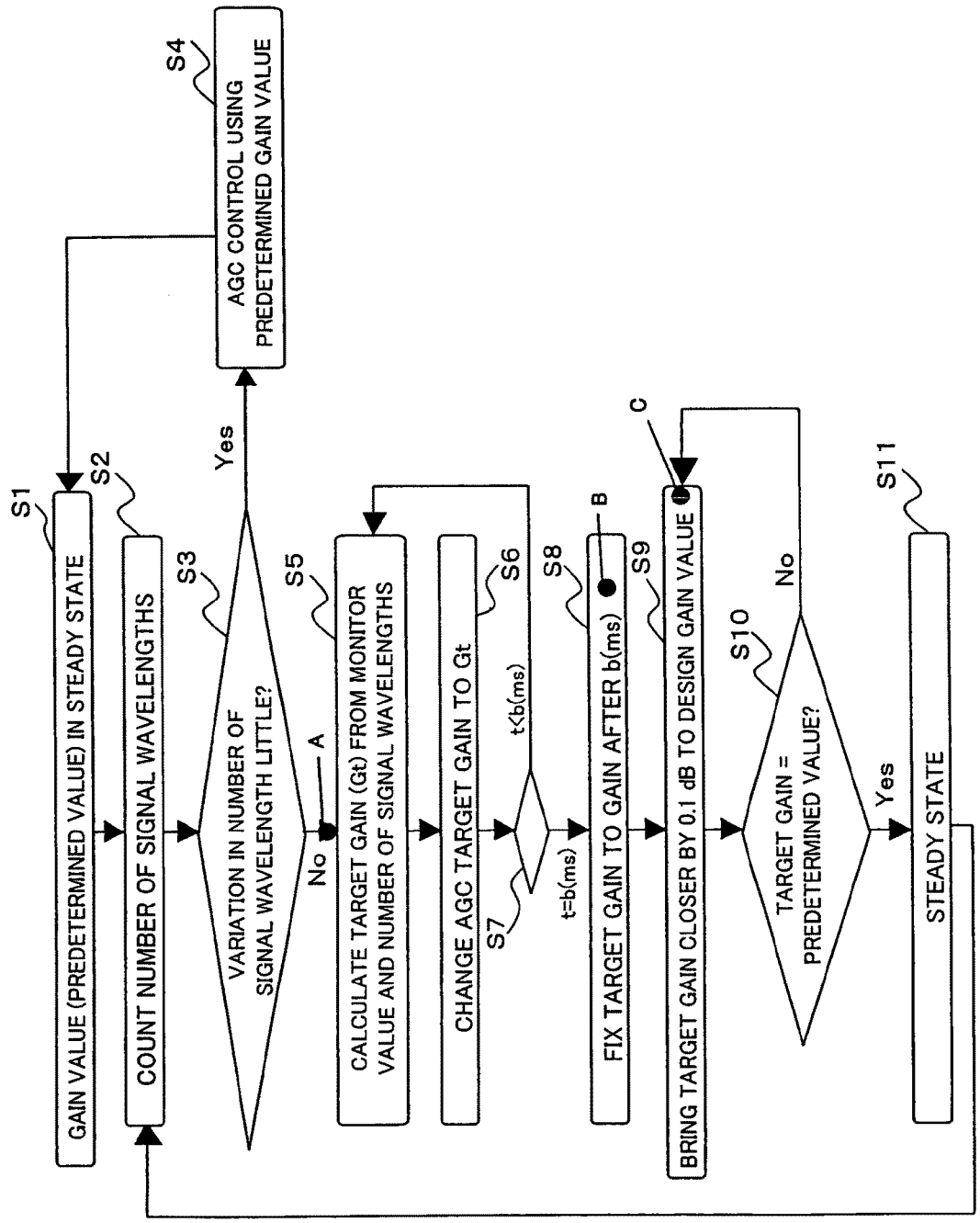
FIG. 8 is a flowchart useful for explaining a gain control method for the optical amplifier shown in FIG. 2.

For example, as shown in FIG. 8, in the steady state (state in which the variation of the number of signal wavelengths is smaller than a specified value), the automatic gain control unit 20 carries out the automatic gain control on the basis of the monitored values of the input/output light power of the EDF 11 obtained by the PD 17-4 and the PD 19 so that the gain of the EDF 11 reaches a predetermined gain value (steps S1, S2 and, through Yes route of step S3, step S4). At this time, as mentioned above, the band-by-band signal wavelength number calculation unit 21 of the gain adjustment unit 30 counts the number of signal wavelengths in each of the bands 41, 42 and 43 so as to monitor the variation in the number of signal wavelengths (steps S2, S3).

In this state, for example, assuming that more-than-half (39 channels of 40 channels) of all the number of signal wavelengths are not inputted because of the occurrence of a trouble or the like so that the total inputted light power to the optical amplifier 1 (monitored by the PD 17-4) considerably decreases (see an arrow 51 and reference mark A in FIG. 9), the target gain calculation unit 22 calculates the average inputted signal power per wavelength on the basis of the information on the number of wavelengths obtained by the band-by-band signal wavelength number calculation unit 21 so as to obtain a target gain from this average inputted signal power and the target output signal power.

In more detail, first of all, the band-by-band signal wavelength number calculation unit 21 calculates the number of wavelengths (m'_k) included in each of the bands 41, 42 and 43 according to the following equation (1) on the basis of an inputted monitored value of inputted light power (Pin_mon_k) for each of the bands 41, 42 and 43, and ASE power (Pase_k) for each of the bands 41, 42 and 43 and specified signal power (Pin_design) acquired in advance.

$$m'\_k = (Pin\_mon\_k - Pase\_k)/Pin\_design \quad (1)$$

Moreover, the number of wavelengths (m'_k) obtained is quantized by the aforesaid threshold and the approximated number of wavelengths (m_k) is determined. For example, if $0.7 \leq m'\_k < 1.41$, m_k=1, if $1.41 \leq m'\_k < 2.82$, m_k=2, if $2.82 \leq m'\_k < 5.15$, m_k=4, if $5.15 \leq m'\_k < 11.3$, m_k=8, and if $11.3 \leq m'\_k < 22.6$, m_k=16. The maximum value of the approximated number of wavelengths m_k is limited to the maximum number of wavelengths included in each band. Moreover, it is preferable that, as mentioned above, the threshold for obtaining the approximated number of wavelengths m_k has a different value for each of the bands 41, 42 and 43.

Following this, the band-by-band signal wavelength number calculation unit 21 sets the sum total of the approximated numbers of wavelengths m_k in the respective bands 41, 42 and 43, thus obtained, as the total number of wavelengths m in the signal band 40 and determines the signal input power (Pin) per wavelength according to the following equation (2) on the basis of the calculated number of wavelengths m. In the following equation (2), Pase represents the sum total of the ASE powers Pase_k for the respective bands 41, 42 and 43.

$$Pin = (Pin\_mon\_k - Pase)/m \quad (2)$$

Furthermore, on the basis of the signal input power Pin per wavelength, thus obtained, and the target output signal power (Pout_target), the target gain calculation unit 22 determines a target gain (Gt) according to the following equation (3) (from No route of step S3 to step S5).

$$Gt = Pout\_target/Pin \quad (3)$$

The automatic gain control unit 20 changes the target gain (predetermined value) in the steady state to the target gain Gt thus calculated (step S6). Subsequently, until a predetermined period of time t=b (time sufficiently slower than the control response time to be taken for the system level adjustment) elapses (until t=b in the step S7), the target gain Gt is calculated in the band-by-band signal wavelength number calculation unit 21 and the target gain calculation unit 22, and the automatic gain control unit 22 adjusts (corrects) the pump power to the EDF 11 at a high speed in accordance with the target gain Gt thus updated in succession (changes the AGC target gain to Gt), and suppresses the transient variation occurring at a high-speed, for example, on the order of 1 μs while following it (through route indicated by "t<b" in step S7 to steps S5 and S6, and see a solid line waveform 52 in FIG. 9). For example, since an optical variable attenuator (not shown) for the output adjustment in the OADM node 100 usually starts to work after the response of the optical amplifier 1, the aforesaid predetermined time t=b is a time to be taken until the output of the optical amplifier 1 and the response of the optical variable attenuator in the OADM node 100 become stable.

Figure 9:
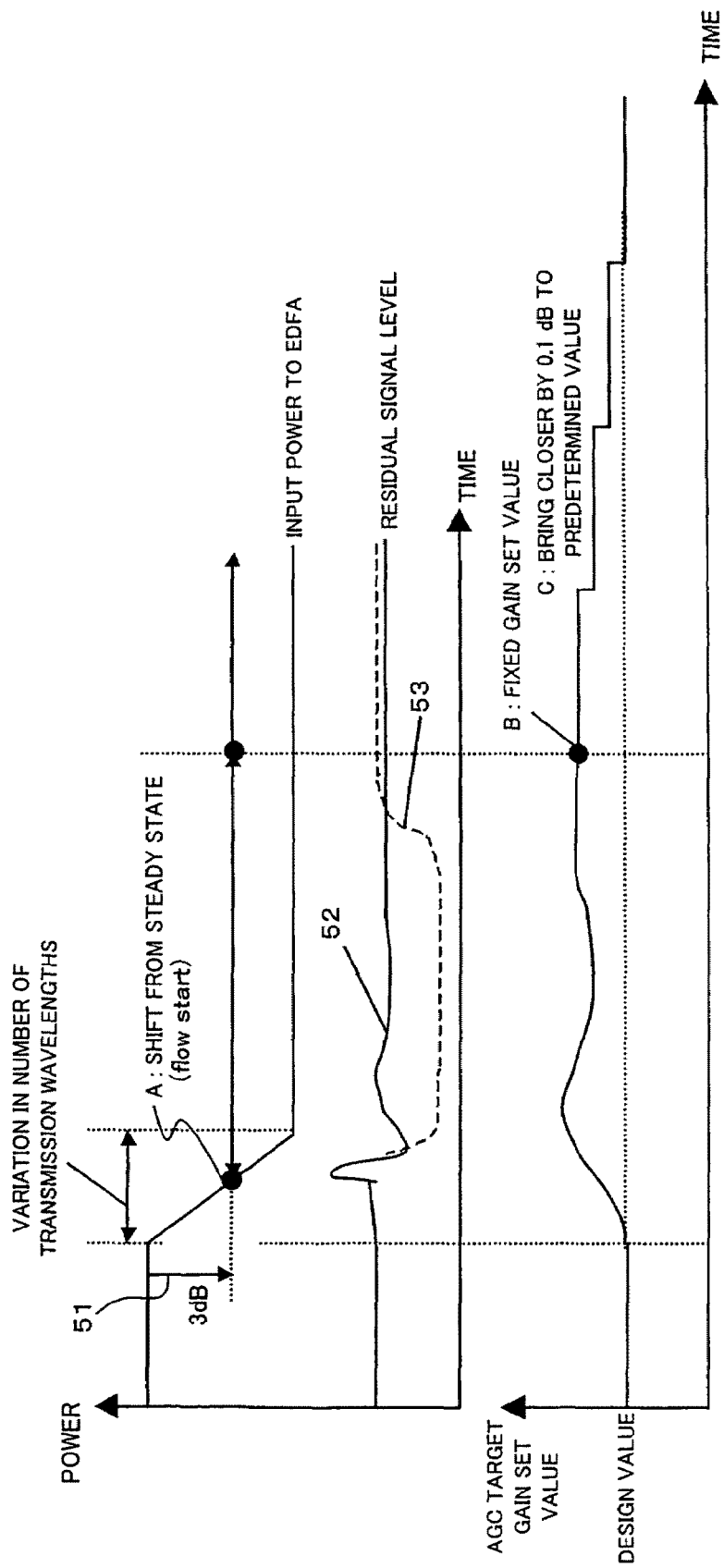
FIG. 9 is an illustration of a control image for target gain setting for explaining the gain control method for the optical amplifier shown in FIG. 2.

Thereafter, when the aforesaid predetermined time elapses, the automatic gain control unit 20 once fixes the target gain Gt to a value at that time (step S8, and see reference mark B in FIG. 9) and, after carrying out the automatic gain control (feedback control) on the basis of the input/output monitored values obtained by the input PD 17-4 and the output PD 19 which monitor the entire signal band 40 of the optical amplifier 1, brings the target gain Gt gradually closer to a design gain value (predetermined value) for a time slower than the response times of the other active devices to be used for the transmission system (for example, by 0.1 dB) (step S9, Yes route of step S10, and see reference mark C in FIG. 9). When the target gain Gt reaches the aforesaid design gain value, the automatic gain control unit 20 shifts to the control to be implemented in the steady state (through Yes route of step S10 to step S11).

Since, as described above, the target gain Gt is updated in succession on the basis of the number of signal wavelengths calculated for each of the SHB band 41, the gain deviation band 42 and the SRS band 43 so as to carryout the gain adjustment (correction) at a high speed, as indicated by the solid line 52 in FIG. 9, even if the inputted light power to the optical amplifier 1 varies suddenly due to a rapid variation of the number of signal wavelengths stemming from the occurrence of a trouble or the like, it is possible to suppress the variation (transient variation) of the output signal power level (residual signal power level) to a minimum (that is, to realize the ALC), so the accumulation of the transient output power variation is suppressible. In FIG. 9, a dotted-line waveform 53 depicts a transient variation of residual signal light level in the case of a conventional AGC control, and it is found therefrom that a larger transient variation occurs in comparison with the control according to this embodiment.

Figure 10:
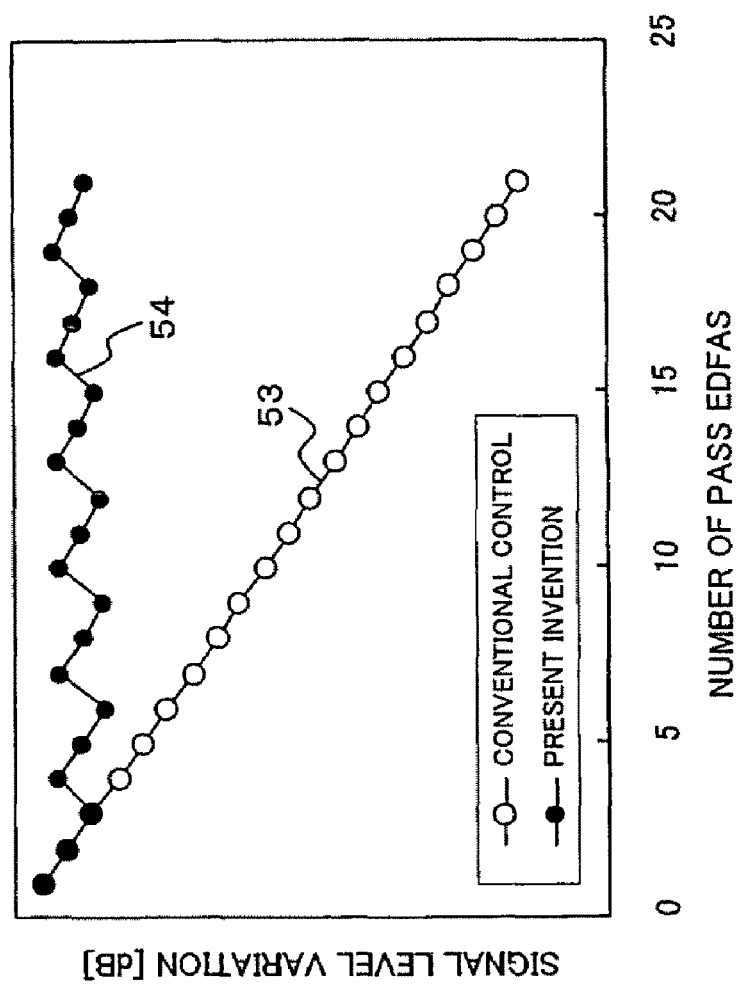
FIG. 10 is an illustration of one example of a signal level variation with respect to the number of transit EDFAs for explaining the effects of the gain control method for the optical amplifier shown in FIG. 2 in comparison with a conventional technique.
Figure 11:
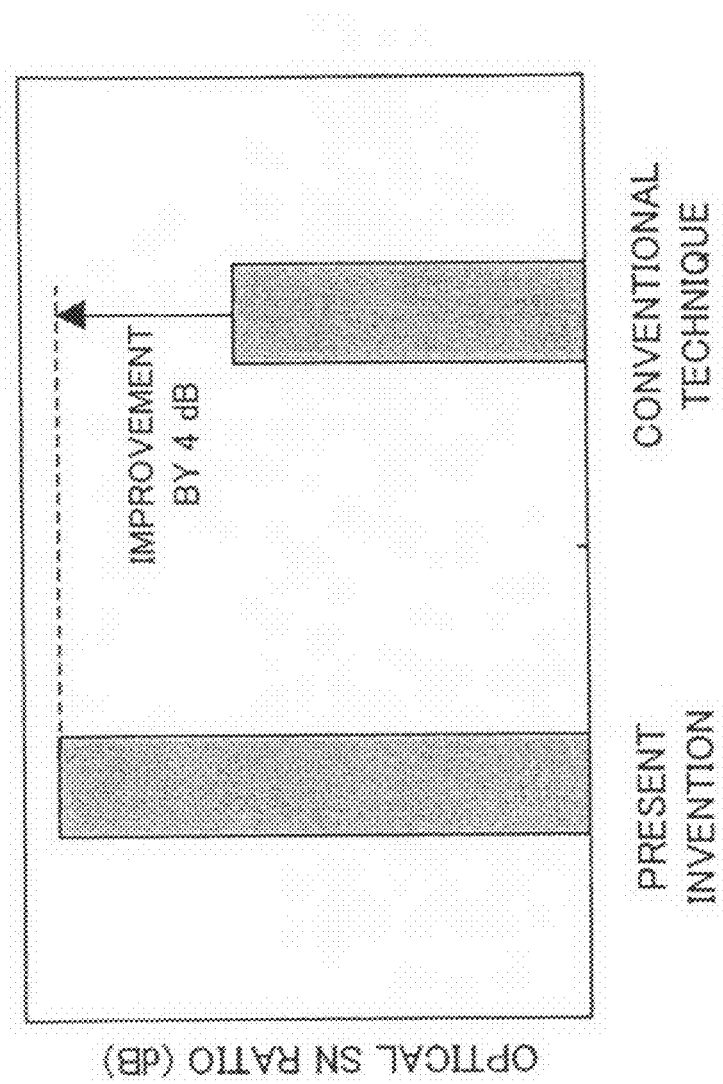
FIG. 11 is an illustration of one example of optical SN ratio for explaining the effects of the gain control method for the optical amplifier shown in FIG. 2 in comparison with a conventional technique.
Figure 25:
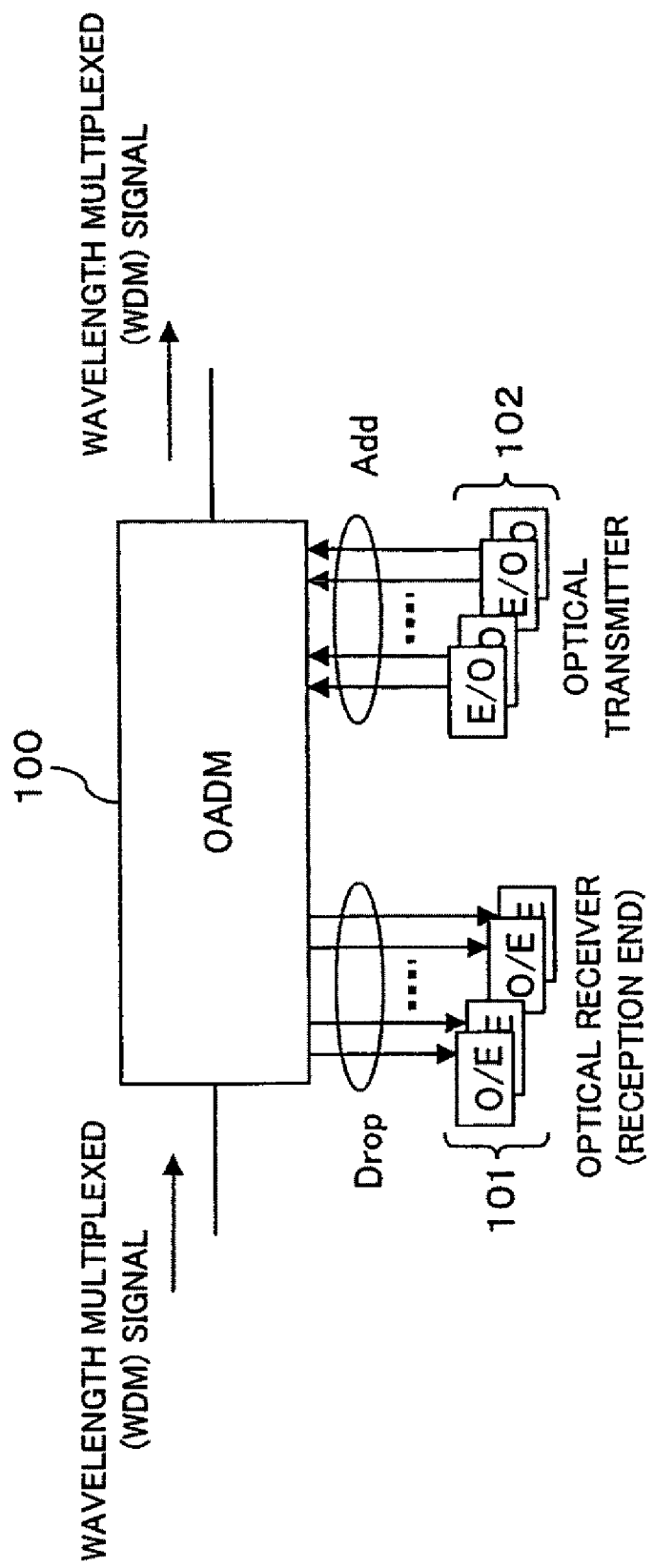
FIG. 25 is a block diagram for explaining a signal reception end.

Therefore, for example, as shown in FIG. 10, in the case of a transmission system employing the conventional AGC, when the maximum number of transmission wavelengths is 40 channels and the disconnection occurs with respect to 39 channels thereof, the variation quantity of the residual signal power decreases whenever it passes through the optical amplifier 1 (see reference numeral 53), whereas, when the optical amplifier (AGC) according to the present invention is applied to the post amplifier 1 placed on the output side of the OADM node 100, the residual signal power variation can be reduced to approximately 1/10 (see reference numeral 54). This signifies improvement of approximately 4 dB as optical SN ratio at the signal reception end (for example, the optical amplifier 101 in FIG. 25).

Moreover, since the signal band 40 is divided into three to monitor the inputted light power of each of the bands 41, 42 and 43, unlike the conventional technique, there is no need to prepare a wavelength demultiplexer (DEMUX) made to perform demultiplexing in units of wavelengths for obtaining the number of signal wavelengths, so the degradation of the noise characteristic (NF) is suppressible.

[A1] Modification of Gain Control Method

Secondly, a description will be given hereinbelow of another example of the above-described gain control method.

The target gain Gt can be calculated on the basis of a test result on the gain characteristics of the optical amplifier 1, whose states are the wavelength allocation of before and after the variation of the number of signal wavelengths or all the wavelengths are inputted, for example. The target gain Gt calculated in advance is held in the data base 23 (see FIG. 2) in the optical amplifier 1 and the target gain Gt is updated (selected) referring to the database 23 when the wavelength allocation and the number of signal wavelength vary.

In this case, for example, the target gain calculation method is made as follows.

(1) In a case in which, in a state where the number of signal wavelengths in the SHB band 41 is large (the number exceeding a predetermined value remains), the number of the signal wavelengths in the other bands 42 and 43 (particularly, the gain deviation band 42) decreases considerably (below a predetermined value), the target gain Gt is decreased from the gain value in the steady state.

(2) In a case in which the number of signal wavelengths in the SHB band 41 decreases considerably (below a predetermined value), the target gain Gt is increased from the gain value in the steady state.

(3) In a case in which the number of signal wavelengths before a variation in the number of wavelengths in the SHB band 41 is small (less than a specified value k), the target gain Gt is not changed.

(4) In a case in which the number of signal wavelengths in the SHB band 41 decreases considerably (less than the specified value k) and the number of signal wavelengths does not exceed a specified value m, the target gain Gt is increased from the gain value in the stead state.

(5) In a case in which, from the state the number of signal wavelengths in the entire signal band 40 exceeds the specified value n, the number of signal wavelengths in other than the SRS band 43 does not exceed a specified value p and a decision is made such that the number of signal wavelengths left in the SRS band 43 is small, the target gain Gt is increased from the gain value in the steady state.

On the basis of the above-mentioned updating operations, the gain adjustment quantity is determined in accordance with the gain wavelength characteristic of the optical amplifier 1.

(6) In a case in which, in a state where the number of signal wavelengths is large in a band whose average gain is high, the number of signal wavelengths in the other band decreases considerably, the target gain Gt is increased from the gain value in the steady state.

(7) In a case in which, in a state where the number of signal wavelengths is large in a band whose average gain is low, the number of signal wavelengths in the other band decreases considerably, the target gain Gt is decreased from the gain value in the steady state.

FIG. 12 shows an example of a result of calculation (target gain setting table) of the target gain Gt for realizing the above-mentioned operations. The target gain setting table 231 shown in FIG. 12 is previously held in the aforesaid database 23. In the table 231 shown in FIG. 12, "before" represents "state before variation of the number of signal wavelengths" and "after" represents "state after variation of the number of signal wavelengths", while the black circle mark depicts that the number of signal wavelengths in the band 41, 42 or 43 exceeds a given number of wavelengths (specified value), and the white circle mark denotes that the number of signal wavelengths in the band 41, 42 or 43 does not exceed a given number of wavelengths (specified value).

Therefore, as one example, in this table 231, at the line indicated by reference mark A, before and after the variation of number of wavelengths, in a situation that signal wavelengths, the number of which exceeds a given number of wavelengths (many in number), remain in the SHB band 41 while signal wavelengths, the number of which does not exceed the given number of wavelengths (small in number), remain in each of the gain deviation band 42 and the SRS band 43, the target gain Gt is decreased and, likewise, at the line indicated by reference mark B therein, before and after the variation of number of wavelengths, in a situation that signal wavelengths, the number of which does not exceeds the given number of wavelengths (small in number), remain in each of the SHB band 41 and the SRS band 43 while signal wavelengths, the number of which exceeds the given number of wavelengths (many in number), remain in the gain deviation band 42, the target gain Gt is increased.

In this case, when the number of signal wavelengths (wavelength allocation) varies, the target gain calculation unit 22 (see FIG. 2) sees (makes a retrieval on) the aforesaid table 231 on the number of signal wavelengths (wavelength allocation) of each of the bands 41, 42 and 43 obtained by the band-by-band signal wavelength number calculation unit 21 to select the corresponding target gain Gt, thus updating the target gain Gt in succession.

Figure 13:
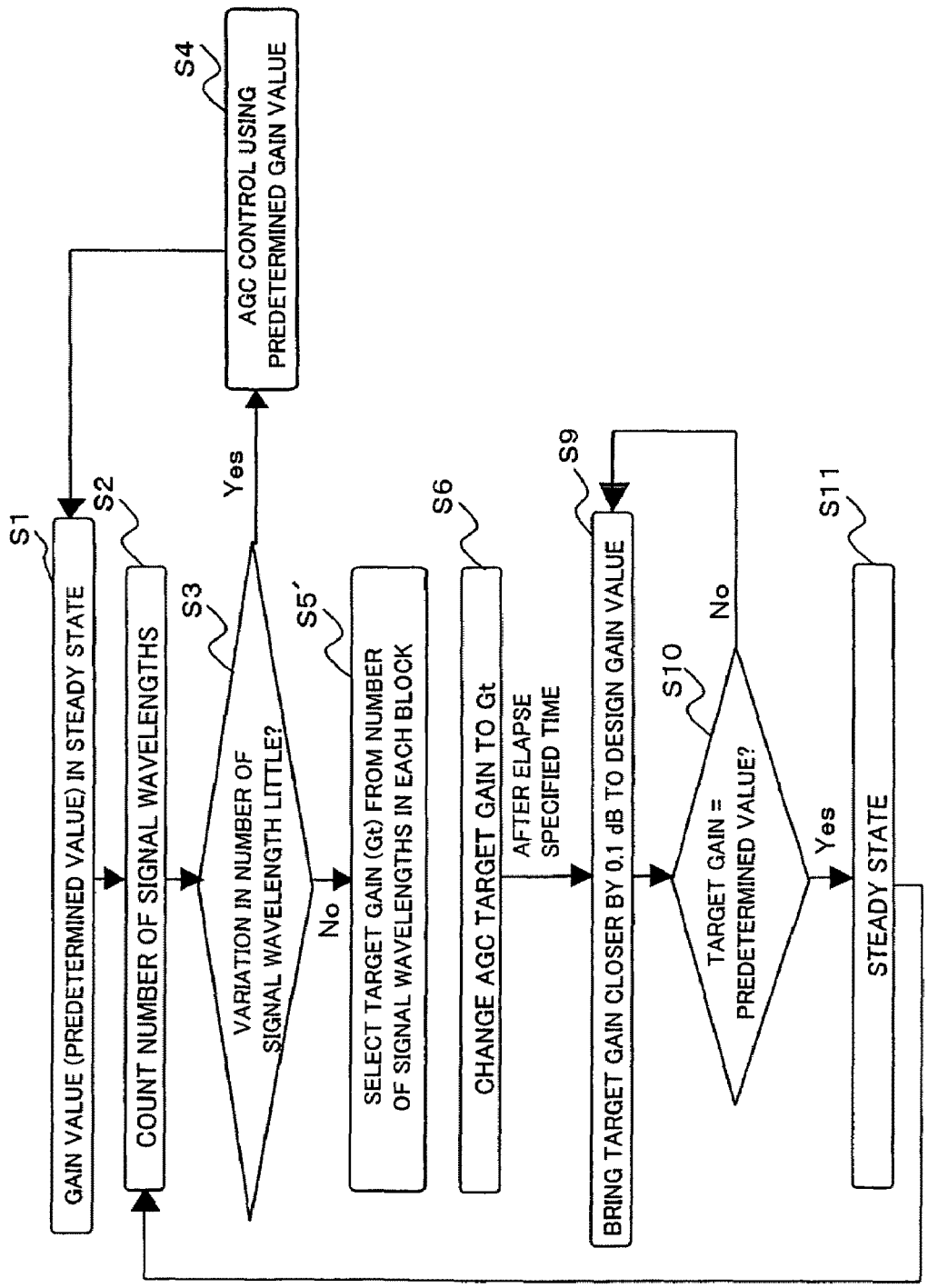
FIG. 13 is a flow chart useful for explaining a modification of the gain control method according to this embodiment.

With reference to a flow chart of FIG. 13, a description will be given hereinbelow of a gain control method according to this example.

First, also in this modification, in the steady state (in a state where the variation of the number of signal wavelengths is smaller than the allowable quantity), the automatic gain control unit 20 carries out the automatic gain control on the basis of the input/output monitored values of the EDF 11 obtained by the PD 17-4 and the PD 19 so that the gain of the EDF 11 reaches a predetermined gain value (steps S1, S2 and, through Yes route of step S3, step S4). At this time, the band-by-band signal wavelength number calculation unit 21 of the gain adjustment unit 30 counts the number of signal wavelengths of each of the bands 41, 42 and 43 as mentioned above for monitoring the variation in the number of signal wavelengths (steps S2, S3).

In this state, for example, assuming that more-than-half (39 channels or the like of 40 channels) of all the number of signal wavelengths are not inputted because of the occurrence of a trouble or the like so that the inputted light power to the optical amplifier 1 (monitored by the PD 17-3) decreases by 3 dB (see the arrow 51 in FIG. 9), the target gain calculation unit 22 confirms the wavelength allocation and the variation in the number of wavelengths on the basis of the information on the number of wavelengths for each of the bands 41, 42 and 43 obtained by the band-by-band signal wavelength number calculation unit 21 and refers to the target gain setting table 231 of the database 23 on the basis of these for acquiring (selecting) the corresponding target gain Gt [gain adjustment quantity (pump source drive current value)] (through No route of step S3 to step S5').

The automatic gain control unit 20 carries out the pump power control in accordance with the setting of the target gain Gt by the target gain calculation unit 22 (changes the AGC target gain to Gt), thereby suppressing the transient variation occurring, for example, at a high speed on the order of 1 μs while following it (step S6, and see the solid line waveform 52 in FIG. 9). Following this, the automatic gain control unit 20 implements the automatic gain control (feedback control) on the basis of the input/output monitored values obtained by the input PD 17-4, made to monitor the entire signal band 40 of the optical amplifier 1, and the output PD 19 (see FIG. 2). However, the gain is set as the target gain Gt.

Moreover, after the elapse of a given time of period, the automatic gain control unit 20 brings the target gain Gt closer to the design gain value (predetermined value) more slowly (for example, by 0.1 dB) with respect to the response time of the other active devices (step 9, Yes route of step S10, and see reference mark C in FIG. 9). When the target gain Gt reaches the aforesaid design gain value, the automatic gain control shifts the control to the control in the steady state (through Yes route of step S10 to step S11).

In the case of the upgrade by a Raman amplification, a monitor for coping with this transient response can also be used as a tilt monitor of the Raman amplifier.

As described above, according to this modification, with simple and quick control in which the target gain Gt is selected/set from the target gain setting table 231 of the database 23 on the basis of the number of signal wavelengths calculated for each of the SHB band 41, the gain deviation band 42 and the SRS band 43, as well as the above-described embodiment, it is possible to suppress the variation (transient variation) of the output signal power level (residual signal power level) to a minimum, thereby enabling the suppression of the accumulation of the transient output power variation.

Therefore, also in this modification, even if disconnection occurs with respect to 39 channels of the maximum number of transmission wavelengths, the variation quantity of the residual signal power is suppressible to approximately $\frac{1}{10}$, and an improvement of approximately 4 dB is achievable as the optical SN ratio at the signal reception end.

[A2] Modification of Band-by-Band Input Light Monitoring Unit 10

Although in the above-described embodiment the PD 17-1 and the PD 17-2 monitor the inputted signal power for each of the SHB band 41 and the SRS band 43 in the signal band 40 and the inputted signal power of the gain deviation band 42 is calculated by subtracting the monitor values obtained by these PDs 17-1 and 17-2 from the monitor value obtained by the PD 17-4, it is also possible to monitor the inputted signal power through the use of a PD for each of the three bands 41, 42 and 43.

Figure 14:
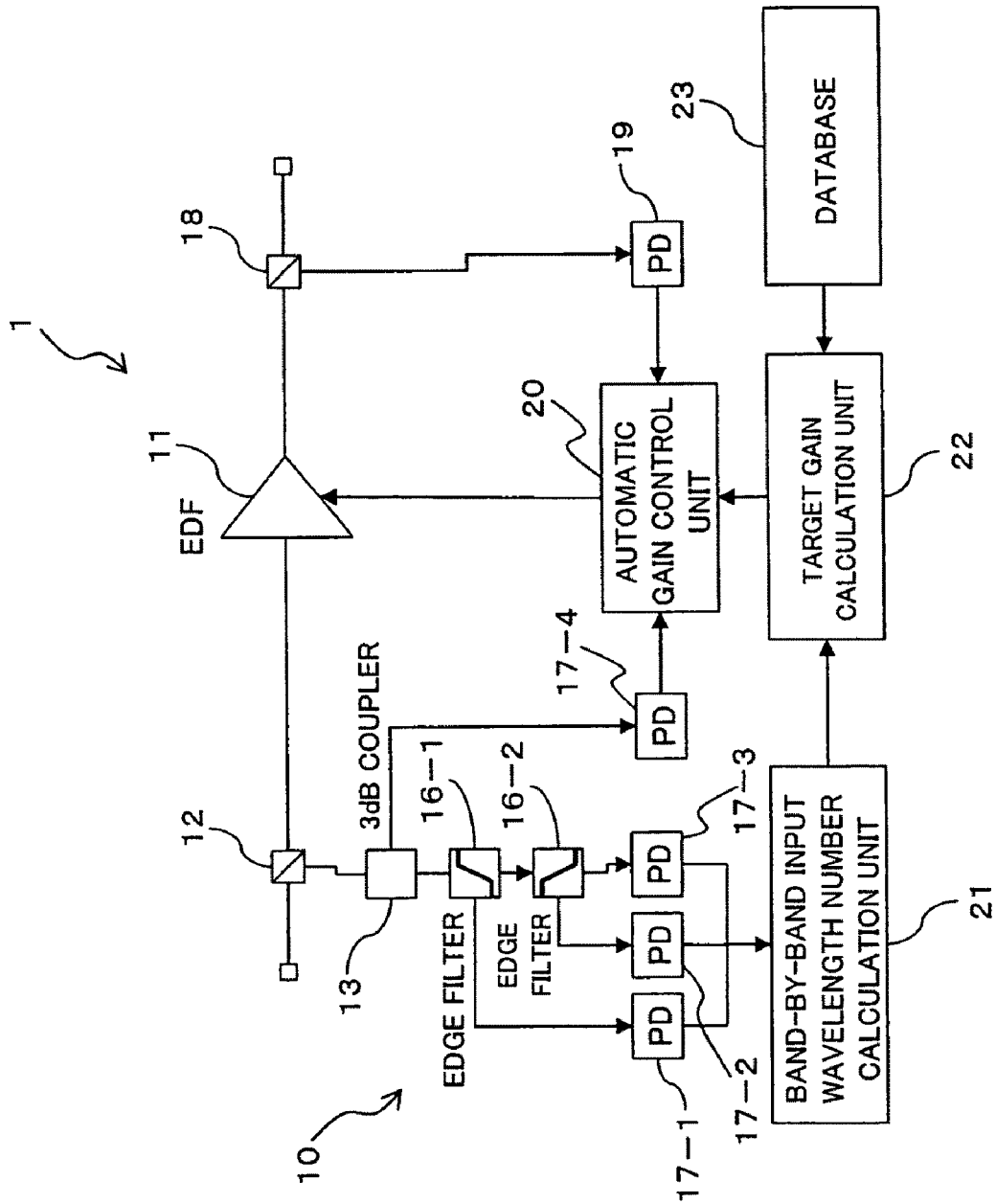
FIG. 14 is a block diagram showing a modification of input monitoring means shown in FIG. 2.

That is, for example, as shown in FIG. 14, a PD 17-1, a PD 17-2 and a PD 17-3 are prepared for the SHB band 41, the gain deviation band 42 and the SRS band 43, respectively, and the signal band 40 is divided into three: the aforesaid bands 41, 42 and 43, through the use of an optical coupler (3-dB coupler) 13 and edge filters 16-1, 16-2, with the divided bands being inputted to the PDs 17-1, 17-2 and 17-3.

Figure 15:
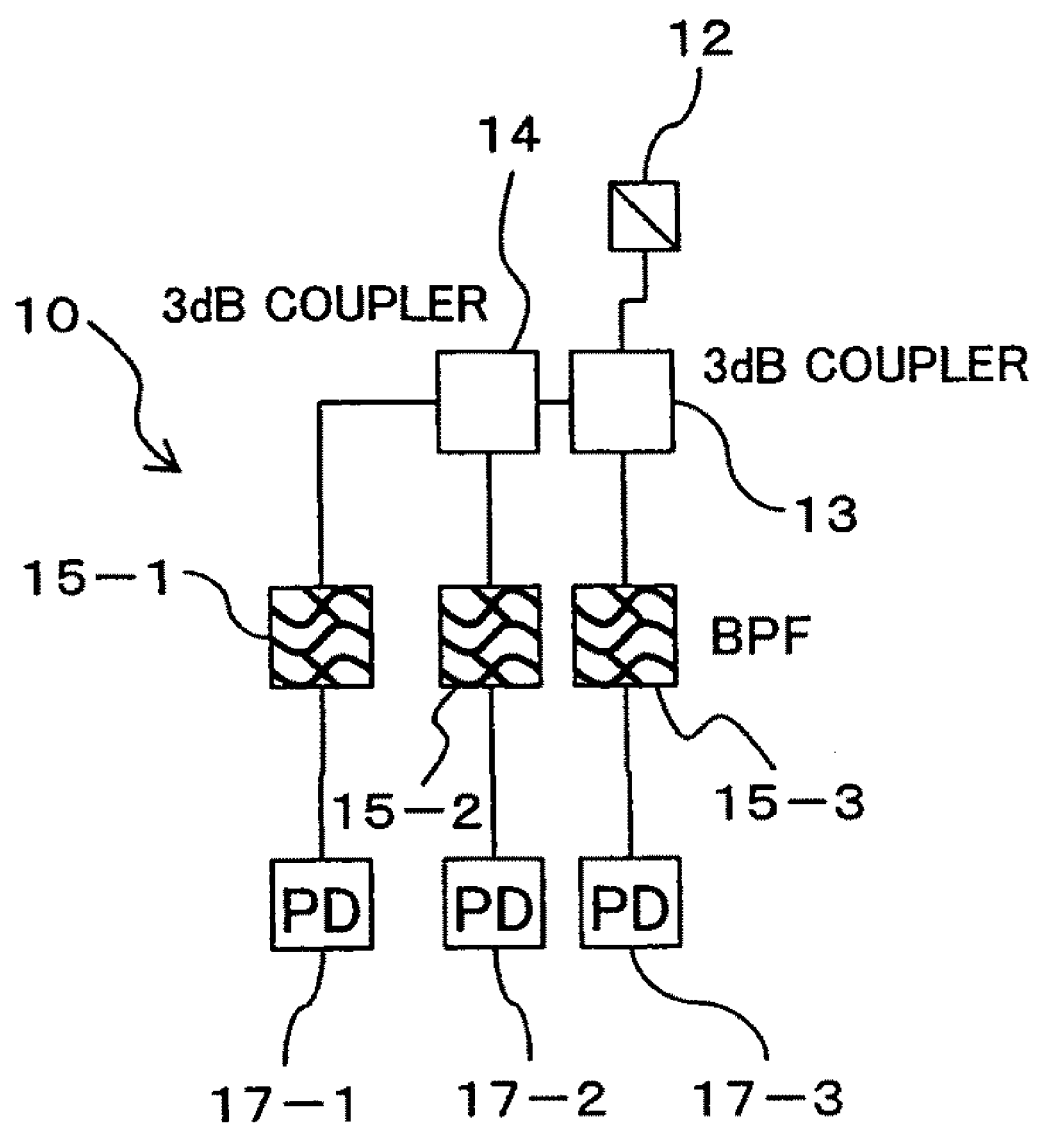
FIG. 15 is a block diagram showing a modification of input monitoring means shown in FIG. 2.

In addition, for example, as shown in FIG. 15, likewise, it is possible to monitor the inputted signal power of each of the bands 41, 42 and 43 through the use of 3-dB couplers 13, 14, band-pass filters 15-1, 15-2 15-3 for the bands 41, 42 and 43 and PDs 17-1, 17-2, 17-3.

Both the configurations can eliminate the need for the calculation of the inputted signal power of the gain deviation band 42 mentioned above and, hence, a higher-speed control is realizable.

[A3] Others

Although in each of the above-described embodiments the signal wavelength band 40 is divided into three bands: the SHB band 41, the gain deviation band 42 and the SRS band 43, so as to obtain the number of signal wavelengths of each of the divided bands 41, 42 and 43, it is also appropriate that the signal wavelength band 40 is divided into two: the SHB band 41 and the other band (including the gain deviation band 42) or the SRS band 43 and the other band (including the gain deviation band 42), thereby obtaining the number of signal wavelengths of each of the divided bands. Also in this case, it is expectable to exhibit a higher residual signal light power variation suppression effect in comparison with the conventional technique.

Furthermore, although in the above-described embodiment the present invention is applied to the post amplifier 1, it is natural that the present invention is applicable to the preamplifier 3 or 5 (see FIG. 1).

[B] Description of Second Embodiment

Secondly, a description will be given hereinbelow of a low-cost gain equalization device providing a high-speed response. As described above, the main factors of the variation of the wavelength flatness of signal power occurring due to the dynamic variation of the state of signal are the SHB occurring in an EDFA, the gain deviation of an EDFA and the SRS occurring in an optical transmission line. Moreover, the degree of the effect of each of the factors largely varies according to wavelength and, for example, in the case of the C band (1532 nm to 1563 nm), the effects of the SHB, the gain deviation and the SRS increases with shorter wavelength, while longer wavelength provides greater effects of the SRS and the gain deviation and an intermediate wavelength band provides a greater gain deviation effect in comparison with the other two factors.

Therefore, to suppress the variation of gain wavelength characteristic involved in the variation of signal state (number of wavelengths and wavelength allocation), a sufficient effect can be obtained by dividing the signal band according to the contents of an occurrence factor and carrying out the compensation in units of bands without performing high-cost compensation in units of wavelengths. Accordingly, as mentioned above with reference to FIG. 3, the signal band 40 is divided into three bands of the SHB band 41, the gain deviation band 42 and the SRS band 43 and means (gain equalization device) for performing the output equalization of signal in units of the bands 41, 42 and 43 is easily realized at a low cost, thus preventing the occurrence of transmission error due to the variation in the number of wavelengths and wavelength allocation.

Figure 26:
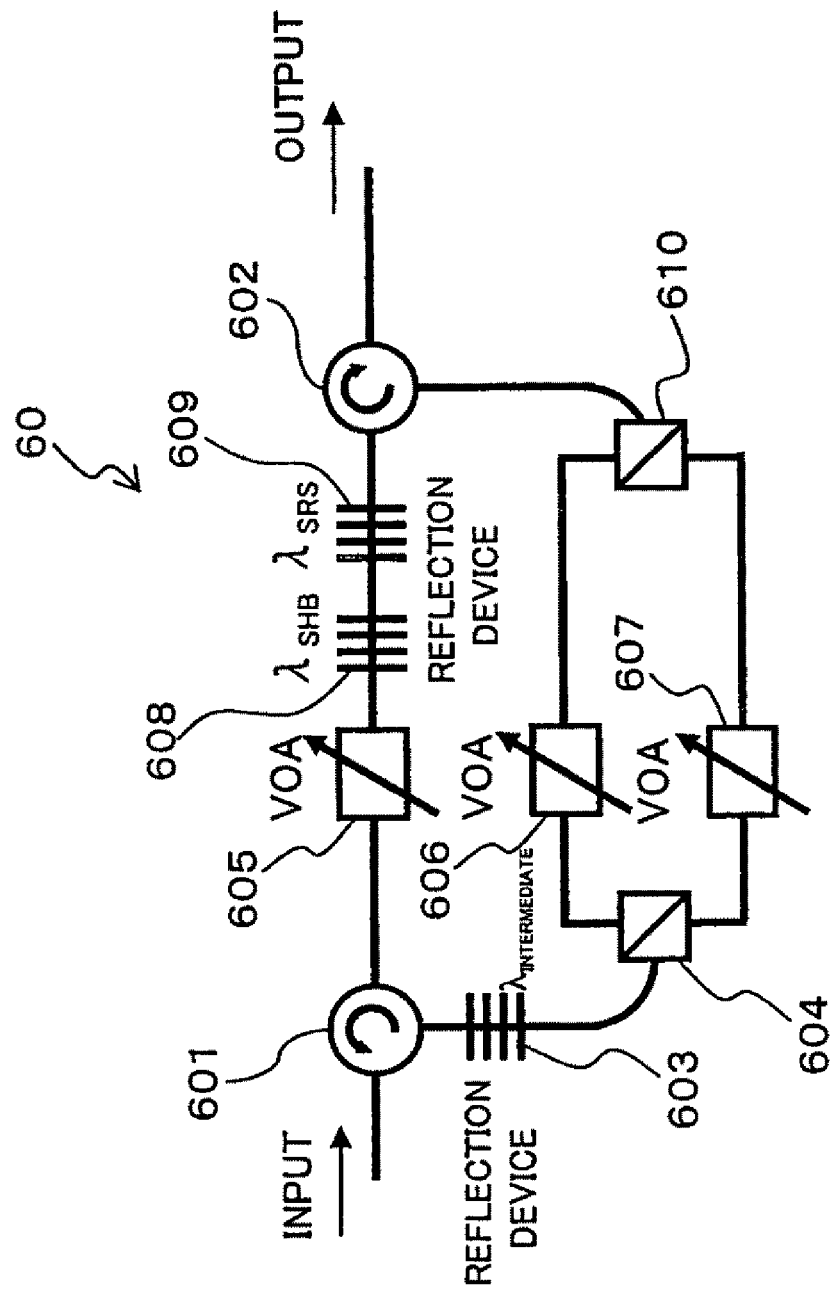
FIG. 26 is a block diagram showing a configuration of a gain equalization device (individual band gain equalizer) according to a second embodiment of the present invention.

(B1) Description of Gain Equalization Device Having High-Speed Response Characteristic FIG. 26 is a block diagram showing a configuration of a gain equalization device according to a second embodiment of the present invention. For example, the gain equalization device (band unit gain equalizer) 60 shown in FIG. 26 is made up of two circulators 601, 602, three types of reflection devices 603, 608, 609, two WDM couplers 604, 610 and three variable optical attenuators (VOA) 605, 606, 607. The VOA 605 is connected to one output port of the circulator 601, and the reflection devices 608 and 609 are connected in series to the VOA 605, and one input port of the circulator 602 is connected to the output of the latter-stage reflection device 609. Moreover, the reflection device 603 is connected to the other output port of the circulator 601, and the WDM coupler 604 is connected to the reflection device 603, and the VOA 606 is connected to one output of the WDM coupler 604 and the VOA 607 is connected to the other output thereof, and the outputs of these VOAs 606 and 607 are connected to the WDM coupler 610, and the output of the WDM coupler 610 is connected to the other input port of the latter-stage circulator 602.

In this configuration, the circulator (first optical circulator) 601 guides inputted WDM signal (main signal) to the reflection device 603 and leads the inputted light from the reflection device 603 to the VOA 605, and the reflection device (gain deviation band reflection device) 603 reflects, of the inputted main signal from the circulator 601, light with wavelengths in the aforesaid gain deviation band (which will hereinafter be referred to equally as an "intermediate band") 42 and permits light with the other wavelengths (i.e., light in the aforesaid SHB band 41 and SRS band 43) to pass toward the WDM coupler 604 and, for example, it can be made as a reflection type grating having this wavelength reflection/transmission characteristic (this also applies to the other reflection devices 608 and 609).

Each of the VOAs 605, 606 and 607 is for adjusting the degree of attenuation of inputted light to adjust the output light power, and the degree of attenuation of each of the VOAs 605, 606 and 607 is individually adjusted by a control unit 70 (gain equalization control unit 74) which will be described later with reference to FIG. 28 or 29. Each of the VOAs 605, 606 and 607 has a sufficiently high response speed (on the order of microsecond) (for example, ~several tens μs) in comparison with the response speed of the power compensation of OADM node 100 (approximately ~10 ms) and, for this reason, in the following description, they will sometimes referred to as high-speed VOAs 605, 606, 607).

The WDM coupler (band separation device) 604 separates the inputted light passing through the aforesaid reflection device 603 into light in the SHB band 41 and light in the SRS band 43 to output the light in the SHB band 41 to the VOA 607 and the light in the SRS band 43 to the VOA 606, thus individually carrying out the output power adjustment on the light in the SHB band 41 and the light in the SRS band 43 in the VOAs 606 and 607. Incidentally, conversely, it is also acceptable to output the light in the SHB band 41 to the VOA 606 and the light in the SRS band 43 to the VOA 607.

The WDM coupler (band coupling device) 610 is for coupling (combining) the output lights of the VOA 606 and the VOA 607 to output the coupled light to the circulator 602, and the circulator (second optical circulator) 602 is for leading the inputted light from the reflection device 609 side to an output port and further for leading the inputted light from the WDM coupler 610 side to the VOA 605 (reflection devices 608 and 609) side. That is, in this embodiment, the lights in the SHB band 41 and the SRS band 43 are guided through this circulator 602 to the reflection device 609 side.

Moreover, the reflection device (SHB band reflection device) 608 is made to reflect the light in the SHB band 41 and permit the light with the other wavelengths to pass, and the reflection device (SRS band reflection device) 609 is made to reflect the light in the SRS band 43 and permit the light with the other wavelengths to pass. Therefore, in this embodiment, the light from the VOA 605 (that is, the light in the gain deviation band 42) passes through the reflection devices 608 and 609 and is led to the circulator 602, while the light passing through the VOAs 606, 607, the WDM coupler 610 and the circulator 602 (that is, the light in the SHB band 41 and in the SRS band 43) is reflected by the reflection devices 608 and 609 to be again led to the circulator 602.

That is, the circulators 601, 602, the reflection devices 603, 608, 609 and the WDM couplers 604, 610 function as a band division means to divide the signal wavelength band 40 of inputted wavelength multiplexed signal into the three bands of the SHB band 41, the intermediate band 42 and the SRS band 43, while the VOA 607 functions as a variable optical attenuator for the SHB band 41, the VOA 605 function as a variable optical attenuator for the intermediate band (gain deviation band) 42, and the VOA 606 functions as a variable optical attenuator for the SRS band 43, and these VOAs 605, 606 and 607 realizes an adjustment means to adjust the output light power in units of the divided bands 41, 42 and 43.

Figure 27:
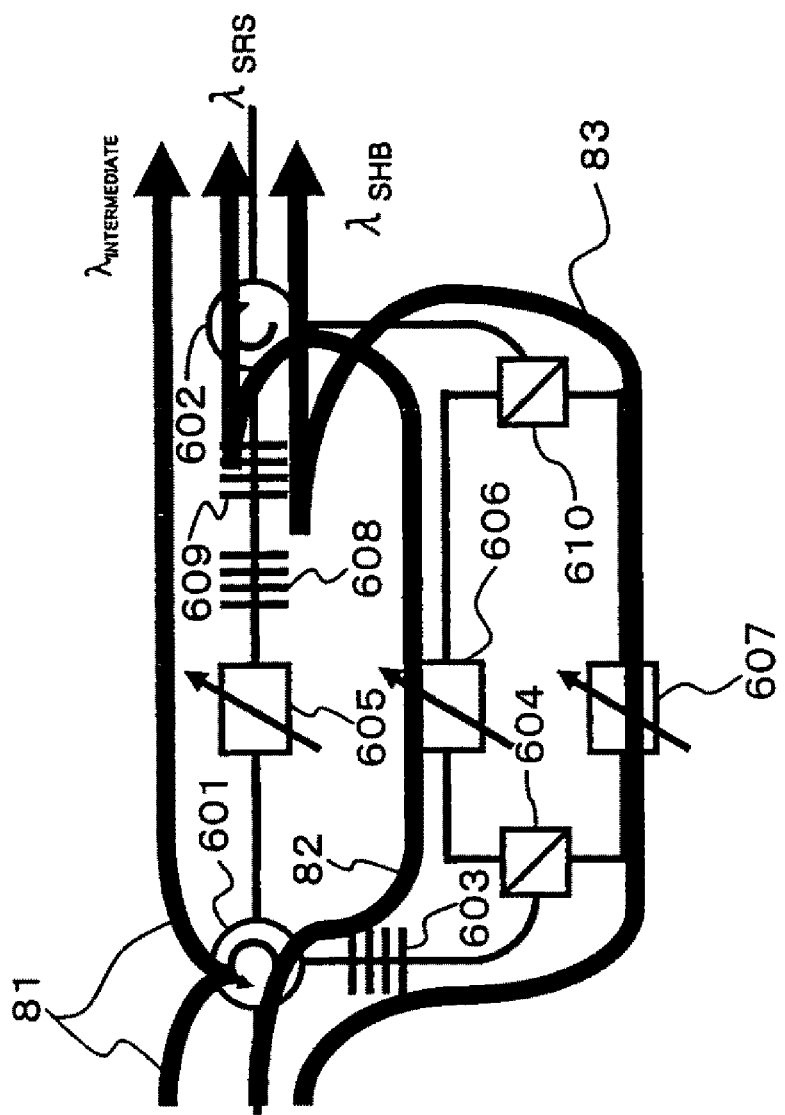
FIG. 27 is an illustration for explaining an operation of a gain equalization device shown in FIG. 26 and shows an optical path.

With this configuration, in the gain equalization device 60 according to this embodiment, inputted light propagates along optical paths 83, 81 and 82 shown in FIG. 27 for each of the aforesaid bands 41, 42 and 43 so that the adjustment of the output light power can be made independently through the VOAs 605, 606 and 607 for each of the bands 41, 42 and 43.

That is, the inputted light to the gain equalization device 60 is first led through the circulator 601 to the reflection device 603 and, as indicated by the optical path 81, the light in the gain deviation band 42 is reflected by the reflection device 603 and again led to the circulator 601 and further led through the VOA 605 and the reflection devices 608 and 609 to the circulator 602 and outputted from the output port thereof.

On the other hand, as indicated by the optical path 83, the light in the SHB band 41, together with the light in the SRS band 43, passes through the reflection device 603 and is guided to the WDM coupler 604 and then led to the VOA 607 and further led through the VOA 607, the WDM coupler 610, the circulator 602 and the reflection device 609 to the reflection device 608. In addition, it is reflected by the reflection device 608 and passes through the reflection device 609 and outputted from the output port of the circulator 602.

Furthermore, as indicated by the optical path 82, the light in the SRS band 43, together with the light in the SHB band 41, passes through the reflection device 603 and is led to the WDM coupler 604 and then led to the VOA 606 by the WDM coupler 604 and further guided through the VOA 606, the WDM coupler 610 and the circulator 602 to the reflection device 609 and reflected by this reflection device 609 to be outputted from the output port of the circulator 602.

Accordingly, by individually adjusting (controlling) the degrees of attenuation of the high-speed VOAs 605, 606 and 607 provided on the aforesaid optical paths 81, 82 and 83, it is possible to independently adjust the output light power for each of the gain deviation band 42, the SRS band 43 and the SHB band 41, which enables the compensation (equalization) for the gain deviation (output light power deviation), occurring in the signal wavelength band 40, at a high speed (on the order of microsecond, instead of the order of millisecond in the conventional technique) in units of bands 41, 42 and 43 but not in units of wavelengths.

In consequence, there is no need to provide a high-cost high-speed VOA for each of wavelengths, and the function is achievable by the preparation of the VOAs for only the three bands 41, 42 and 43 irrespective of the number of wavelengths of the signal wavelength band 40, which enables realizing the gain equalization device 60 having a high-speed response characteristic at a low cost.

In this connection, the gain equalization device 60 according to this embodiment is designed such that the approximately same losses arise in the above-mentioned optical paths 81, 82 and 83.

Thus, in the gain equalization device 60, it is possible to suppress the deviation (differences) among the light power losses in the bands 41, 42 and 43 to a minimum, and the same type is applicable as the high-speed VOAs 605, 606 and 607, or the high-speed VOAs 605, 606 and 607 having the approximately same attenuation widths are usable, which can reduce the production cost and facilitate the control on the degree of attenuation.

(B2) Description of Example of Application of Gain Equalization Device 60

Figure 28:
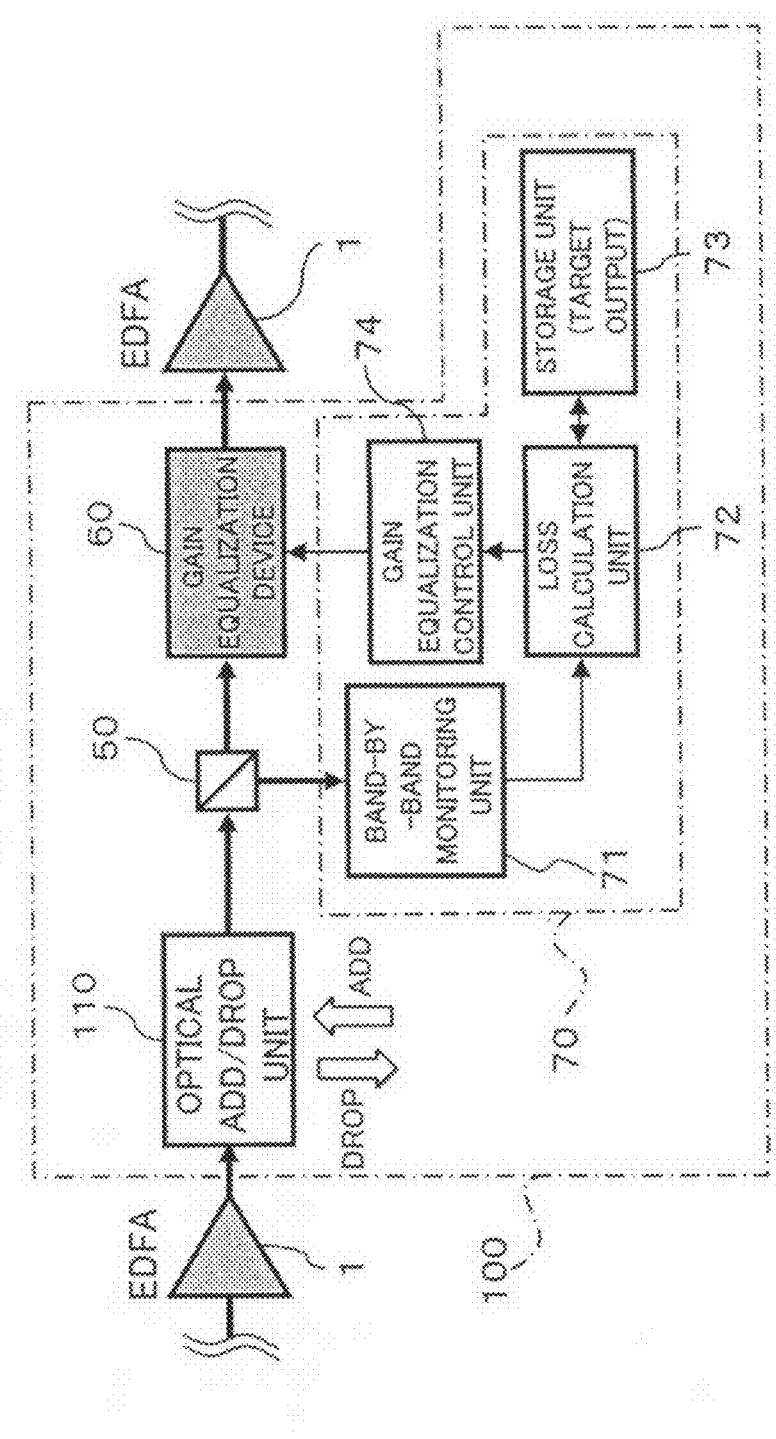
FIG. 28 is a block diagram showing a configuration of an OADM node employing the gain equalization device shown in FIG. 26.
Figure 29:
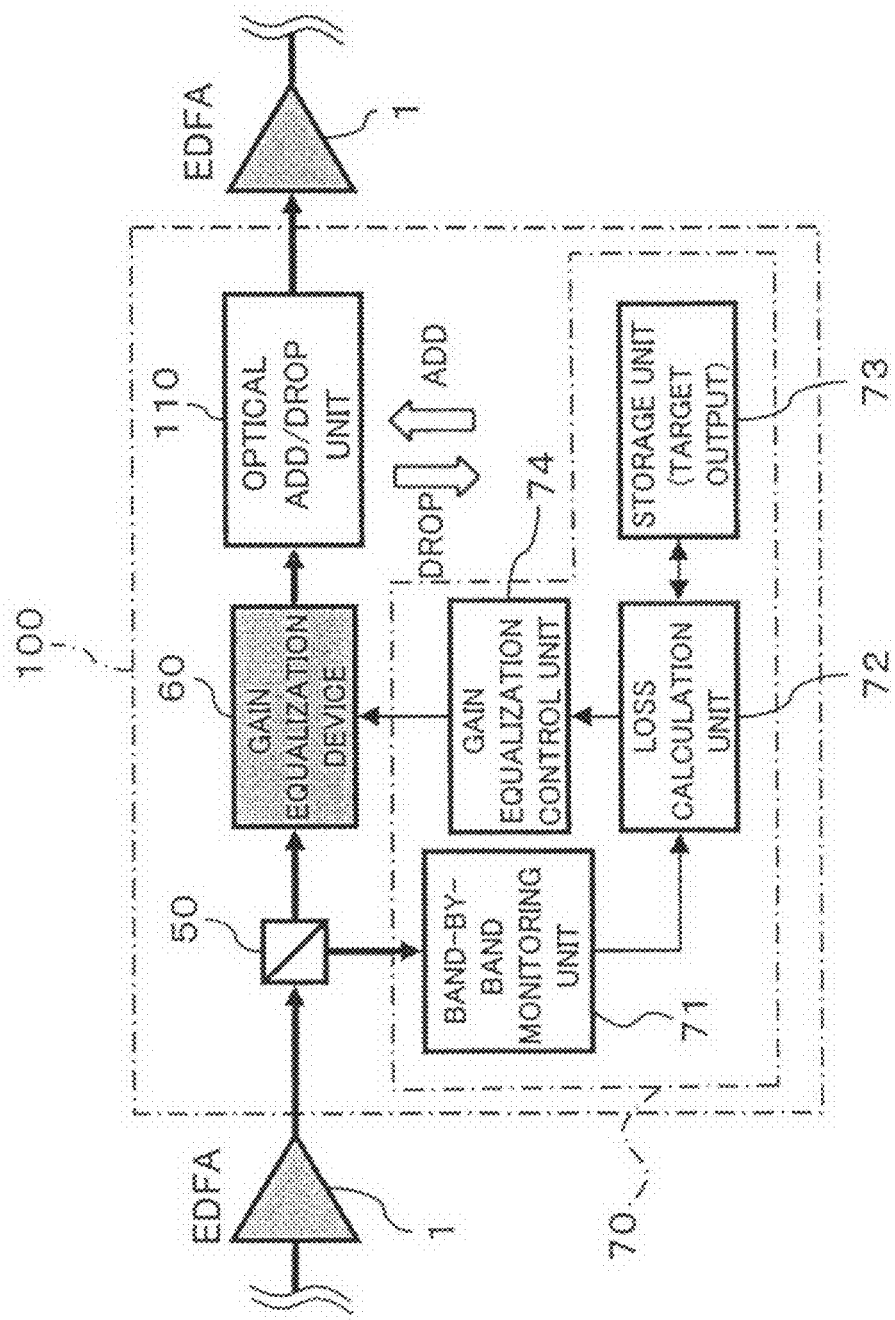
FIG. 29 is a block diagram showing a different configuration of an OADM node employing the gain equalization device shown in FIG. 26.

The gain equalization device 60 is applicable to the OADM node 100 and, for example, it can be provided at the latter stage of an add/drop unit 110 in the OADM node 100 as shown in FIG. 28, or it can be provided at the former stage of an add/drop unit 110 in the OADM node 100 as shown in FIG. 29.

That is, the OADM node 100 shown in FIGS. 28 and 29 is made up of the optical add/drop unit 110 for carrying out the add/drop on signal with a specified (arbitrary) wavelength of inputted WDM signal, an optical WDM coupler 50, a gain equalization device 60 provided at the former stage or latter stage of the optical add/drop unit 110, and a control unit 70 for controlling the gain equalization by the gain equalization device 60, and the control unit 70 includes a band-by-band monitoring unit 71, a loss calculation unit 72, a storage unit 73 and a gain equalization control unit 74.

In this case, the optical add/drop unit 110 can be made, for example, using a combination of an AWG (Arrayed Waveguide Grating) and a VOA, a wavelength selective switch (WSS) and others. Moreover, this optical add/drop unit 110 has a function to adjust the output signal power according to wavelength of WDM signal, and when the signal state is a steady state (when the number of wavelengths and the wavelength allocation do not vary), the automatic level control (ALC) is implemented so that the signal with each wavelength outputted from the optical add/drop unit 110 becomes predetermined power, thus carrying out the output equalization for each wavelength.

The optical WDM coupler 50 is for performing the power-branch on a portion of the WDM signal, inputted from the optical add/drop unit 110 or the optical amplifier (EDFA) 1, as a monitor light to output it to the band-by-band monitoring unit 71 and further for outputting the left light to the gain equalization device 60.

Moreover, in the control unit 70, the band-by-band monitoring unit 71 is monitoring the reception light power (average signal power per wavelength) of each of the SHB band 41, the gain deviation band 42 and the SRS band 43 on the basis of the monitor light inputted from the aforesaid optical coupler 50, and this monitoring function is realizable with, for example, a configuration equivalent to that of the band-by-band input monitoring means 10 mentioned above with reference to FIG. 2, 14 or 15.

The storage unit 73 is for previously storing a target value of the average output signal power per wavelength (hereinafter referred to equally as "target output signal power") in accordance with the insertion position of the gain equalization device 60, and the loss calculation unit (difference detecting unit) 72 is for calculating (detecting) a difference (loss quantity) between the monitor result by the band-by-band monitoring unit 71 and the target output signal power stored in the storage unit 73 for each of the bands 41, 42 and 43.

Moreover, the gain equalization control unit 74 controls the gain equalization device 60, in more detail, controls the aforesaid VOAs 605, 606 and 607 individually, so that the loss quantity obtained by the aforesaid loss calculation unit 72 reaches a minimum (the average output signal power becomes the target output signal power) for adjusting the loss quantities of the aforesaid bands 41, 42 and 43 individually, thus compensating for the differences in loss (gain deviation) occurring in the signal wavelength band 40 in units of the bands 41, 42 and 43 instead of units of wavelengths.

With this configuration, in the OADM node 100 according to this embodiment, since the response speed of the wavelength-by-wavelength gain equalization control by the optical add/drop unit 110 is low immediately after a rapid variation of the signal state due to reconstruction of a wavelength path or the like, although the loss characteristic of add/drop unit 110 remains constant (the output signal power variation (gain deviation) is left in the signal wavelength band 40) at the transient period, the control unit 70 monitors the inputted signal power for each of the inputted signal bands 41, 42 and 43 and controls the gain equalization device 60 (VOAs 605, 606, 607) on the basis of the monitor result so that the average output power of each of the bands 41, 42 and 43 in the output signal of the gain equalization device 60 becomes a predetermined target output power, thereby enabling the compensation for the aforesaid gain deviation at a high speed.

Incidentally, although in the above-described configuration, the band-by-band monitoring unit 71 monitors the inputted signal power of the gain equalization device 60 (that is, carries out the feedforward control), it is also appropriate to monitor the output signal power of the gain equalization device 60 (that is, to carry out the feedback control).

(B3) Description of Control Method in OADM Node 100

Figure 31:
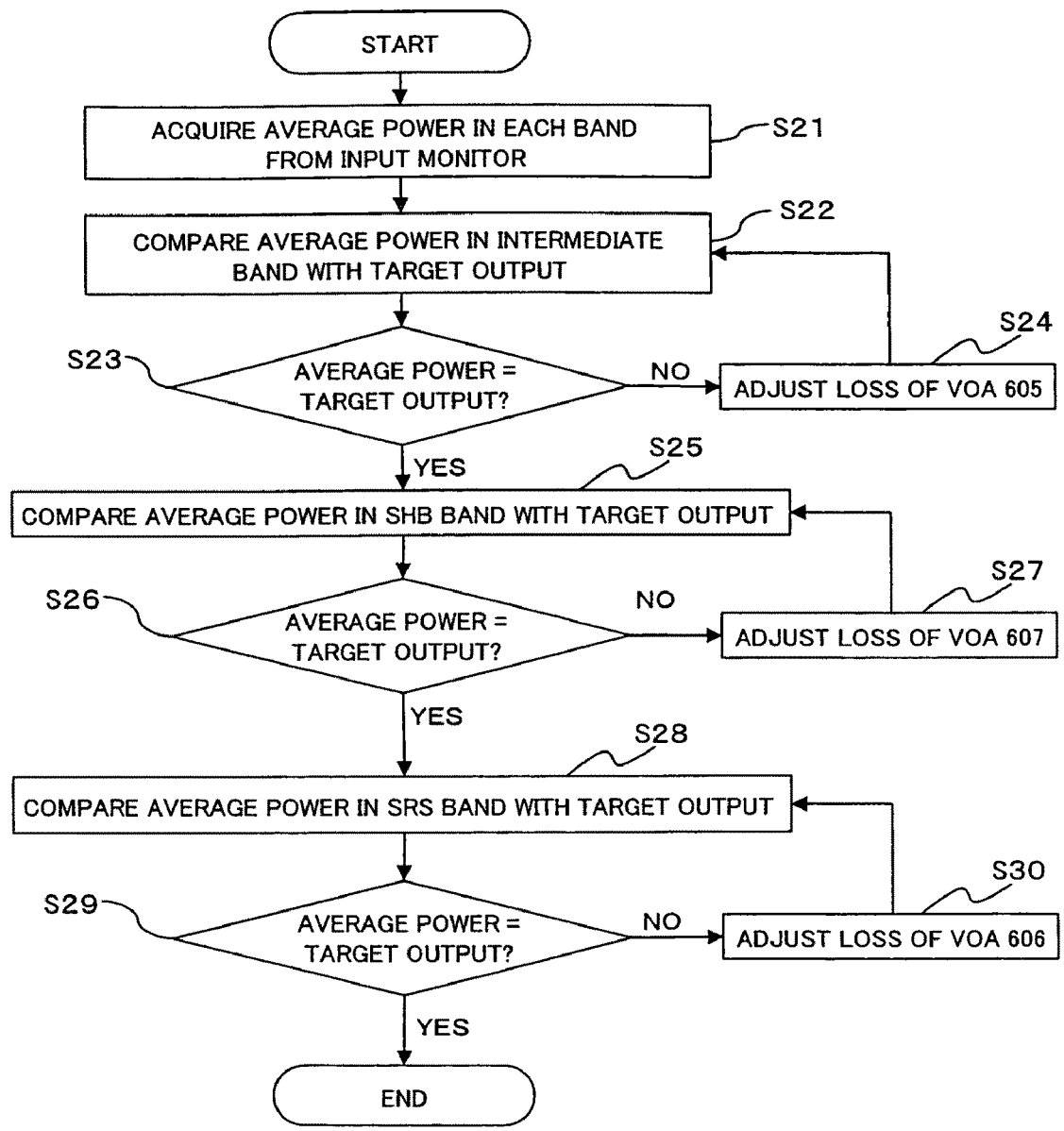
FIG. 31 is a flow chart useful for explaining the gain equalization control in the OADM node shown in FIG. 28 or 29.
Figure 32:
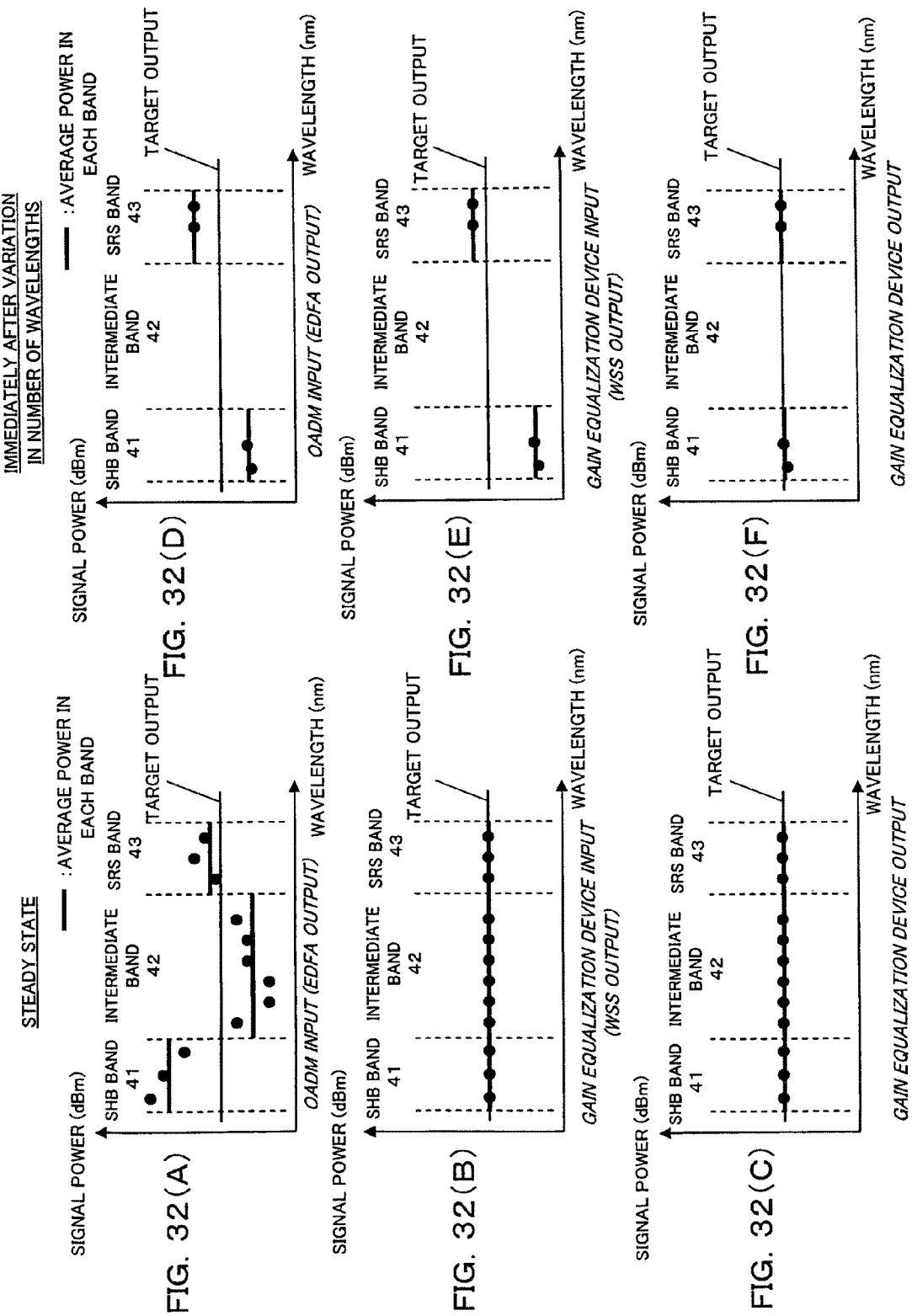
FIG. 32(A) to 32(F) are illustrations of states of power variation in a signal wavelength band in the case of a steady condition and the occurrence of variation of a signal light state in the OADM node shown in FIG. 28 or 29.

Referring to FIGS. 30, 31 and 32, a detailed description will be given hereinbelow of a method of controlling the aforesaid gain equalization device 60 (operation of the control unit 70).

First, as shown in FIG. 31, the aforesaid control unit 70 acquires the average value of the inputted signal power (average power) for each of the bands 41, 42 and 43 from the band-by-band monitoring unit 71 (step S21). The average power for each of the bands 41, 42 and 43 is outputted to the loss calculation unit 72 and, for example, the loss calculation unit 72 first makes a comparison between the average power of the intermediate band 42 and the target output power on the signal wavelength band 40 in the storage unit 73 (that is, in this case, the same target output power is set with respect to each of the bands 41, 42 and 43) (step S22) to make a decision as to whether or not both coincide with each other (step S23).

If the decision result shows no coincidence, then the loss calculation unit 72 determines a controlled variable for the gain equalization device 60 (high-speed VOA 605) needed for the average power of the intermediate band 42 to reach the target output power until both coincide with each other (the decision in step S23 indicates YES), and the gain equalization control unit 74 controls the high-speed VOA 605 on the basis of the determined controlled variable (through NO route of step S23 to step S24).

On the other hand, when the average power of the intermediate band 42 coincides with the aforesaid target output power, the loss calculation unit 72 then makes a comparison between the average power of the SHB band 41 and the aforesaid target output power (through YES route of step S23 to step S25) to make a decision as to whether or not both coincide with each other (step S26). If the decision result indicates no coincidence, then the loss calculation unit 72 determines a controlled variable for the gain equalization device 60 (high-speed VOA 607) needed for the average power of the SHB band 41 to reach the target output power until both coincide with each other (the decision in step S26 indicates YES), and the gain equalization control unit 74 controls the high-speed VOA 607 on the basis of the determined controlled variable (through NO route of step S26 to step S27).

Moreover, if the average power of the SHB band 41 coincides with the aforesaid target output power, the loss calculation unit 72 then makes a comparison between the average power of the SRS band 43 and the aforesaid target output power (through YES route of step S26 to step S28) to make a decision as to whether or not both coincide with each other (step S29). If the decision result indicates no coincidence, the loss calculation unit 72 determines a controlled variable for the gain equalization device 60 (high-speed VOA 606) needed for the average power of the SRS band 43 to reach the target output power until both coincide with each other (the decision in step S29 indicates YES), and the gain equalization control unit 74 controls the high-speed VOA 606 on the basis of the determined controlled variable (through NO route of step S29 to step S30).

Still moreover, if the average power of the SHB band 41 coincides with the aforesaid target output power, the adjustment of the output signal power of all the bands 41, 42 and 43 to the target output power reaches completion, and the equalization (compensation) of the gain deviation occurring in the signal wavelength band 40 is made.

Incidentally, although the comparison and decision on the target output power is made in the order of the intermediate band 42→the SHB band 41→the SRS band 43, the present invention is not limited this order.

FIGS. 30(A) and 30(B) show images of the variation of the output power in each of the bands 41, 42 and 43 by the above-described gain equalization control. That is, in a case in which, as a result of the rapid variation of the signal state, as shown in FIG. 30(A), each of the average powers of the SHB band 41 and the SRS band 43 exceeds the target output light power and the average power of the intermediate band 42 is lower than the target output power, when the gain equalization control is implemented by the control unit 70 as described above, the average powers of all the bands 41, 42 and 43 are adjusted to the target output power at a high speed as shown in FIG. 30(B).

Furthermore, with reference to FIGS. 32(A) to 32(F), a description will be given hereinbelow of power variation states of the signal wavelength band 40 in the steady state of the OADM node 100 and in a state where a variation of the signal output condition occurs.

The signal to be inputted to the OADM node 100 has a wavelength characteristic as shown in FIG. 32(A) because of manufacturing differences of the optical amplifier 1 or the like. Since the optical add/drop unit 110 can achieve the follow-up in the steady state, the output deviation of the optical amplifier 1 is compensated for as shown in FIG. 32(B), and the wavelength characteristic of the signal power becomes flat. Therefore, in this state, the output of the gain equalization device 60 satisfies the target output power (coincides with the target output power) as shown in FIG. 32(C), and the gain equalization is unnecessary.

Thereafter, let it be assumed that the number of wavelengths in the WDM system varies due to the reconstruction of wavelength paths. The output deviation of the optical amplifier 1 varies from a shape shown in FIG. 32(A) to a shape shown in FIG. 32(D) due to SHB, SRS, operating point shift stemming from the average AGC of the optical amplifier 1. At this time, the response speed of the wavelength-by-wavelength output equalization due to the wavelength-by-wavelength ALC in the optical add/drop unit 110 is low, and the follow-up becomes difficult immediately after variation in the number of wavelengths.

Therefore, also in the output of the optical add/drop unit 110, an output deviation remains as shown in FIG. 32(E). However, since the residual output deviation is gain-equalized by the gain equalization device 60 in units of the bands 41, 42 and 43 as mentioned above, the output deviation is reduced as shown in FIG. 32(F). In this connection, although the output deviation of each of the bands 41, 42 and 43 remains because it is not compensated for by the gain equalization device 60 according to this embodiment, the influence thereof is smaller in comparison with the output deviation among the bands 41, 42 and 43.

When the above-described gain equalization function (gain equalization device 60 and the control unit 70) is applied to all of or a portion of the OADM nodes 100, in the OADM node 100 equipped with the gain equalization device 60, the output light power of the signal wavelength band 40 is adjusted to be a target output lower at a high speed in units of the bands 41, 42 and 43 and, hence, the accumulation of the output deviations does not occur and, even if the transmission is made in a multi-stage fashion, the occurrence of transmission error at the reception end is preventable.

Figure 33:
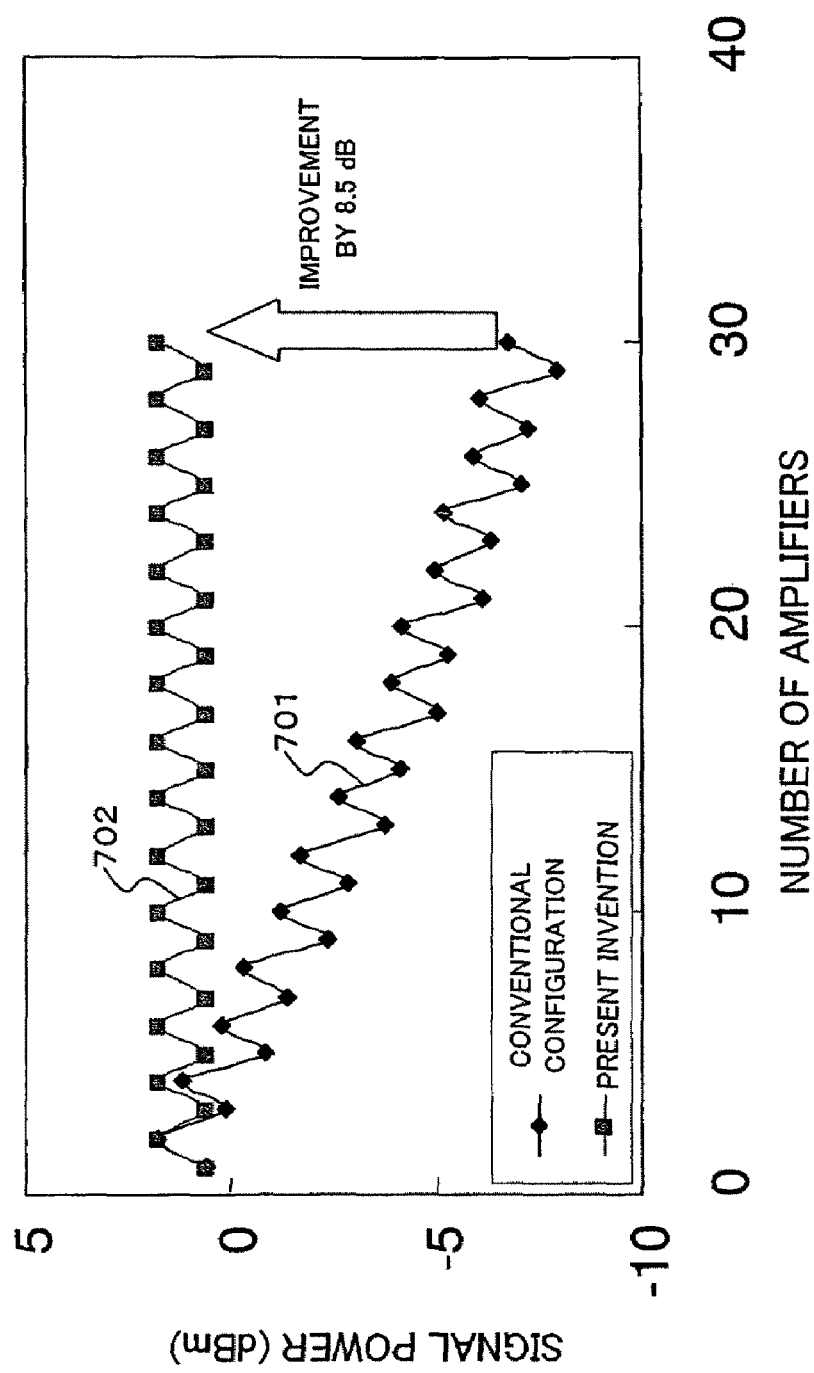
FIG. 33 is an illustration for explaining the effects of the OADM node shown in FIG. 28 or 29 in comparison with a conventional configuration.

For example, as shown in FIG. 33, assuming that the number of repeater optical amplifiers in the WDM transmission system is approximately 30, in the case of the conventional configuration, the OADM node 100 cannot follow, and the residual output deviations are accumulated intact and the large attenuation of the signal power is confirmed in the case of multi-node propagation (see reference numeral 71). On the other hand, according to this embodiment, since the output signal power is adjusted to a target value for each OADM node 100, the degradation of the signal power does not occur irrespective of the multi-node transmission (see reference numeral 702). Thus, it is known that an improvement of approximately 8.5 dB is obtainable in comparison with the conventional configuration.

(B4) Description of Adjustment Method for WDM Transmission System Using Gain Equalization Device 60

Since the output wavelength characteristic of the optical amplifier (EDFA) 1 produces a factor of transmission error at a variation in wavelength state, it is desirable that the output wavelength characteristic thereof is flat (no deviation). However, in fact, a deviation appears due to dispersion at manufacturing of EDFA 1, the wavelength characteristic of optical components of the OADM node 100 and others. Accordingly, at the start of the WDM transmission system, the adjustment is made through the use of the aforesaid gain equalization device 60 so as to compensate for the manufacturing dispersion.

Figure 34:
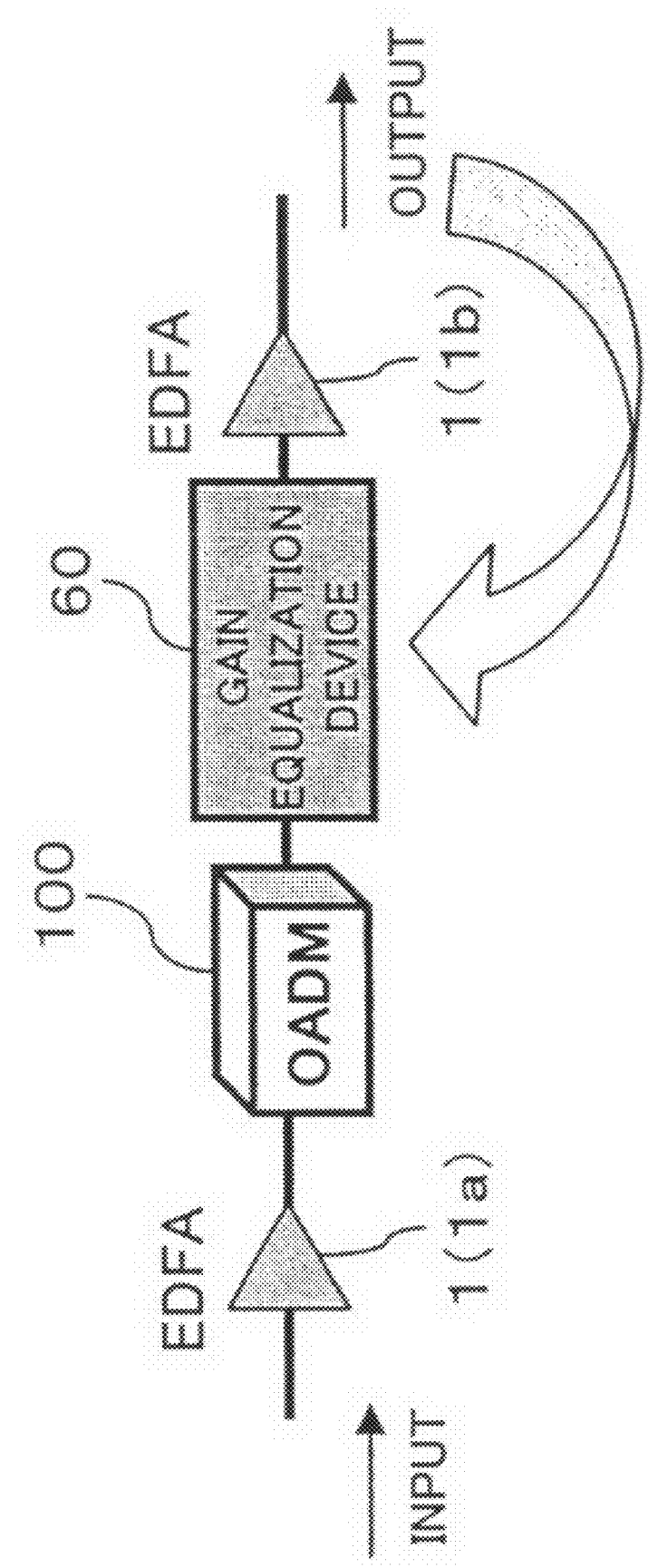
FIG. 34 is a block diagram showing a configuration of a WDM transmission system for explaining a WDM transmission system adjustment method using the gain equalization device shown in FIG. 26.

That is, for example, as shown in FIG. 34, a WDM transmission system is constructed in a manner such that an OADM node 100 and a gain equalization device 60 are interposed between two optical amplifiers (EDFA) 1 (1a, 1b) and, in a state where signal with specified power is inputted to the former-stage EDFA 1a, the output wavelength characteristic of the latter-stage EDFA 1b is monitored for each of the bands 41, 42 and 43 as mentioned above and the loss adjustment (feedback control) on the gain equalization device 60 is made as well as the gain equalization control by the aforesaid control unit 70 so that the average output power of each band 41, 42, 43 of the monitored output wavelength characteristic becomes a target output power given in advance, thereby achieving the compensation for the manufacturing dispersion and others.

Figure 35B:
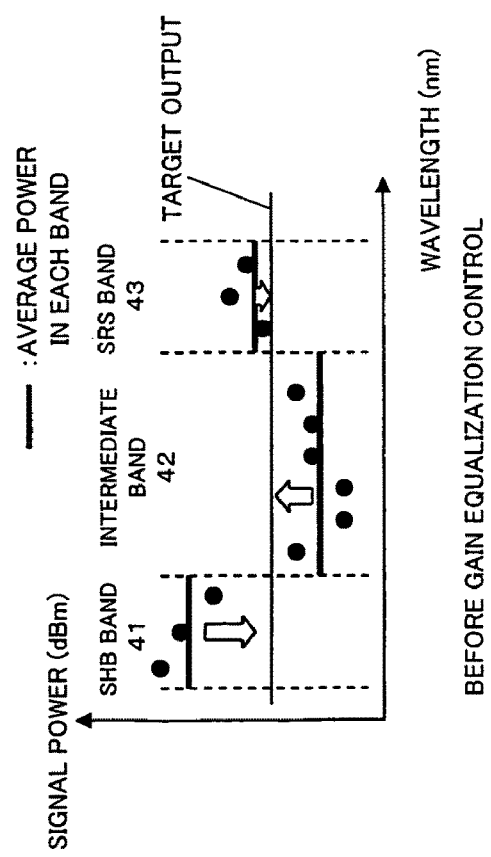
FIGS. 35(A) and 35(B) are illustrations of an image of variation of output power in an SHB band, a gain deviation band and an SRS band by the WDM transmission system adjustment method shown in FIG. 34.
Figure 35A:
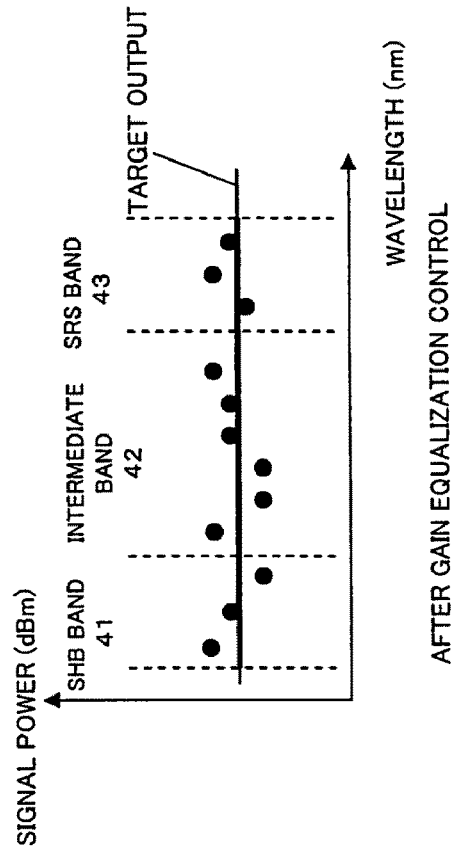

Thus, even in a case in which, with respect to the output wavelength characteristics of the EDFAs 1a and 1b, a deviation occurs in the signal wavelength band 40 due to the manufacturing dispersion of the EDFAs 1a and 1b, the wavelength characteristic of the optical parts of the OADM node 100 and others as shown in FIG. 35(A), the compensation for the deviation for each of the bands 41, 42 and 43 can be made for flatness through the gain equalization control on the gain equalization device 60 as shown in FIG. 35(B). Incidentally, also in this case, the compensation for the deviation of the aforesaid signal wavelength band 40 can be made through the feedforward control.

(B5) Description of Optical Amplifier (EDFA) 1 Using Gain Equalization Device 60

Figure 36:
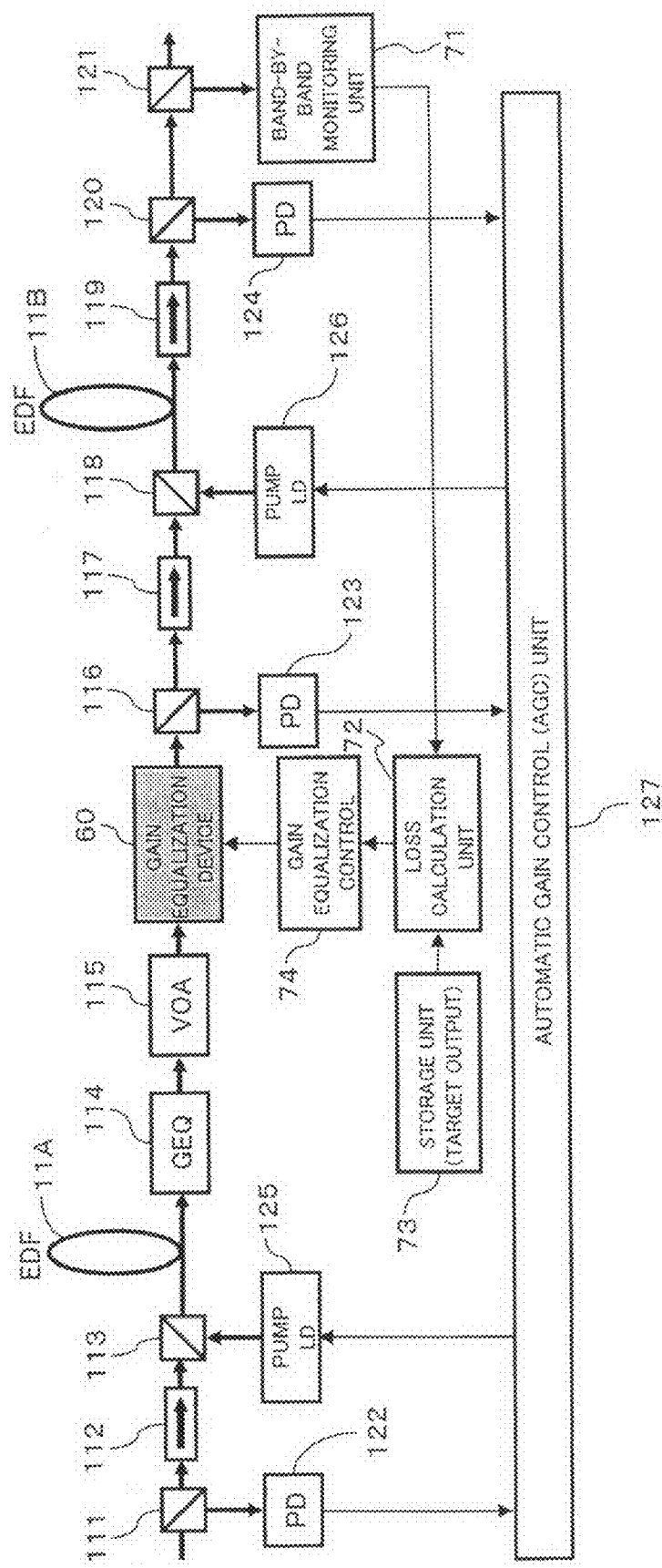
FIG. 36 is a block diagram showing a configuration of an optical amplifier using the gain equalizer shown in FIG. 26.

The above-mentioned gain equalization device 60 is also applicable to the optical amplifier (EDFA) 1. FIG. 36 shows a configuration of the EDFA 1 in this case. The EDFA 1 shown in FIG. 36 is made up of, as a main signal transmission system, for example, two stages of EDFs (amplification mediums) 11A, 11B; an optical coupler 111, an optical isolator 112 and a WDM coupler 113 provided on the input side of the former-stage EDF 11A; a gain equalizer (GEQ) 114, a variable optical attenuator (VOA) 115, a gain equalization device 60, a WDM coupler 116, an optical isolator 117 and a WDM coupler 118 placed between the EDF 11A and the EDF 11B; and an optical isolator 119 and optical couplers 120, 121 provided on the output side of the latter-stage EDF 11B.

In addition, as a control system, there are provided photodiodes (PD) 122, 123, 124 serving as light-receiving elements, pump laser diodes (LD) 125, 126 serving as pump light producing means and an automatic gain control (AGC) unit 127, and for realizing the gain equalization control equivalent to that of the aforesaid control unit 70 (see FIG. 28 or 29), there are provided a band-by-band (individual band) monitoring unit 71, a loss calculation unit 72, a storage unit 73 and a gain equalization control unit 74.

In the aforesaid main signal transmission system, the optical coupler 111 makes a power-branch on a portion of the inputted main signal (WDM light) as a monitor light and outputs it to the PD 122, and the optical isolator 112 permits the main signal light passing through the optical coupler 111 to pass only in one direction of the latter-stage WDM coupler 113 side for preventing the reflection return to the optical coupler 111. Moreover, the WDM coupler 113 is made to couple the pump light for the EDF 11A from the pump LD 125 with the main signal in front of the EDF 11A for inputting them to the EDF 11A.

The EDF 11A is for amplifying the main signal light by receiving the pump light produced by the aforesaid pump LD 125, and GEQ 114 has a fixed gain equalization characteristic and is for carrying out the gain equalization in units of wavelengths with respect to the main signal from the EDF 11A, and the VOA 115 is for adjusting the main signal power after the gain equalization by the GEQ 114 in a manner such that the attenuation factor thereof is adjusted.

The gain equalization device 60 is for carrying out the gain equalization on gain deviation, which occurs in the signal wavelength band 40 of the inputted main signal, in units of the SHB band 41, the intermediate band 42 and the SRS band 43 as described above. However, in this embodiment, with respect to the response speed of the gain equalization operation, a device (high-speed VOA 605, 606, 607) having a higher speed than the response speed of wavelength-by-wavelength ALC in the OADM node 100 is usable, or a lower-speed device is also available. Incidentally, the gain equalization device 60 is inserted between the EDF 11A and the EDF 11B. This is because, considering the characteristic (noise characteristic, amplification efficiency) of the entire optical amplifier 1, a better characteristic is obtainable in comparison with a case in which the gain equalization device 60 is provided at the former stage of the EDF 11A or at the latter stage of EDF 11B.

The optical coupler 116 is for carrying out a power-branch on a portion of output light of the gain equalization device 60 as a monitor light to output it to the PD 123, and the optical isolator 117 permits the main signal passing through the optical coupler 116 to pass in only one direction of the latter-stage WDM coupler 118 side for preventing the reflection return to the optical coupler 116. Moreover, the WDM coupler 118 couples the excitation for the EDF 11B from the pump LD 126 with the main signal light in front of the EDF 11B to input them to the EDF 11B.

The EDF 11B is for amplifying the inputted main signal light by receiving the pump light produced by the aforesaid pump LD 126, and the optical isolator 119 permits the main signal light from the EDF 11B to pass in only one direction of the latter-stage optical coupler 120 side for preventing the reflection return to the EDF 11B. Moreover, the optical coupler 120 carries out a power-branch on a portion of the main signal light passing through the optical isolator 119 as a monitor light to output it to the PD 124, and the optical coupler 121 carries out a power-branch on a portion of the main signal light passing through the optical coupler 120 as a monitor light to output it to the band-by-band monitoring unit 71.

Furthermore, in the aforesaid control system, the PDs 122, 123 and 124 are for outputting electric signals (voltage signals) corresponding to the light reception quantities (power) of the monitor light inputted from the optical couplers 111, 116 and 120 to the AGC unit 127, and the pump LDs 125 and 126 are for producing the pump light for the EDFs 11A and 11B, and the AGC unit 127 is made to individually control the pump LDs 125 and 126 on the basis of the voltage signal (i.e., power monitor value) corresponding to the light reception power (total power) from the PDs 122, 123 and 124, that is, on the basis of the input/output light power of the EDFs 11A and 11B and the target gain, thus controlling the gain of the EDFA 1 to a constant value.

In addition, the band-by-band monitoring unit 71, the loss calculation unit 72, the storage unit 73 and the gain equalization control unit 74 are similar to those described above with reference to FIGS. 28 and 29, and the band-by-band monitoring unit 71 is made to divide monitor light on the main signal light from the optical coupler 121 into three bands of the SHB band 41, the intermediate band 42 and the SRS band 43 for acquiring the main signal power (average power) for each of the bands 41, 42 and 43 and outputting it to the loss calculation unit 72.

The storage unit 73 is for previously storing a target output power per wavelength for the EDFA 1, i.e., a target output power (average power) on the signal wavelength band (SHB band 41, intermediate band 42 and SRS band 43) 40 of the main signal, and the loss calculation unit 72 makes a comparison between the average power of each of the bands 41, 42 and 43 and the target output power in the storage unit 73 for obtaining a loss quantity of each of the bands 41, 42 and 43. Moreover, the gain equalization control unit 74 individually controls the VOAs 605, 606 and 607 of the gain equalization device 60 in accordance with the loss quantity obtained by the loss calculation unit 72 so that the main signal output power becomes the target output power in units of the bands 41, 42 and 43, thereby compensating for the gain deviation occurring in the signal wavelength band 40.

In the EDFA 1 thus configured, the AGC unit 127 controls the output light powers of the pump LDs 125 and 126 on the basis of the result, obtained by monitoring the total power of the input/output signal of the respective EDFs 11A and 11B through the use of the PDs 122, 123 and 124, and the target gain for achieving the average AGC, and through the use of the band-by-band monitoring unit 71, the loss calculation unit 72, the storage unit 73 and the gain control unit 74, a loss quantity is obtained with respect to the target output power for each of the bands 41, 42 and 43 and the loss quantity of the gain equalization device 60 is adjusted for each of the bands 41, 42 and 43 in accordance with the obtained loss quantity so that the main signal power of each of the bands 41, 42 and 43 becomes the aforesaid target output power, thereby suppressing the gain deviation occurring in the signal wavelength band 40.

(B6) Description of Method of Controlling the Aforesaid EDFA 1 Having Gain Equalization Device 60

Figure 37:
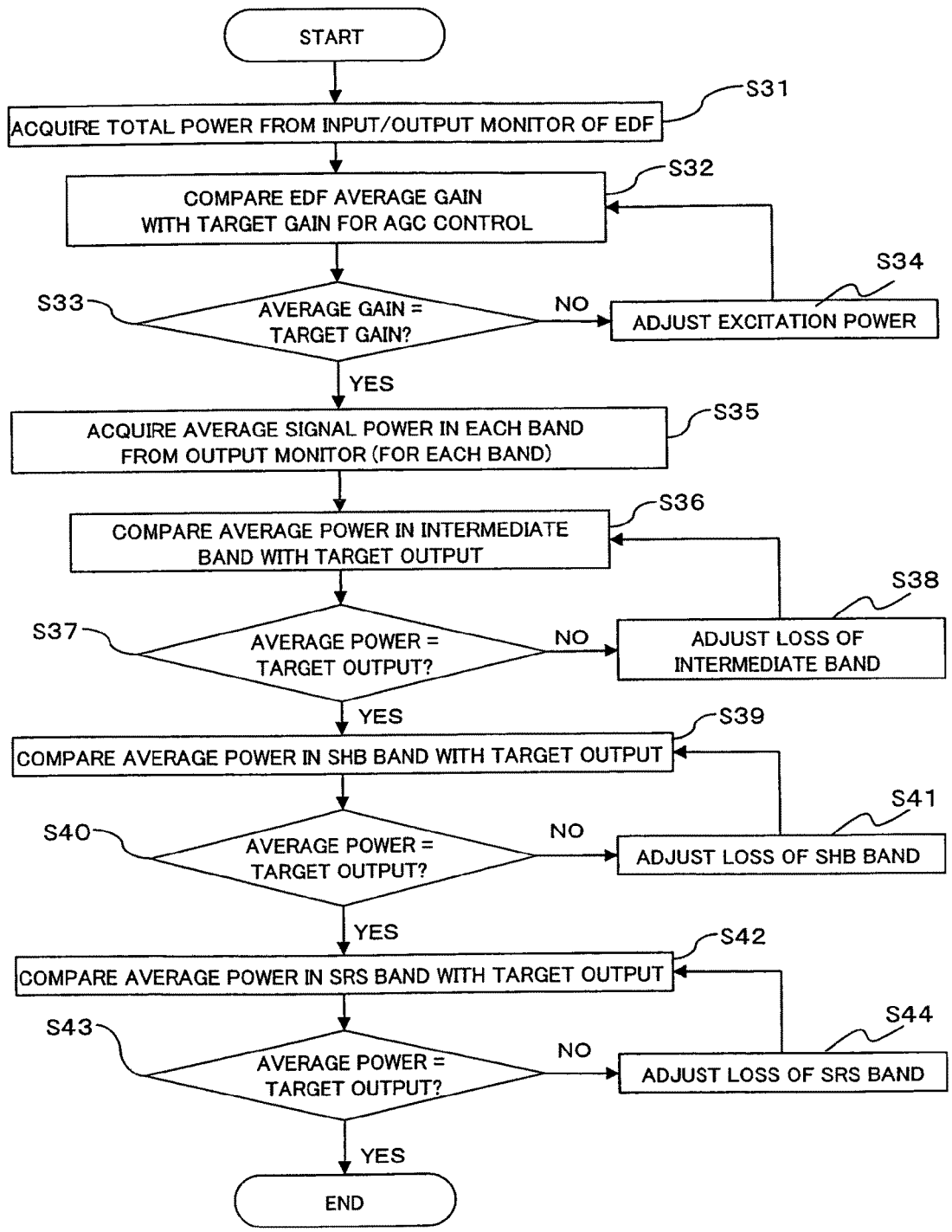
FIG. 37 is a flow chart useful for explaining gain equalization control in the optical amplifier shown in FIG. 36.
Figure 38:
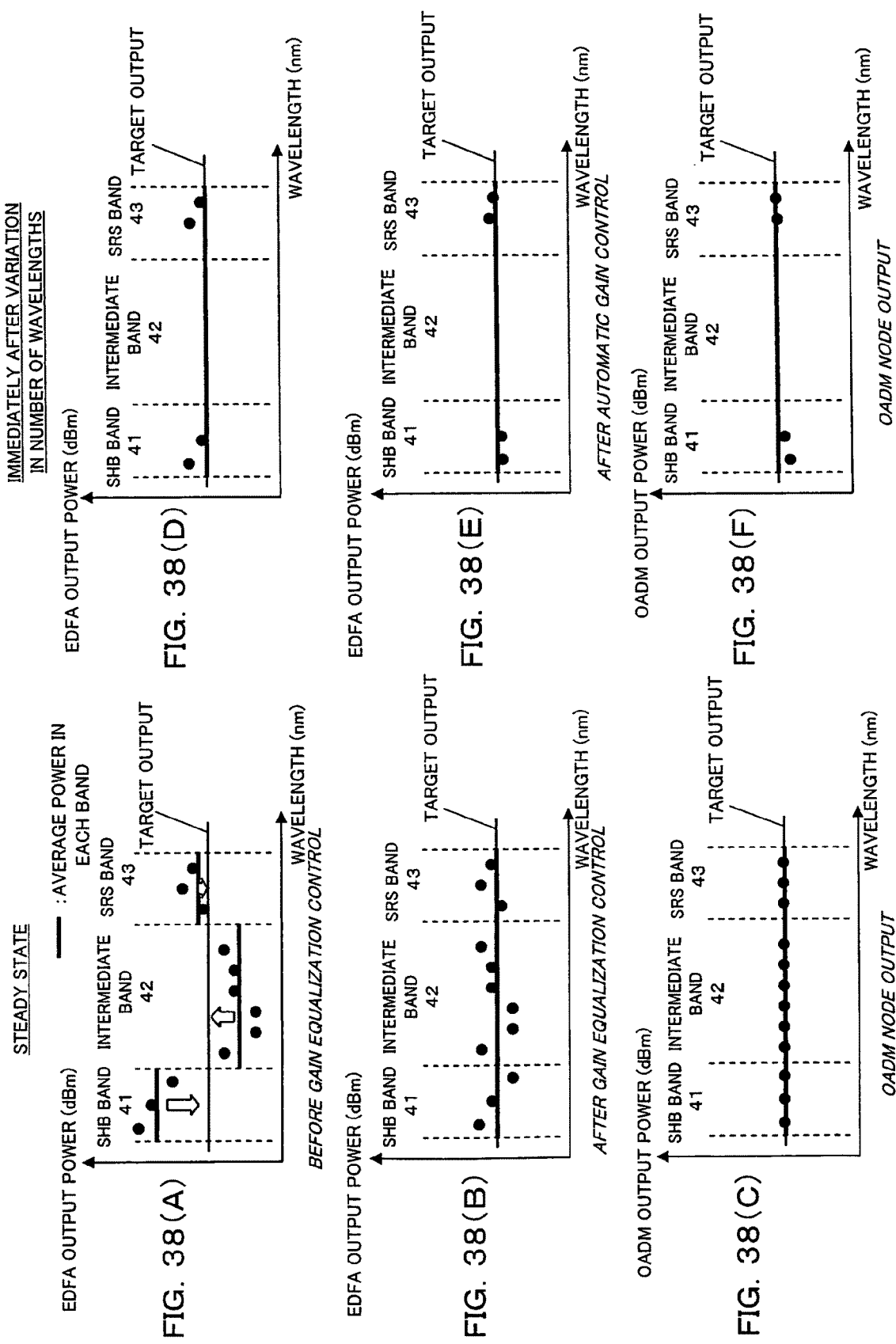
FIGS. 38(A) to 38(F) are illustrations of states of power variation in a signal wavelength band in the case of a steady condition and the occurrence of variation of a signal light state in the optical amplifier shown in FIG. 36

Furthermore, referred to FIGS. 37 and 38, a detailed description will be given of gain equalization control in the EDFA 1 having the configuration described above with reference to FIG. 36. In the EDFA 1 according to this embodiment, considering the stability of control, the gain equalization control by the gain equalization device 60 is implemented at a sufficiently lower response speed (approximately 1 second) in comparison with the wavelength-unit output equalization control in the OADM node 100.

First of all, in the EDFA 1, the average AGC is carried out in the AGC unit 127. That is, as shown in FIG. 37, the total power of the input/output signal of the EDFs 11A and 11B is acquired (monitored) by the PDs 122, 123 and 124 (step S31) and the average gain is obtained on the basis of the monitor result in the AGC unit 127 so that a comparison is made between this average gain and an AGC target gain stored in advance in a memory (not shown) (step S32) to make a decision as to whether or not the average gain obtained by the aforesaid monitor reaches the target gain (step S33).

If the decision result shows that the average gain obtained by the monitor does not reach the target gain (if the decision in the step S33 indicates NO), the AGC unit 127 individually controls the pump PDs 125 and 126 until it reaches the target gain (until the decision in the step S33 indicates YES) for properly adjusting the pump power (through NO route of step S33 to step S34).

On the other hand, if the aforesaid average gain reaches the target gain (when the decision in the step S33 indicates YES), then the gain equalization control is implemented by the gain equalization device 60. That is, the band-by-band monitoring unit 71 acquires the average power on each of the bands 41, 42 and 43 (through YES route of step S33 to step S35), and the loss calculation unit 72 makes a comparison, for example, between the average power of the intermediate band 42 and the target output power (step S36) to make a decision as to whether or not this average power reaches the target output power (step S37).

If the decision shows that it does not reach the target output power (if the decision in the step S37 indicates NO), then the loss calculation unit 72 obtains the difference (i.e., loss quantity) from the target output power until it reaches the target output power (until the decision in the step S37 indicates YES), and the gain equalization control unit 74 adjusts the attenuation quantity of the VOA 605 of the gain equalization device 60 so that this loss quantity becomes at a minimum, thus adjusting (compensating for) the loss quantity on the intermediate band 42 (step S38).

On the other hand, If the decision shows that the average power on the intermediate band 42 reaches the target output power (if the decision in the step S37 indicates YES), then the loss calculation unit 72 makes a comparison, for example, between the average power of the SHB band 41 and the target output power (step S39), thereby making a decision as to whether or not this average power reaches the target output power (step S40).

If the decision shows that the average power of the SHB band 41 does not reach the target output power (if the decision in the step S40 indicates NO), then the loss calculation unit 72 obtains a difference (loss quantity) from the target output power until it reaches the target output power (until the step S40 indicates YES), and the gain equalization control unit 74 adjusts the attenuation quantity of the VOA 607 of the gain equalization device 60 so that this loss quantity becomes at a minimum, thereby adjusting (compensates for) the loss quantity on the SHB band 41 (step S41).

On the other hand, if the average power on SHB band 41 reaches the target output power (when the decision in the step S40 indicates YES), then the loss calculation unit 72 makes a comparison between the average power of the SRS band 43 and the target output power (step S42) to make a decision as to whether or not this average power reaches the target output power (step S43).

If the decision shows that the average power of the SRS band 43 does not reach the target output power (if the decision in the step S43 indicates NO), then the loss calculation unit 72 obtains a difference (loss quantity) from the target output power until it reaches the target output power (until the step S43 indicates YES), and the gain equalization control unit 74 adjusts the attenuation quantity of the VOA 606 of the gain equalization device 60 so that this loss quantity becomes at a minimum, thereby adjusting (compensates for) the loss quantity on the SRS band 43 (step S44).

Moreover, if the average power of the SRS band 43 reaches the target output power (if the step S43 indicates YES), the average powers of all the bands 41, 42 and 43 are adjusted to the target output power, and the compensation for the gain deviation of the signal wavelength band 40 is achievable, thus forming flatness. Incidentally, in this embodiment, although the adjustment is made in the order of the intermediate band 42→the SHB band 41→the SRS band 43, the present invention is not limited this order.

Furthermore, referring to FIG. 38, a description will be given herein below of, in a case in which the above-described gain equalization control is applied to the EDFA 1, a steady state and a state of power variation of the signal wavelength band 40 at the occurrence of a variation of the signal light state.

The signal power outputted from the EDFA 1 has a wavelength characteristic shown in FIG. 38(A) due to the manufacturing dispersion or the like if the gain equalization is not implemented. In the steady state, since the flow-up of the gain equalization operation is feasible even using a low-speed gain equalization device 60, the output light power deviation of the EDFA 1 is equalized in units of the bands 41, 42 and 43 as shown in FIG. 38(B). At this time, the residual output deviation is output-equalized as shown in FIG. 38(C) by means of the wavelength-by-wavelength ALC function of the OADM node 100.

Following this, let it be assumed that the signal state (the number of wavelengths and the wavelength allocation) of the WDM transmission system varies due to the reconstruction of wavelength paths or the like so that the output signal of the EDFA 1 varies from the wavelength characteristic shown in FIG. 38(B) to the wavelength characteristic shown in FIG. 38(D). Thus, an operating point shift occurs from the operating state shown in FIG. 38(D) due to the average AGC by the AGC unit 127 of the EDFA 1 so that the wavelength characteristic varies. At this time, since the gain equalization device 60 is adjusted so that the gain deviation decreases as shown in FIG. 38(B) at the time of the steady state, the variation of the wavelength characteristic due to the operating point shift becomes relatively small as shown in FIG. 38(E).

In this case, although the wavelength-by-wavelength output equalization control by the wavelength-by-wavelength ALC function of the OADM node 100 cannot follow it, since the gain deviation is suppressed by the gain equalization device 60 as mentioned above, the variation of the wavelength characteristic due to the variation in the number of wavelengths is small and the accumulation of the output deviation is also small as shown in FIG. 38(F).

Figure 39:
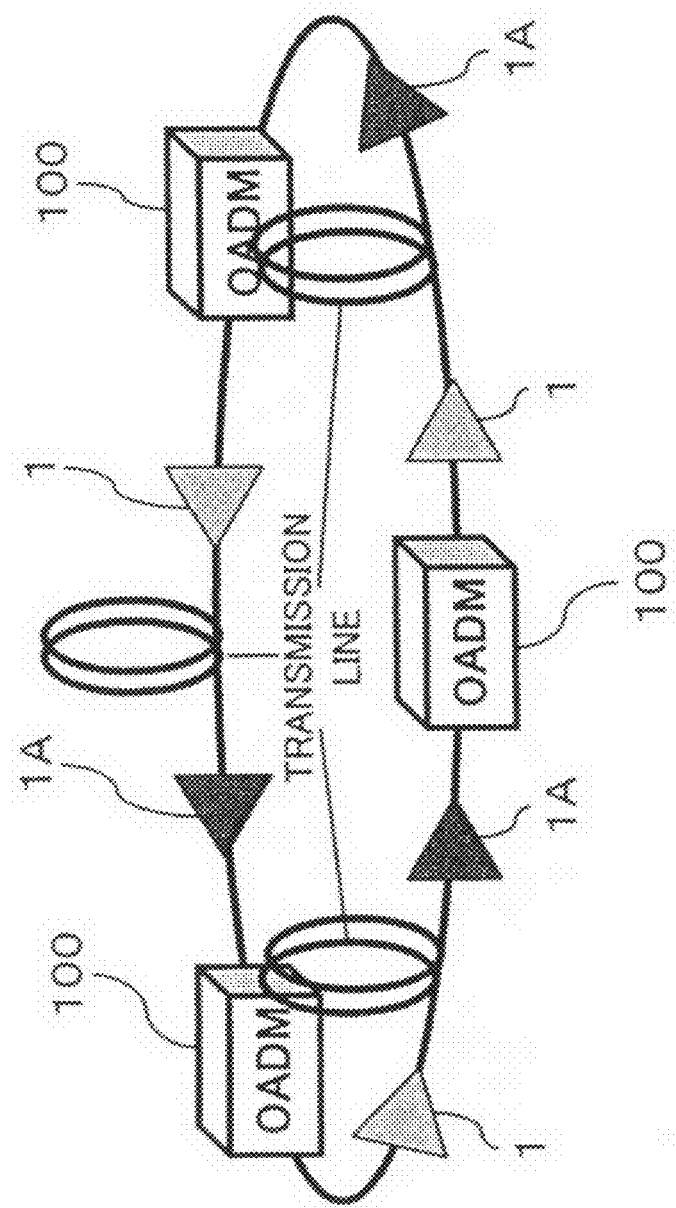
FIG. 39 is a block diagram showing a configuration of a WDM transmission system using the optical amplifier shown in FIG. 36.

Therefore, it is possible to suppress the accumulation of the output deviation occurring in each node (EDFA 1) constituting the WDM transmission system, and further to prevent the occurrence of transmission error at the reception end even when the transmission is made in a multistage system. Incidentally, the EDFA 1 having the above-described gain equalization device 60 is applicable to all the optical amplifiers constituting the WDM transmission system and, for example as shown in FIG. 39, it can be applied to a portion of the optical amplifiers in a range where the transmission error does not appear at the reception end. In FIG. 39, reference numeral 1A represents an optical amplifier (EDFA) equipped with the gain equalization device 60, while reference numeral 1 depicts an existing optical amplifier (EDFA) which does not include the gain equalization device 60.

(B7) Description of Modification of Gain Equalization Device 60.

Furthermore, a description will be given hereinbelow of a modification of the above-described gain equalization device 60. In particular, when the above-described gain equalization device 60 does not require a high-speed response characteristic, the application of the configurations according to the following first and second modifications is advantageous in scale, cost and others.

(B7.1) First Modification

Figures 40, 41:
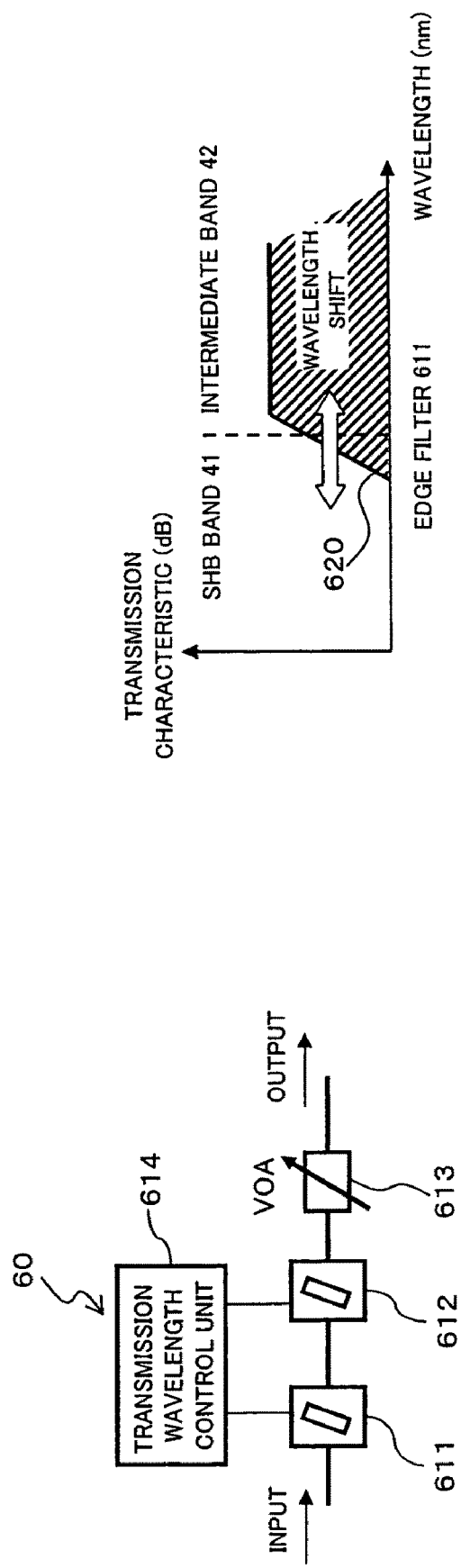
FIG. 40 is a block diagram showing a first modification of the gain equalization device shown in FIG. 26.
FIG. 41 is an illustration of a transmission characteristic of a first edge filter in the gain equalization device shown in FIG. 40.

FIG. 40 is a block diagram showing a first modification of the above-described gain equalization device 60. The gain equalization device 60 shown in FIG. 40 is made up of an edge filter 611 serving as a high pass filter to permit a longer-wavelength side light to pass instead of a specified wavelength, an edge filter 612 serving as a low pass filter to permit a shorter-wavelength side light to pass instead of a specified wavelength, a variable optical attenuator (VOA) 613 and a transmission wavelength control unit 614.

In this configuration, for example, as shown in FIG. 41, the edge filter (first edge filter) 611 has a leading edge (slope) portion 620 of a transmission band (see a portion indicated by oblique lines) with respect to wavelengths in the vicinity of the boundary between the SHB band 41 and the intermediate band 42, and shows a characteristic of transmission of light with the longer-wavelength side wavelengths from this leading edge portion 620, with this leading edge portion 620 being shifted (wavelength-shifted) on the wavelength axis by the transmission wavelength control unit 614.

In addition, for example, as shown in FIG. 42, the edge filter (second edge filter) 612 has a trailing edge (slope) portion 630 of a transmission band (see a portion indicated by oblique lines) on wavelengths in the vicinity of the boundary between the intermediate band 42 and the SRS band 43, and shows a characteristic of transmission of light with the shorter-wavelength side wavelengths from this leading edge portion 630, as well as the aforesaid edge filter 611, with this trailing edge portion 630 being shifted (wavelength-shifted) on the wavelength axis by the transmission wavelength control unit 614.

Therefore, for example, as shown in FIG. 43, the combined transmission band characteristic of these edge filters 611 and 612 becomes a trapezoid-like characteristic extending from the intermediate band 42 to the SHB band 41 and the SRS band 43 and, in a manner such that the respective edge portions 620 and 630 are individually properly wavelength-shifted by the transmission wavelength control unit 614, the transmission light quantities of the SHB band 41 and the SRS band 43 are changeable.

The transmission wavelength control unit 614 is made to carry out the aforesaid wavelength shift by individually changing the angles of thin film filter of the edge filters 611 and 612, and the VOA 613 is made to adjust the output power of light passing through the edge filters 611 and 612 with the attenuation quantity thereof being adjusted.

That is, in this embodiment, the aforesaid edge filters 611 and 612 function as a band division means to divide the signal wavelength band 40 of inputted wavelength multiplexed light into three bands of the bands 41, 42 and 43, and the aforesaid VOA 613 and transmission wavelength control unit 614 function as an adjustment means to adjust the output light power in units of the divided bands 41, 42 and 43.

With this configuration, the gain equalization device 60 controls the edge filters 611 and 612 to individually carry out the wavelength-shift on the edge portions 620 and 630 of the transmission bands, thus independently controlling the output light powers of the SHB band 41 and the SRS band 43.

Therefore, in comparison with the configuration described above with reference to FIG. 26, the gain equalization device 60 is realizable with a simpler configuration and at a lower cost.

(B7.2) Second Modification

Figure 44:
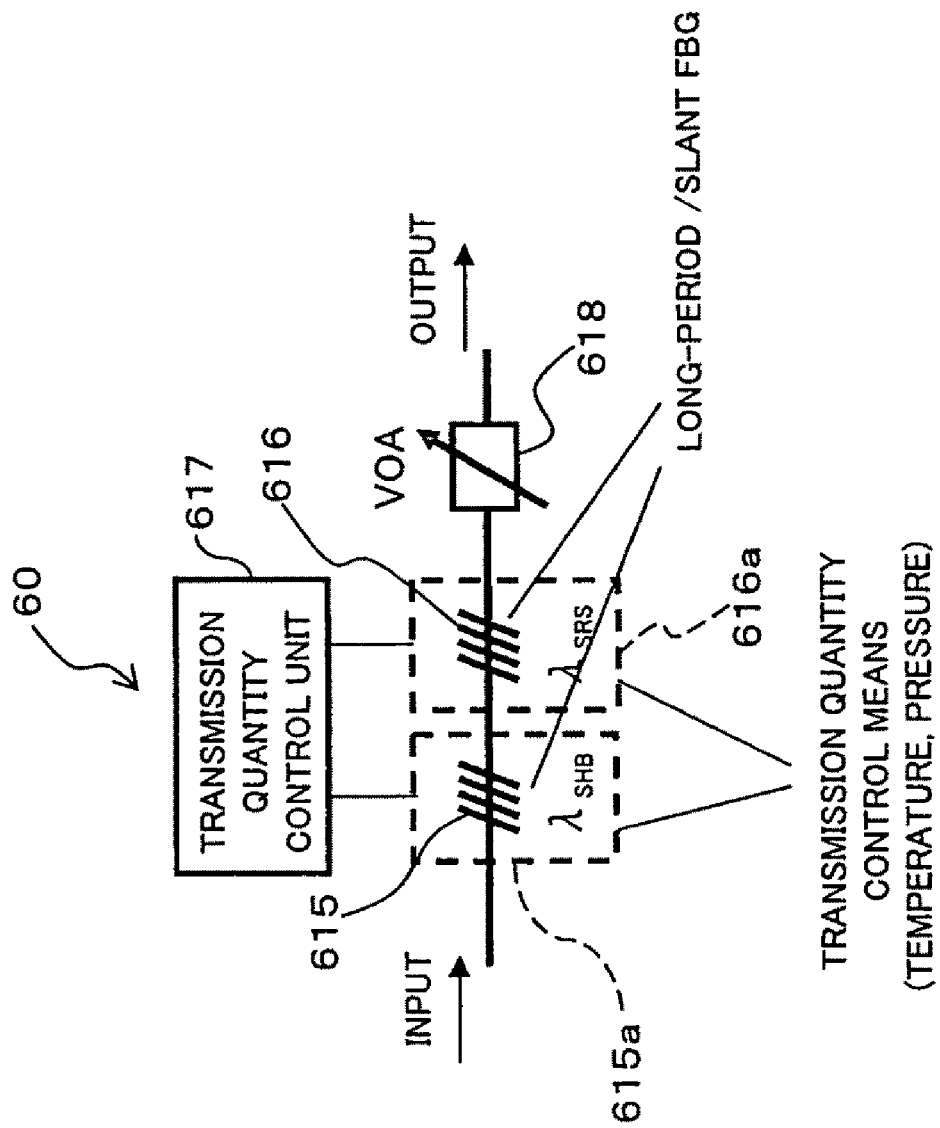
FIG. 44 is a block diagram showing a second modification of the gain equalization device shown in FIG. 26.

FIG. 44 is a block diagram showing a second modification of the above-described gain equalization device 60. The gain equalization device 60 shown in FIG. 44 is made up of two fiber gratings 615 and 616 arranged in series to each other, transmission characteristic control means 615a and 616a provided in corresponding relation to these fiber gratings 615 and 616, a transmission quantity control unit 617 and a variable optical attenuator (VOA) 618.

Figure 45:
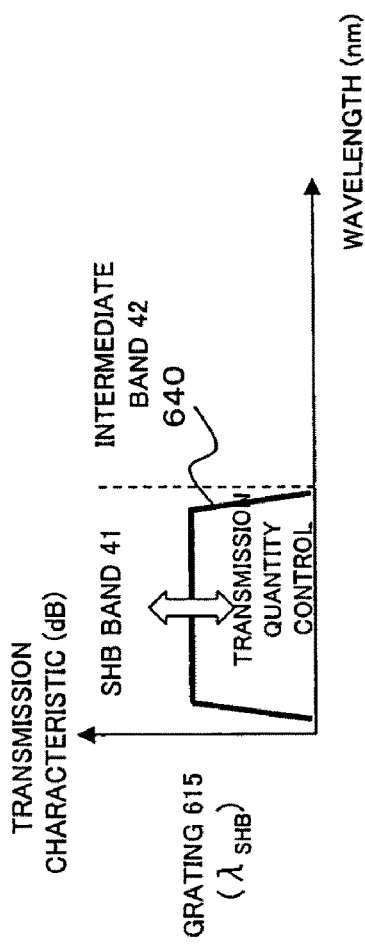
FIG. 45 is an illustration of a transmission characteristic of a first grating of the gain equalization device shown in FIG. 43.
Figure 46:
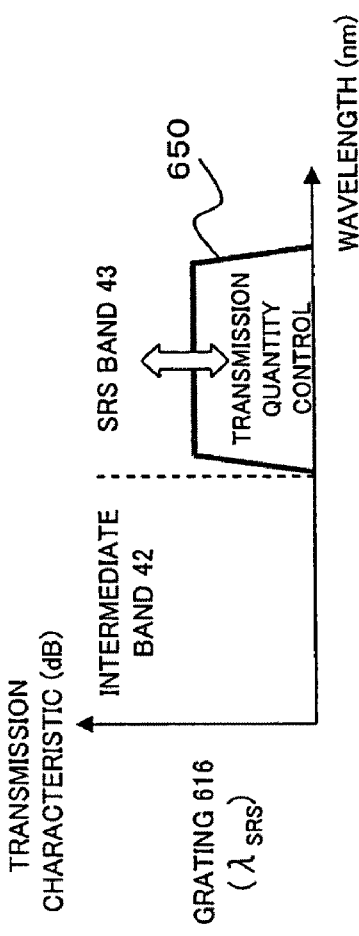
FIG. 46 is an illustration of a transmission characteristic of a second grating of the gain equalization device shown in FIG. 43.
Figure 47:
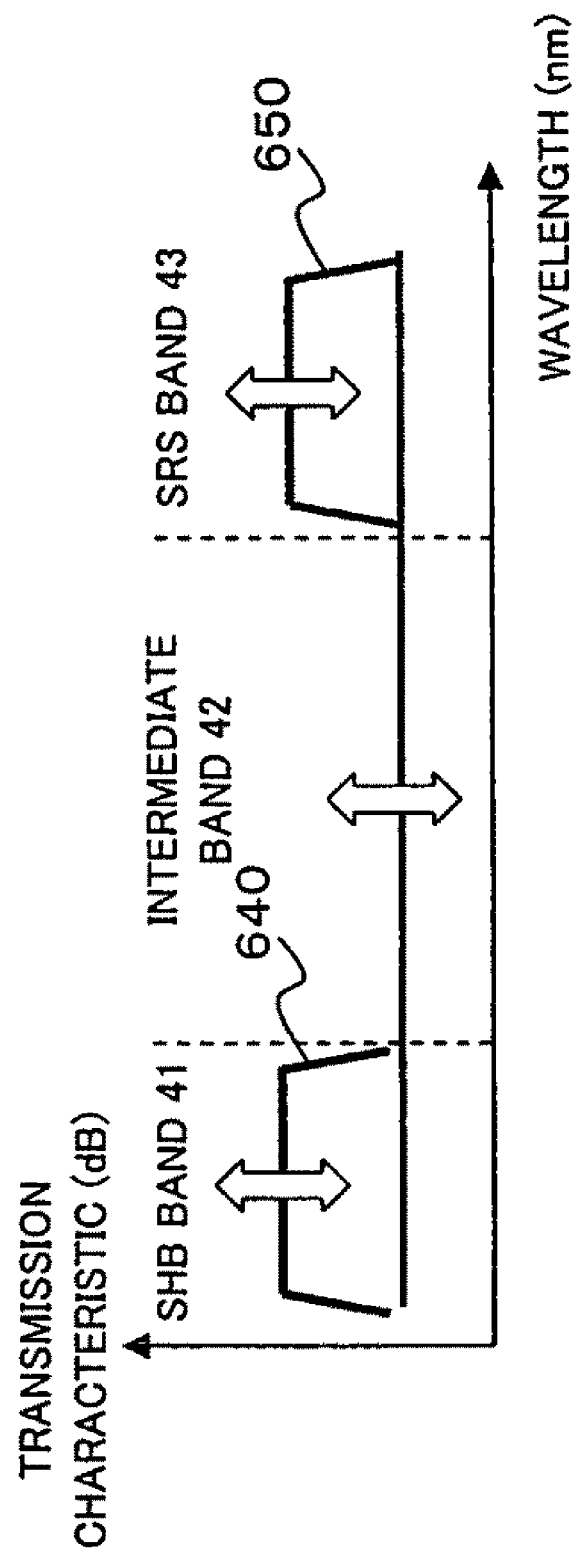
FIG. 47 is an illustration of a transmission characteristic of the gain equalization device shown in FIG. 43.

In this configuration, the input side grating (first transmission type fiber grating) 615 has a transmission (loss) characteristic 640 with a given spread from the shortest-wavelength side of the signal wavelength band 40, for example, as shown in FIG. 45, for providing a loss to the wavelengths of the SHB band 41, and the output side grating (second transmission type fiber grating) 616 has a transmission (loss) characteristic 650 with a given spread from the longest-wavelength side of the signal wavelength band 40, for example, as shown in FIG. 46, for providing a loss to the wavelengths of the SRS band 43. Therefore, the combined transmission characteristic of these fiber gratings 615 and 616, i.e., the transmission characteristic of the gain equalization device 60, becomes as shown in FIG. 47. A transmission type such as long-period type or slant type is employable as each of these fiber gratings 615 and 616.

The transmission characteristic control means 615a is for applying a temperature or a pressure to the corresponding fiber grating 615 to change the transmission characteristic of the grating for controlling the loss quantity of the SHB band 41, and a peltier element can be used therefor in the case of providing the temperature variation. Moreover, likewise, the transmission characteristic control means 616a is for applying a temperature or a pressure to the corresponding fiber grating 616 to change the transmission characteristic of the grating for controlling the loss quantity of the SRS band 43.

The transmission quantity control unit 617 is for independently controlling the temperature or pressure to be applied to the fiber gratings 615 and 616 by the transmission characteristic control means 615a and 616a so as to independently control the loss quantities of the fiber gratings 615 and 616, thereby independently controlling the transmission light quantity.

That is, in this embodiment, the aforesaid fiber gratings 615 and 616 function as a band division means to divide the signal wavelength band 40 of the inputted wavelength multiplexed light into the bands 41, 42 and 43, while the VOA 618, the transmission characteristic control means 615a, 616a and the transmission quantity control unit 617 function as an adjustment means to adjust the output light power in units of the divided bands 41, 42 and 43.

In the gain equalization device 60 thus configured, the transmission quantity control unit 617 can independently control the transmission characteristic control means 615a and 616a so as to individually control the loss quantities of the SHB band 41 and the SRS band 43. Also in this case, in comparison with the configuration described above with reference to FIG. 26, the gain equalization device 60 is realizable with a simpler configuration and at a lower cost.

Incidentally, although the gain equalization device 60 according to the first modification and the second modification can be replaced with an existing DGEQ, the DGEQ requires a higher cost compared with this device 60 and produces a larger insertion loss and, hence, advantage of the employment of the DGEQ is small.

(B7.3) Third Modification

Figure 48:
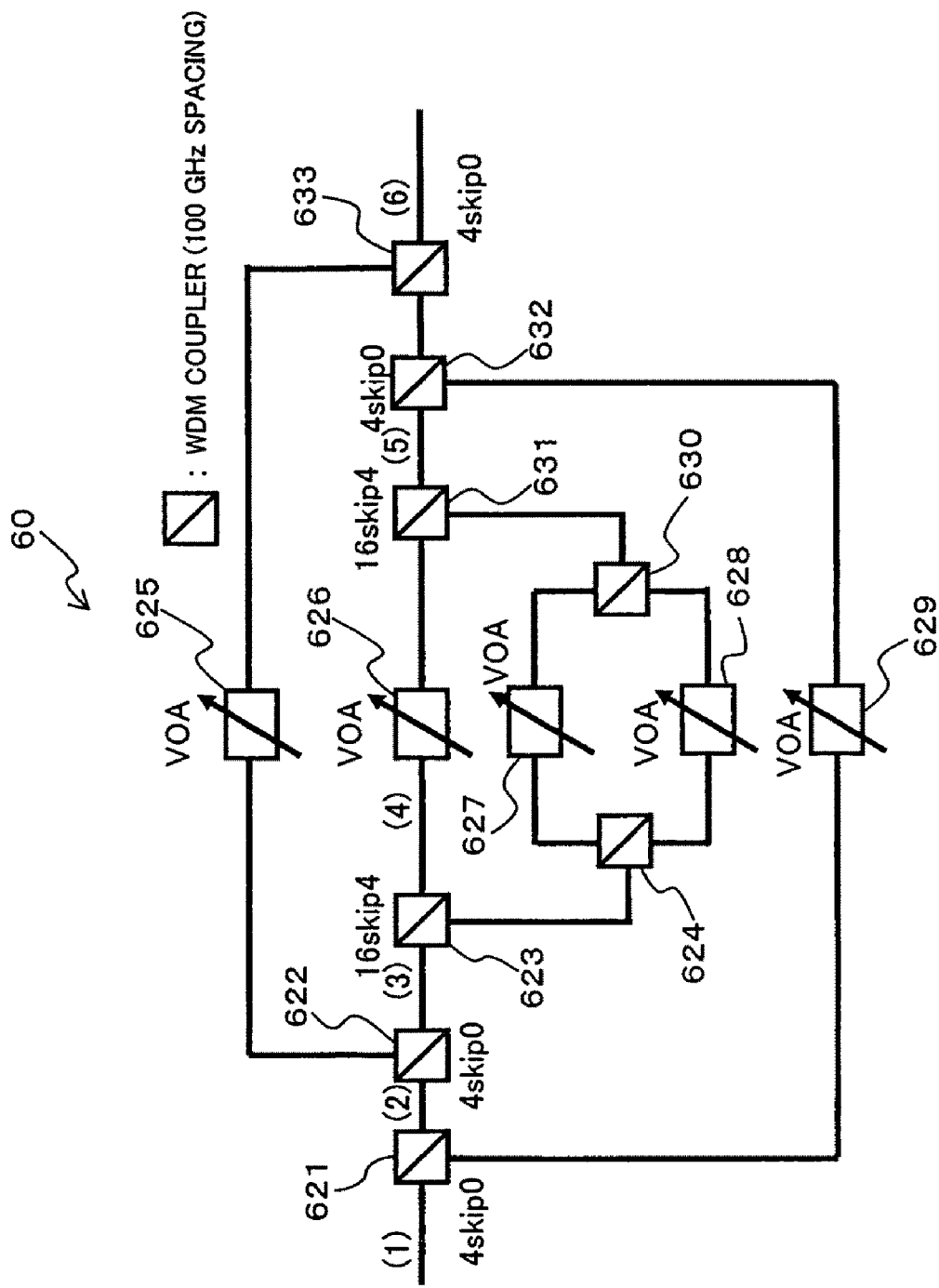
FIG. 48 is a block diagram showing a third modification of the gain equalization device shown in FIG. 26.

FIG. 48 is a block diagram showing a third modification of the above-described gain equalization device 60. The gain equalization device 60 shown in FIG. 48 is made up of WDM couplers 621, 622, 623, 624, 630, 631, 632, 633, and variable optical attenuators (VOAs) 625, 626, 627, 628, 629. If the gain equalization device 60 requires a high-speed response characteristic, as the VOAs 625, 626, 627, 628 and 629, a high-speed VOA having a sufficiently higher response speed (~several tens µs) in comparison with the response speed (~10 ms) of the level compensation control in the OADM node 100 may be used as described above with reference to FIG. 26.

In this configuration, the WDM coupler (band separation or split device) 621 functions as a band splitter to separate, of the inputted main signal light, the light corresponding to four wavelengths from the shortest-wavelength side of the intermediate band 42 to output it to the VOA 629 and to the light with the left wavelengths to the latter-stage WDM coupler 622. In this case, it has a band separation (loss) characteristic which does not produce a loss with respect to the light with wavelengths at both sides on the wavelength axis at the separation of the four wavelengths (in FIG. 48, "4skip0" signifies this).

In addition, the WDM coupler (band separation device) 622 also functions as a band splitter and has a band separation (loss) characteristic ("4skip0") equivalent to that of the aforesaid band splitter 621, and is made to extract (separate), of the main signal from the band splitter 621, the light corresponding to four wavelengths from the longest-wavelength side of the intermediate band 42 to output it to the VOA 625 and to the light with the left wavelengths to the latter-stage WDM coupler 623.

Still additionally, the WDM coupler (band separation device) 623 also functions as a band splitter and separate, of the main signal light from the aforesaid band splitter 622, the light left in the intermediate band 42 to output it to the VOA 626 and to the light with the left wavelengths (SHB band 41, the SRS band 43) to the latter-stage WDM coupler 624. In this case, it has a band separation (loss) characteristic which produces, as a sacrifice, a loss with respect to the light corresponding to four wavelengths at each of both sides on the wavelength axis at the separation of 16 wavelengths (in FIG. 48, "16skip4" signifies this).

That is, the gain equalization device 60 according to this embodiment is designed as the band splitter 623 to be used for separating the light of the intermediate band 42 such that, for employing a low-cost splitter of the aforesaid "16skip4", the four wavelengths at both sides of the intermediate band 42 are separated in advance by the band splitters 621 and 622.

Yet additionally, the WDM coupler (band separation device) 624 also functions as a band splitter to split the inputted light from the band splitter 623 into the light in the SHB band 41 and the light in the SRS band 43 for outputting them to the VOAs 627 and 628. The WDM coupler (band coupling device) 630 combines the output lights (that is, the lights in the SHB band 41 and the SRS band 43) from the VOAs 627 and 628 to output it to the WDM coupler 631. The WDM coupler (band coupling device) 631 is for combining the output light (i.e., light with 16 waves in the intermediate band 42) of the VOA 626 with the output light (i.e., lights in the SHB band 41 and the SRS band 43) of the WDM coupler 630.

The WDM coupler (band coupling device) 632 is for coupling the output light of the aforesaid WDM coupler 631 with the output light (light corresponding to four wavelengths from the shortest-wavelength side in the intermediate band 42) of the VOA 629, and the WDM coupler (band coupling device) 633 is for coupling the output light of this WDM coupler 632 with the output light (light corresponding to four wavelengths from the longest-wavelength side in the intermediate band 42) of the VOA 625.

Figure 49:
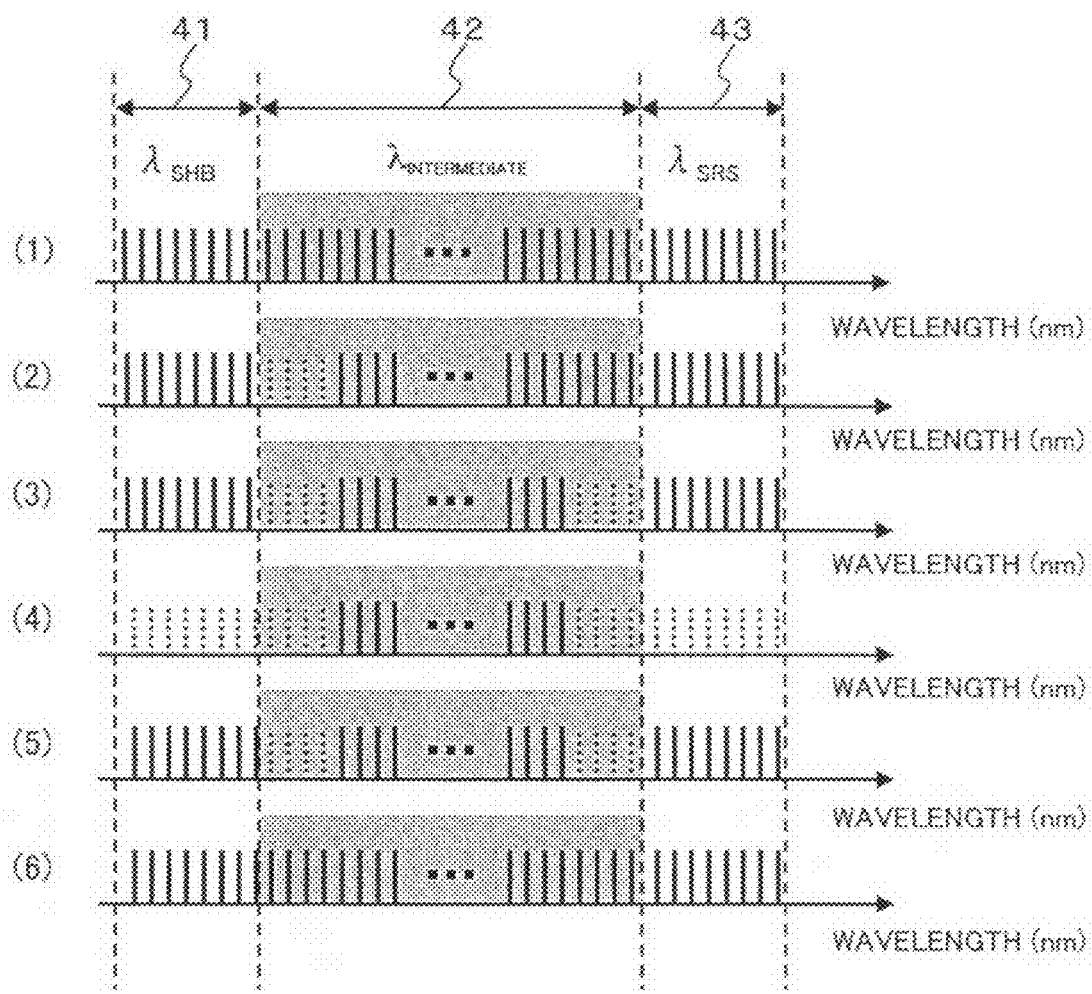
FIG. 49 is an illustration of a signal wavelength arrangement at each portion for explaining an operation of the gain equalization device shown in FIG. 48.

Referring to FIG. 49, a description will be given hereinbelow of an operation of the gain equalization device 60 thus configured. In FIG. 49, (1) to (6) designate wavelength arrangements at places indicated by (1) to (6) in FIG. 48, respectively.

First of all, the main signal (see (1) in FIG. 49) inputted to the gain equalization device 60 arrives at the band splitter 621 where, of the light, the light corresponding to four wavelengths on the shortest-wavelength side of the intermediate band 42 is separated and inputted to the VOA 629 without providing a loss to the other wavelengths, while the light with the remaining wavelengths is inputted to the latter-stage band splitter 622 (see (2) in FIG. 49).

In the band splitter 622, of the inputted main signal, the light corresponding to four wavelengths on the longest-wavelength side of the intermediate band 42 is separated and inputted to the VOA 625 without providing a loss to the other wavelengths, while the light with the remaining wavelengths is inputted to the latter-stage band splitter 623 (see (3) in FIG. 49).

In addition, the band splitter 623 splits the inputted main signal from the band splitter 622 into the light with wavelengths other than the four wavelengths on each of the shortest-wavelength side and longest-wavelength side of the intermediate band 42 and the light in the SHB band 41 and the SRS band 43, and outputs the former to the VOA 626 (see (4) in FIG. 49) and outputs the latter to the band splitter 624. The band splitter 624 splits the inputted main signal light from the band splitter 623 into the light in the SHB band 41 and the light in the SRS band 41 to input them to the VOAs 627 and 628.

That is, the light of the intermediate band 42 is inputted to the VOAs 625, 626 and 629, and the light of the SHB band 41 (or the SRS band 43) is inputted to VOA 627, and the light of the SRS band 43 is inputted to the VOA 628. Moreover, by individually controlling the attenuation quantities of the VOAs 625, 626, 627, 628 and 629, it is possible to adjust the output light power deviation of the main signal light in units of the bands 41, 42 and 43.

In this connection, the output lights (the lights of the SHB band 41 and the SRS band 43) of the VOAs 627 and 628 are combined with each other and inputted to the WDM coupler 631, where the combined light is combined with the output light (light excluding the light corresponding to the four wavelengths on each of both the sides of the intermediate band 42) of the VOA 626 and outputted to the latter-stage WDM coupler 632 (see (5) in FIG. 49). Moreover, the output light of the WDM coupler 631 is combined with the output light (the light corresponding to the four wavelengths on the shortest wavelength side of the intermediate band 42) of the VOA 629 in the WDM coupler 632, and the output light of this WDM coupler 632 is combined with the output light (the light corresponding to the four wavelengths on the longest-wavelength side of the intermediate band 42) of the VOA 625 in the WDM coupler 633 and then outputted (see (6) in FIG. 49).

As described above, with respect to the light with every wavelength in all the bands 41, 42 and 43 included in the signal wavelength band 40, without producing any loss [without making a sacrifice due to the aforesaid band separation characteristic) (which will be referred to as "no guard band")], the adjustment of the output light powers becomes feasible through the use of the VOAs 625 to 629. That is, by controlling the attenuation quantities of the VOAs 625, 626 and 629, the output light power (loss) of the intermediate band 42 is adjustable, and by controlling the attenuation quantity of the VOA 627, the output light power (loss) of the SHB band 41 (or the SRS band 43) is adjustable, and by controlling the attenuation quantity of the VOA 628, the output light power (loss) of the SRS band 43 is adjustable.

Therefore, in comparison with the configuration described above with reference to FIG. 26, without employing the circulators 601, 602 and the reflection devices 603, 609, the gain equalization device 60 in units of the bands 41, 42 and 43 is realizable. Incidentally, the insertion loss of the gain equalization device 60 with this configuration is approximately ~5 dB.

(B7.4) Fourth Modification

Figure 50:
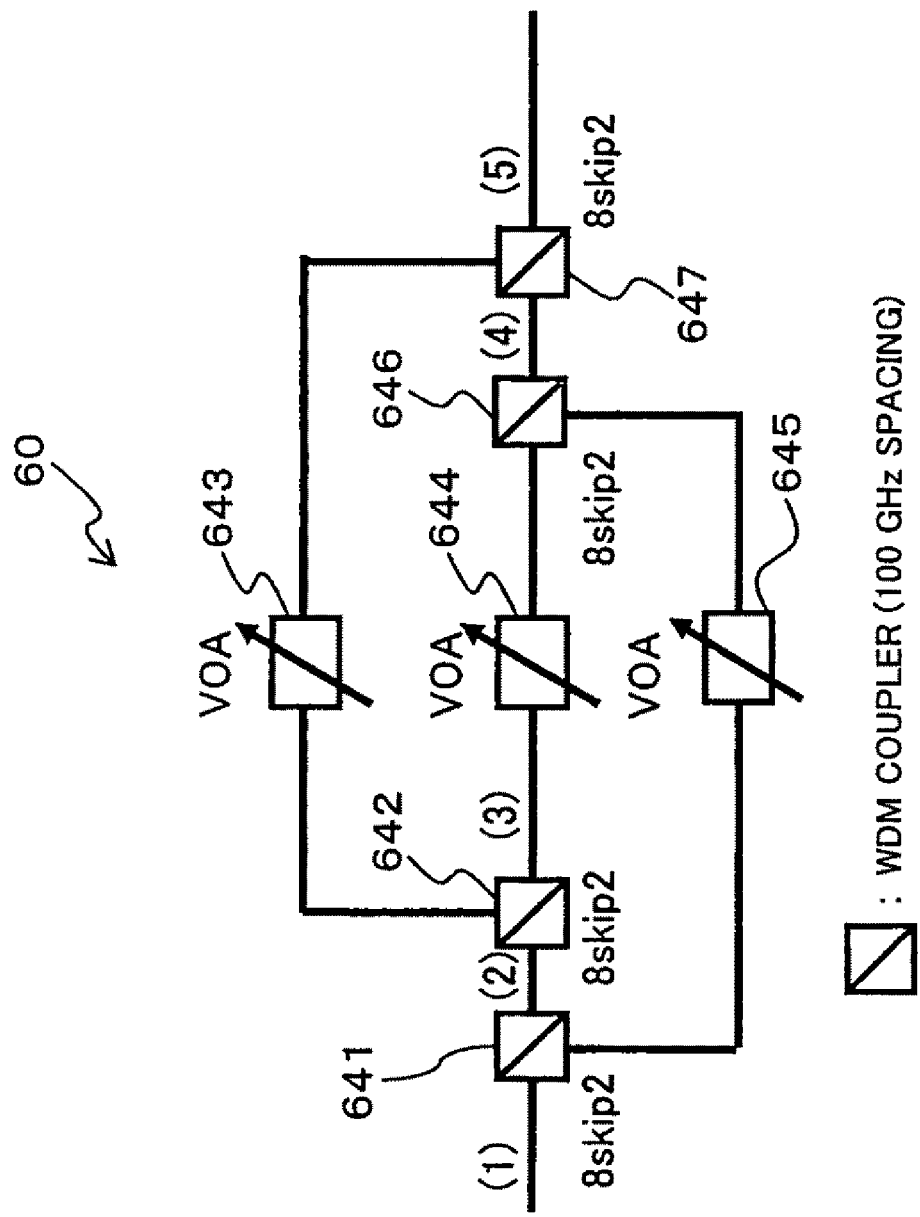
FIG. 50 is a block diagram showing a fourth modification of the gain equalization device shown in FIG. 26.

FIG. 50 is a block diagram showing a fourth modification of the above-described gain equalization device 60. The gain equalization device 60 shown in FIG. 50 is made up of WDM couplers 641, 642, 646, 647 and variable optical attenuators (VOAs) 643, 644, 645. Also in this modification, in a case in which a high-speed response characteristic is required, as the VOAs 643, 644 and 645, a high-speed VOA having a sufficiently higher response speed (~several tens μs) in comparison with the response speed (~10 ms) of the level compensation control in the OADM node 100 may be used as described above with reference to FIG. 26.

In this configuration, the WDM coupler (band separation device) 641 functions as a band splitter to separate the light of the SHB band 41 from the inputted main signal for outputting it to the VOA 645 and to output the light with the remaining wavelengths to the latter-stage WDM coupler 642. In this case, the band splitter 641 according to this modification has a band separation (loss) characteristic which produces, as a sacrifice, a loss with respect to the light corresponding to two wavelengths at each of both sides on the wavelength axis at the separation of 8 wavelengths (in FIG. 50, "8skip2" signifies this).

In addition, the WDM coupler (band separation device) 642 also functions as a band splitter and has a band separation (loss) characteristic ("8skip2") equivalent to that of the aforesaid band splitter 641, and is made to separate, of the inputted light from the band splitter 641, the light of the SRS band 43 to output it to the VOA 643 and to the remaining light of the intermediate band 42 to the VOA 644.

The WDM coupler (band coupling device) 646 is for coupling the output light (light of the intermediate band 42) of the VOA 644 with the output light (light of the SHB band 41) of the VOA 645, and the WDM coupler (band coupling device) 647 is for coupling the output light (lights of the SHB band 41 and the intermediate band 42) of this WDM coupler 646 with the output light (light of the SRS band 43) of the VOA 643. Both the WDM couplers 646 and 647 have a loss characteristic ("8skip2") equivalent to those of the band splitters 641 and 642.

Figure 51:
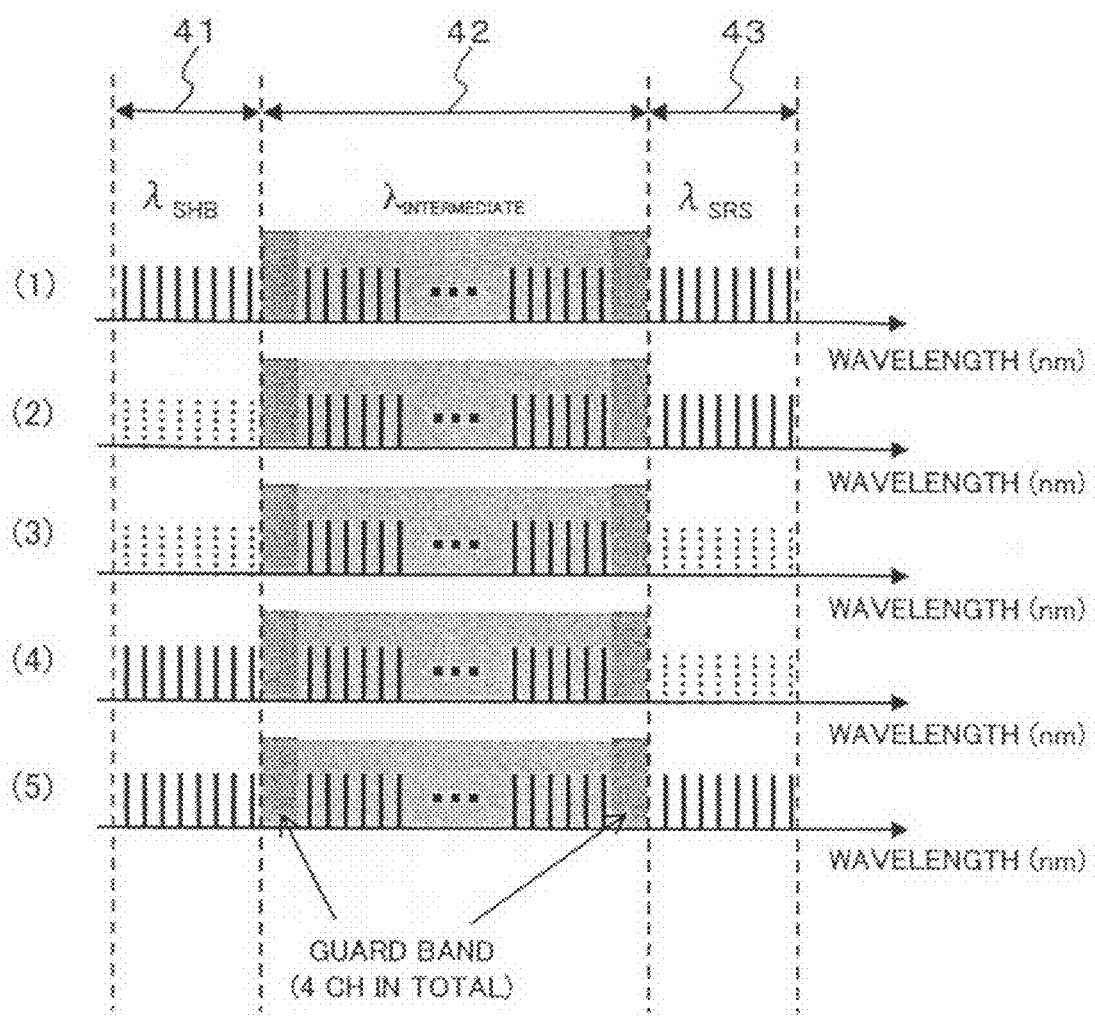
FIG. 51 is an illustration of a signal wavelength arrangement at each portion for explaining an operation of the gain equalization device shown in FIG. 50.

Referring to FIG. 51, a description will be given hereinbelow of an operation of the gain equalization device 60 thus configured. In FIG. 51, (1) to (5) depict the wavelength arrangements at places indicated by (1) to (5) in FIG. 50, respectively.

First of all, the main signal (see (1) in FIG. 51) inputted to the gain equalization device 60 arrives at the band splitter 641 where the light of the SHB band 41 is separated and inputted to the VOA 645, and the light with the remaining wavelengths is inputted to the latter-stage band splitter 642 (see (2) in FIG. 51). However, at this time, two channels from the shortest-wavelength side in the intermediate band 42 suffer a loss as a sacrifice due to the band separation characteristic ("8skip2") of the band splitter 641 (a guard band exists).

In the band splitter 642, from the inputted light from the aforesaid band splitter 641, the light of the SRS band 43 is separated and outputted to the VOA 643, and the light with the remaining wavelengths is outputted to the VOA 644 (see (3) in FIG. 51). However, also in this case, two wavelength from the longest-wavelength side in the intermediate band 42 suffers a loss as a sacrifice due to the band separation characteristic ("8skip2") of the band splitter 642.

From the above, the light of the SHB band 41 is inputted to the VOA 645, and the light of the intermediate band 42 is inputted to the VOA 644, and the light of the SRS band 43 is inputted to the VOA 643. Therefore, by individually controlling the attenuation quantities of the VOAs 645, 644 and 643, a loss (output light power) for each of the bands 41, 42 and 43 is adjustable.

The output lights (lights of the SHB band 41 and the intermediate band 42) of the VOAs 644 and 645 are coupled in the WDM coupler 646 and then coupled with the output light (light of the SRS band 43) of the VOA 643 in the WDM coupler 647 and outputted.

With this configuration, in comparison with the above-described configuration according to the third modification, although there are wavelengths (two wavelengths at each of both sides of the intermediate band 42, four wavelengths in total) (guard band) which becomes a sacrifice to the aforesaid separation (loss) characteristic at the band separation, since there is no need to employ a high-performance band splitter (WDM coupler) with respect to the wavelength separation characteristic, the gain equalization device 60 is realizable at a lower cost.

(B8) Others

Although in each of the above-described embodiments the signal wavelength band 40 is divided into the SHB band 41, the gain deviation band 42 and the SRS band 43 and the gain compensation is made in units of the bands 41, 42 and 43, it is also appropriate that, for example, the signal wavelength band 40 is divided into two bands of the SHB band 41 and the other band (including the gain deviation band 42), or the SRS band and the other band (including the gain deviation band 42), and the gain compensation is made in units of the divided bands.

What is claimed is:

1. An individual band gain equalizer comprising:
    band division means for dividing a signal wavelength band of an incoming wavelength multiplexed light into at least a first band and second band; said first band having a tendency of decreasing power of outgoing tight of an optical amplifier per channel at a decrease in the number of signal wavelengths or increasing power of the outgoing light of said optical amplifier per channel at an increase in the number of signal wavelengths, and said second band, which is a signal wavelength band other than said first band, includes a gain deviation band in which power of the outgoing light per channel varies mainly due to a wavelength deviation of automatic gain control in the optical amplifier; and
    adjustment means for adjusting the power of the outgoing light for the individual divided bands divided by the band division means.

2. The individual band gain equalizer according to claim 1, wherein said band division means divides said signal wavelength band into three bands, including an SHB band, said gain deviation band and an SRS band, said SHB band being under dominance of a spectral hole burning (SHB) effect as said first band, and said SRS band being under dominance of a stimulated Raman scattering (SRS) effect occurring in an output transmission line of said optical amplifier as another band of said first band.

3. The individual band gain equalizer according to claim 2, wherein said adjustment means includes:
    a variable optical attenuator for said SHB band;
    a variable optical attenuator for said gain deviation band; and
    a variable optical attenuator for said SRS band, and
    wherein said band division means includes:
        a gain deviation band reflection device for reflecting light in said gain deviation band;
        a first optical circulator for leading said incoming wavelength multiplexed light to said gain deviation band reflection device and leading reflected tight from said gain deviation band reflection device to said variable optical attenuator for said gain deviation band;
        a band separation device for separating light passing through the gain deviation band reflection device into tight in said SHB band and light in said SRS band to lead the lights to said variable optical attenuators for said SHB band and said SRS band a band coupling device for coupling output lights of said SHB band and SRS band variable optical attenuators; and
        a second optical circulator provided on an output side of said gain deviation band variable optical attenuator for leading output light from said band coupling device to said gain deviation band variable optical attenuator side and for leading light inputted from said gain deviation band variable optical attenuator side to an output port;
        an SHB band reflection device, provided between said gain deviation band variable optical attenuator and said second optical circulator, for reflecting, of light led to said gain deviation band variable optical attenuator side, light in said SHB band; and
        an SRS band reflection device, provided between said gain deviation band variable optical attenuator and said second optical circulator, for reflecting, of light led to said gain deviation band variable optical attenuator side, light in said SRS band.

4. The individual band gain equalizer according to claim 3, wherein each of said variable optical attenuators is a high-speed variable optical attenuator having a response speed on the order of microsecond.

5. The individual band gain equalizer according to claim 2, wherein said band division means includes:
    a first edge filter having a leading edge portion of a transmission band with respect to a wavelength in the vicinity of the boundary between said SHB band and said gain deviation band and having a transmission characteristic with respect to light with a wavelength on a longer-wavelength side from said leading edge portion; and
    a second edge filter having a trailing edge portion of a transmission band with respect to a wavelength in the vicinity of the boundary between said gain deviation band and said SRS band and having a transmission characteristic with respect to light with a wavelength on a shorter-wavelength side from said trailing edge portion, and
    wherein said adjustment means includes:
        a variable optical attenuator for adjusting output light power of said second edge filter; and
        a transmission wavelength control unit for controlling a transmission light quantities of said SHB band and said SRS band independently by shifting said edge portions of said edge filters individually.

6. The individual band gain equalizer according to claim 2, wherein said band division means includes:
    a first transmission fiber grating having an adjustment function to adjust a transmission light quantity of light in said SHB band contained in said inputted wavelength multiplexed light; and
    second transmission fiber grating having an adjustment function to adjust a transmission light quantity of light in said SRS band contained in output light of said first transmission fiber grating, and wherein said adjustment means includes:
- a variable optical attenuator for adjusting output light power of said second transmission fiber grating; and
- a transmission quantity control unit for applying a temperature or pressure variation to each of said transmission fiber gratings individually to control a transmission light quantity of each of said transmission fiber gratings independently.

7. An individual band gain equalizer comprising:
- a band division device that divides a signal wavelength band of an incoming wavelength multiplexed light into at least a first band and a second band, said first band having a tendency of decreasing power of outgoing light of an optical amplifier per channel at a decrease in the number of signal wavelengths or increasing power of the outgoing light of said optical amplifier per channel at an increase in the number of signal wavelengths, and said second band, which is a signal wavelength band other than said first band, includes a gain deviation band in which power of the outgoing light per channel varies mainly due to a wavelength deviation of automatic gain control in the optical amplifier; and
- an adjustment unit that adjusts the power of the outgoing light for the individual divided bands divided by the band division device.

8. The individual band gain equalizer according to claim 7, wherein said band division device divides said signal wavelength band into three bands, including an SHB band, said gain deviation band and an SRS band, said SHB band being under dominance of a spectral hole burning (SHB) effect as said first band, and said SRS band being under dominance of a stimulated Raman scattering (SRS) effect occurring in an output transmission line of said optical amplifier as another band of said first band.

9. The individual band gain equalizer according to claim 8, wherein said adjustment unit includes:
- a variable optical attenuator for said SHB band;
- a variable optical attenuator for said gain deviation band; and
- a variable optical attenuator for said SRS band, and
wherein said band division device includes:
- a gain deviation band reflection device that reflects light in said gain deviation band;
- a first optical circulator that leads said incoming wavelength multiplexed light to said gain deviation band reflection device and that leads reflected light from said gain deviation band reflection device to said variable optical attenuator for said gain deviation band;
- a band separation device that separates light passing through the gain deviation band reflection device into light in said SHB band and light in said SRS band to lead the lights to said variable optical attenuators for said SHB band and said SRS band;
- a band coupling device that couples output lights of said SHB band and SRS band variable optical attenuators; and
- a second optical circulator provided on an output side of said gain deviation band variable optical attenuator that leads output light from said band coupling device to said gain deviation band variable optical attenuator side and that leads light inputted from said gain deviation band variable optical attenuator side to an output port;
- an SHB band reflection device, provided between said gain deviation band variable optical attenuator and said second optical circulator, that reflects, of light led to said gain deviation band variable optical attenuator side, light in said SHB band; and
- an SRS band reflection device, provided between said gain deviation band variable optical attenuator and said second optical circulator, that reflects, of light led to said gain deviation band variable optical attenuator side, light in said SRS band.

10. The individual band gain equalizer according to claim 9 wherein each of said variable optical attenuators is a high-speed variable optical attenuator having a response speed on the order of microsecond.

11. The individual band gain equalizer according to claim 8, wherein said band division device includes:
- a first edge filter having a leading edge portion of a transmission band with respect to a wavelength in the vicinity of the boundary between said SHB band and said gain deviation band and having a transmission characteristic with respect to light with a wavelength on a longer-wavelength side from said leading edge portion; and
- a second edge filter having a trailing edge portion of a transmission band with respect to a wavelength in the vicinity of the boundary between said gain deviation band and said SRS band and having a transmission characteristic with respect to light with a wavelength on a shorter-wavelength side from trailing edge portion, and
wherein said adjustment unit includes:
- a variable optical attenuator that adjusts output light power of said second edge filter; and
- a transmission wavelength control unit that controls transmission light quantities of said SHB band and said SRS band independently by shifting said edge portions of said edge filters individually.

12. The individual band gain equalizer according to claim 8, wherein said band division device includes:
- a first transmission fiber grating having an adjustment function to adjust a transmission light quantity of light in said SHB band contained in said inputted wavelength multiplexed light; and
- second transmission fiber grating having an adjustment function to adjust a transmission light quantity of light in said SRS band contained in output light of said first transmission fiber grating, and
wherein said adjustment unit includes:
- a variable optical attenuator that adjusts output light power or said second transmission fiber grating; and
- a transmission quantity control unit that applies a temperature or pressure variation to each of said transmission fiber gratings individually to control a transmission light quality of each of said transmission fiber gratings independently.

* * * * *

UNITED STATES PATENT AND TRADEMARK OFFICE
CERTIFICATE OF CORRECTION

PATENT NO. : 7,715,093 B2  Page 1 of 1
APPLICATION NO. : 12/016176
DATED : May 11, 2010
INVENTOR(S) : Masato Nishihara et al.

It is certified that error appears in the above-identified patent and that said Letters Patent is hereby corrected as shown below:

Column 39, Line 40, change "tight" to --light--

Column 40, Line 6, change "tight" to --light--

Column 40, Line 11, change "tight" to --light--

Column 40, Line 13, change "SRS band" to --SRS band;--

Signed and Sealed this

Seventeenth Day of August, 2010

David J. Kappos
*Director of the United States Patent and Trademark Office*